(12) United States Patent
Sato et al.

(10) Patent No.: US 7,334,483 B2
(45) Date of Patent: Feb. 26, 2008

(54) THERMAL COMPENSATION OF PRESSURE MEASUREMENTS

(75) Inventors: Shigeru Sato, Inagi (JP); Yves Barriol, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 11/307,217

(22) Filed: Jan. 27, 2006

(65) Prior Publication Data

US 2007/0186657 A1    Aug. 16, 2007

(51) Int. Cl.
*G01L 19/04*   (2006.01)
(52) U.S. Cl. ...................................... 73/708
(58) Field of Classification Search .............. 73/708
See application file for complete search history.

(56) References Cited

U.S. PATENT DOCUMENTS

| 4,547,691 A | 10/1985 | Valdois et al. |
| 4,607,530 A | 8/1986 | Chow |
| 5,394,345 A | 2/1995 | Berard et al. |
| 5,471,882 A | 12/1995 | Wiggins |

FOREIGN PATENT DOCUMENTS

| EP | 0764839 A1 | 3/1997 |
| EP | 1186875 A2 | 3/2002 |

OTHER PUBLICATIONS

John L. Shanks, "Recursion Filters for Digital Processing", Geophysics, Feb. 1967, pp. 33-51, vol. XXXII, No. 1.
H.S. Carslaw, J.C. Jaeger, "Conduction of Heat in Solids", 2nd edition, Oxford Univ., 1986.

*Primary Examiner*—Andre J. Allen
(74) *Attorney, Agent, or Firm*—Karan Singh; Jaime Castano; Dale Gaudier

(57) ABSTRACT

Methods and systems for thermal compensation of pressure measurements by a pressure gauge. Errors in pressure values are reduced by utilizing a predetermined correlation between the error in pressure measurements, due to temperature gradient in a pressure gauge, and the temperature gradient caused by temperature at a surface of the pressure gauge and temperature at an inner portion of the pressure gauge. Thermally corrected pressure values are derived based on the correlation between the pressure errors and the temperature gradients in conditions such as due to fast and large pressure variations in oil wells.

25 Claims, 48 Drawing Sheets

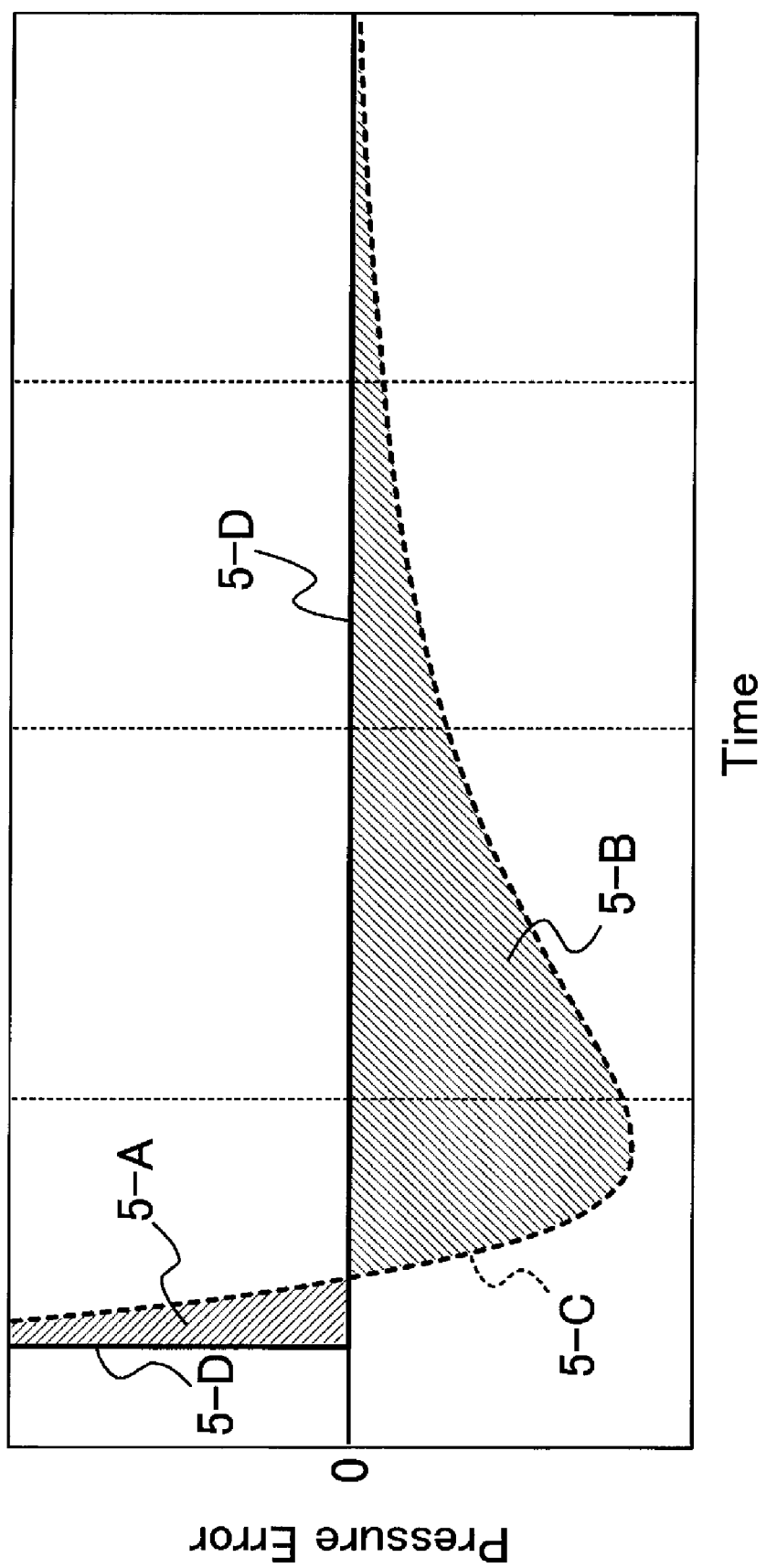

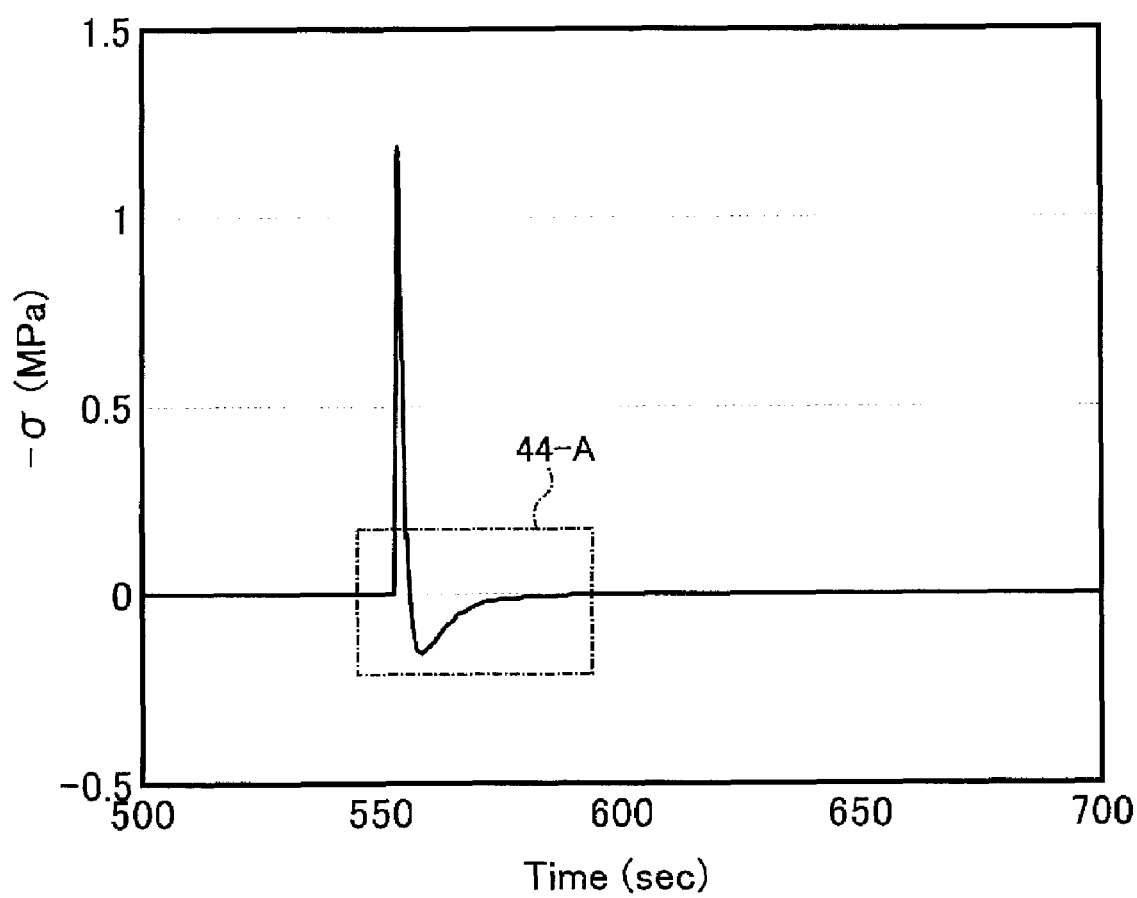

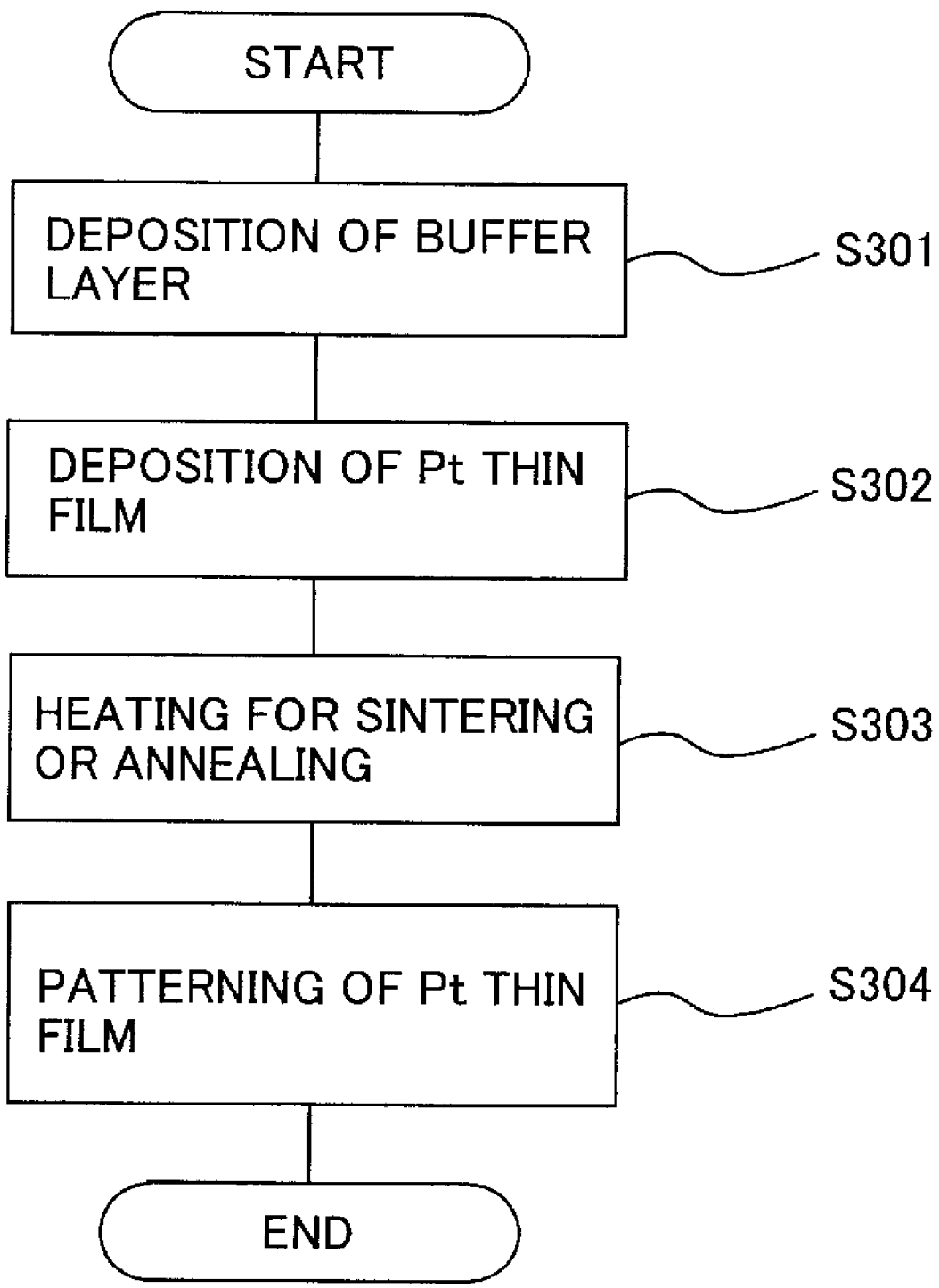

THERMAL COMPENSATION OF PRESSURE MEASUREMENTS

FIELD OF THE INVENTION

The present invention relates to methods and systems of correcting pressure measurements by a pressure gauge for the influence of temperature. More specifically, measurements by a pressure gauge are corrected for errors due to thermal stress and/or strain by temperature gradients in the pressure gauge, such as caused by variations of temperature encountered during pressure measurements performed in oil wells, for example.

BACKGROUND OF THE INVENTION

Pressure measurements, such as by pressure gauges that include a resonator made of piezoelectric crystal with the resonance frequency of the resonator changing as a result of the applied pressure, are affected by temperature. Similarly, with strain gauges, such as piezoresistive bridge gauges, including resistors with the resistances changing by deformation under pressure.

One example of a piezoelectric crystal pressure gauge, called Compensated Quartz Gauge (CQG), is described in U.S. Pat. No. 4,547,691. Due to specially selected crystal orientation, the aforementioned pressure gauge has dual-mode operation with two simultaneous bulk acoustic resonances; one is pressure dependent, Fc, at about 5.15 MHz and the other is temperature dependent, Fb, at about 5.60 MHz (at room temperature). Pressure and temperature readings can be computed from a polynomial equation of Fc, Fb and a set of coefficients implying that the pressure reading is calibrated with the temperature reading of the same pressure gauge. In contrast with CQG, other conventional pressure gauges operate in single-mode and use a thermometer installed adjacent to the pressure gauge to thermally calibrate pressure readings.

Conventional temperature calibration of CQG works well in the case of slow temperature variations. However, an adiabatic temperature variation, which happens due to a fast and large pressure variation, induces transient error in the pressure readings even in a dual-mode oscillation pressure gauge. A compensation algorithm for partial correction of the transient error is described in U.S. Pat. No. 5,394,345.

FIG. 1 shows a typical dynamic pressure response of the CQG against pressure drop from 5,000 psi to atmospheric pressure, and the pressure readings corrected with the foregoing conventional compensation algorithm. In FIG. 1, line 1-A indicates raw pressure readings and lines 1-B indicate corrected pressure readings. The corrected pressures, however, still show almost the same amplitude of overshoot error as the raw pressure readings.

Compared to a pressure gauge like the CQG that utilizes dual-mode oscillation to measure both pressure and temperature, single-mode oscillation pressure gauges have a disadvantage in terms of temperature compensation. In single-mode oscillation pressure gauges the gauge temperature is measured with a separate thermometer to compensate for temperature effects in pressure readings. The thermometer, however, cannot measure the gauge temperature correctly under transient temperature conditions because of a temperature gradient in the gauge packaging. This disadvantage is particularly emphasized in the case of adiabatic pressure changes. When pressure increases, the system temperature increases. When pressure decreases, the system temperature decreases. In a real situation, no perfect adiabatic condition exists, but is approximated when the time period of the pressure change is sufficiently shorter than the time period required for heat to flow in to or out from the system to attain thermal equilibrium.

Methods for calibration of single-mode oscillation pressure gauges have been proposed in, for example, U.S. Pat. No. 5,471,882. Since the conventional methods use a thermometer installed in the gauge packaging, and calculate a correction term by using temperature obtained from the thermometer, these methods are not suitable for correcting pressure measurements for errors due to rapid changes of temperature around the pressure gauge.

U.S. Pat. No. 4,607,530 describes compensation for single-mode oscillation pressure gauges using a thermometer outside the body of the pressure gauge, but the model adjustment parameters therein are estimated experimentally with a Kalman filter. Thus, a disadvantage is that the algorithm uses many model parameters that must be determined experimentally to correct the output frequency of the pressure gauge for ambient temperature variations.

BRIEF SUMMARY OF THE INVENTION

In consequence of the background discussed above, and other factors that are known in the field of thermal compensation of pressure measurements, applicants recognized need for improved and efficient methodology of compensating pressure measurements for errors due to temperature distribution or differences in the pressure gauge.

Applicants discovered a novel algorithmic methodology for accurate thermal compensation of pressure values obtained by a pressure gauge.

Applicants recognized that using a methodology with temperature gradients based on spatial separation of temperature data would provide accurate thermal compensation when an adiabatic temperature variation happens due to a fast and large pressure variation in surroundings of the pressure gauge, such as in oil wells. However, the present methodology is not limited to adiabatic temperature changes and will have applicability in all situations where temperature gradients occur in pressure gauges, for example, pressure gauges of the type described herein. In this, it is contemplated that the present invention has applicability in wireline, production logging, logging-while-drilling (LWD), permanent monitoring, drilling and measurements applications, among other oilfield-related applications. In particular, the present invention contemplates thermal compensation of pressure measurements that are made in extreme downhole conditions, such as found in hydrocarbon reservoirs, and in applications relating to sequestration of $CO_2$ and management of water reservoirs.

In one aspect of the present invention, correlation between error in pressure measurements by a pressure gauge, due to temperature gradient in the pressure gauge, and the temperature gradient is utilized for deriving one or more thermally corrected pressure values.

In one embodiment of the present invention, thermal compensation of pressure measurements by a pressure gauge comprises determining the correlation between pressure error and temperature gradient by deriving a scale factor based on a two-point temperature gradient representing the temperature difference between temperature at the surface of the pressure gauge and temperature at the center of the pressure gauge. In another embodiment, determining the correlation comprises deriving a proportional constant as a function of temperature based on thermal stress and the pressure error, wherein the thermal stress is a function of a temperature profile in the pressure gauge. In one aspect of the present invention, one or more corrected pressure values are derived using:

$$P_{corrected} = P_{raw} - SF \cdot (T_{INSIDE} - T_{OUTSIDE})$$

wherein $P_{corrected}$ represents a corrected pressure value, $P_{raw}$ represents a pressure value measured with the pressure gauge, SF represents the correlation based on a two-point temperature gradient representing the temperature difference, $T_{OUTSIDE}$ represents outside temperature at the surface of the pressure gauge, and $T_{INSIDE}$ represents inside temperature at an inner portion of the pressure gauge.

In yet another aspect of the present invention, inside temperature of the pressure gauge is derived using:

$$T_{INSIDE}(x,t) = \int_0^t T_{IR}(x, t-t') T_{OUTSIDE}(t') dt$$

wherein $T_{INSIDE}$ represents the inside temperature, $T_{OUTSIDE}$ represents the outside temperature, $T_{IR}$ represents a function expressing a temperature impulse response of the pressure gauge, x represents a position in the pressure gauge, and t and t' represent time, wherein, in one embodiment of the present invention, the temperature impulse response is derived by a numerically modeled method comprising Finite Element Modeling and, in another embodiment, the temperature impulse response is determined by an experimental method.

In yet another aspect of the present invention, the outside temperature is derived using:

$$T_{OUTSIDE}(t) = \int_0^t InverseIR(t-t') T_{INSIDE}(t') dt'$$

wherein $T_{INSIDE}$ represents the inside temperature, $T_{OUTSIDE}$ represents the outside temperature, InverseIR represents an inverse function of temperature impulse response of the pressure gauge, and t and t' represent time.

In yet other aspects of the present invention, one or more corrected pressure values are derived using:

$$\Delta P(T, t) = \int_0^t T_{OUTSIDE}(t-t') C_0(T) \sigma(t') dt'$$

wherein $\Delta P(T,t)$ represents a correction term; $T_{OUTSIDE}$ represents the outside temperature at the outer surface of the pressure gauge; σ represents thermal stress impulse response in the pressure gauge; $C_0$ represents a proportional constant as a function of temperature based on thermal stress and the pressure error, the thermal stress being a function of a temperature profile in the pressure gauge; T represents static temperature; and t and t' represent time, wherein, in one embodiment, the thermal stress impulse response is determined by a numerically modeled method comprising Finite Element Modeling and, in another embodiment, the thermal stress impulse response is determined by an experimental method.

A pressure gauge comprising a discoid stress sensor is provided and the correction term is derived using:

$$\Delta P(T, t) =$$
$$C(T) \int_0^t dt' T_{OUTSIDE}(t-t') \sum_{n=1}^{Ns} e^{-\kappa \beta_n^2 t'} \left(e^{\kappa \beta_n^2 \Delta t'} - 1\right) \left\{ \frac{1}{\beta_n^2} - \frac{aJ_0(0)}{2\beta_n J_1(a\beta_n)} \right\}$$

wherein $\Delta P(T,t)$ represents the correction term, $T_{OUTSIDE}$ represents the outside temperature at the outer surface of the pressure gauge, "a" represents radius of resonator, κ represents thermal diffusivity of the pressure gauge, $J_0$ and $J_1$ represent Bessel's function, βn represents the root of $J_0(a\beta)$, $$C(T) = C_0(T) \frac{2\alpha E}{a^2},$$

T represents static temperature, Δt represents sampling time, Ns represents the total number of terms summed up and t and t' represent time.

Other aspects of the present invention include measuring one or more pressure values by a pressure gauge and deriving one or more corrected pressure values based on a predetermined correlation between error in pressure measurements by the pressure gauge, due to temperature gradient in the pressure gauge, and the temperature gradient, wherein the pressure gauge may be used for pressure measurements in oil wells. Systems for thermal compensation of pressure measurements by a pressure gauge comprise a pressure gauge; a measurement circuit unit configured to output one or more measured pressure values based on output signals of the pressure gauge; and the system being configured to derive one or more corrected pressure values based on a predetermined correlation between error in pressure measurements by the pressure gauge and temperature gradient in the pressure gauge. In other embodiments of the present invention, the pressure gauge comprises a piezoelectric resonator having a dual vibrating mode, wherein the piezoelectric resonator may comprise a quartz resonator and/or the system may comprise a thin film thermal resistor temperature sensor on a surface of the pressure gauge, for example, a thin film of platinum. A temperature sensor may be located on or near an outer surface of the pressure gauge and/or at a predetermined position near an outer surface of the pressure gauge in a surrounding pressure medium. The system may be configured to be used for pressure measurements in oil wells.

In yet other aspects of the present invention, a pressure gauge comprises a cylindrical body; a resonator located in the body; and a temperature sensor on the external surface of the body, in the vicinity of the resonator. In yet another aspect of the present invention, a pressure gauge comprises two cylindrical end caps; a resonator disc disposed between the end caps; and a temperature sensor on the resonator disc along the peripheral edge of the disc. A pressure gauge may comprise a discoid stress sensor and/or a pressure gauge may comprise a substantially planar resonator and the system may comprise a temperature sensor disposed on or near a surface of the pressure gauge in substantially the same plane as the resonator.

In yet other aspects of the present invention, a pressure gauge may comprise a stress gauge such as a gauge with at least one piezoelectric resonator, which is sensitive to stress in the gauge and outputs signals changing by stress in the gauge under pressure. A pressure gauge may comprise a strain gauge such as a piezoresistive gauge, which is sensitive to strain generated in the gauge and outputs signals changing by strain of the gauge due to deformation under pressure.

Additional advantages and novel features of the invention will be set forth in the description which follows or may be learned by those skilled in the art through reading the materials herein or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain principles of the present invention.

FIG. 5 shows graphically a dynamic pressure response of a CQG against a pressure drop;

FIG. 44A is a graph of calculated thermal stress at the center of the quartz disc;

FIG. 47 is a flow chart for one fabrication process of a platinum thin film thermometer on a quartz surface according to the present invention.

Figure 1:
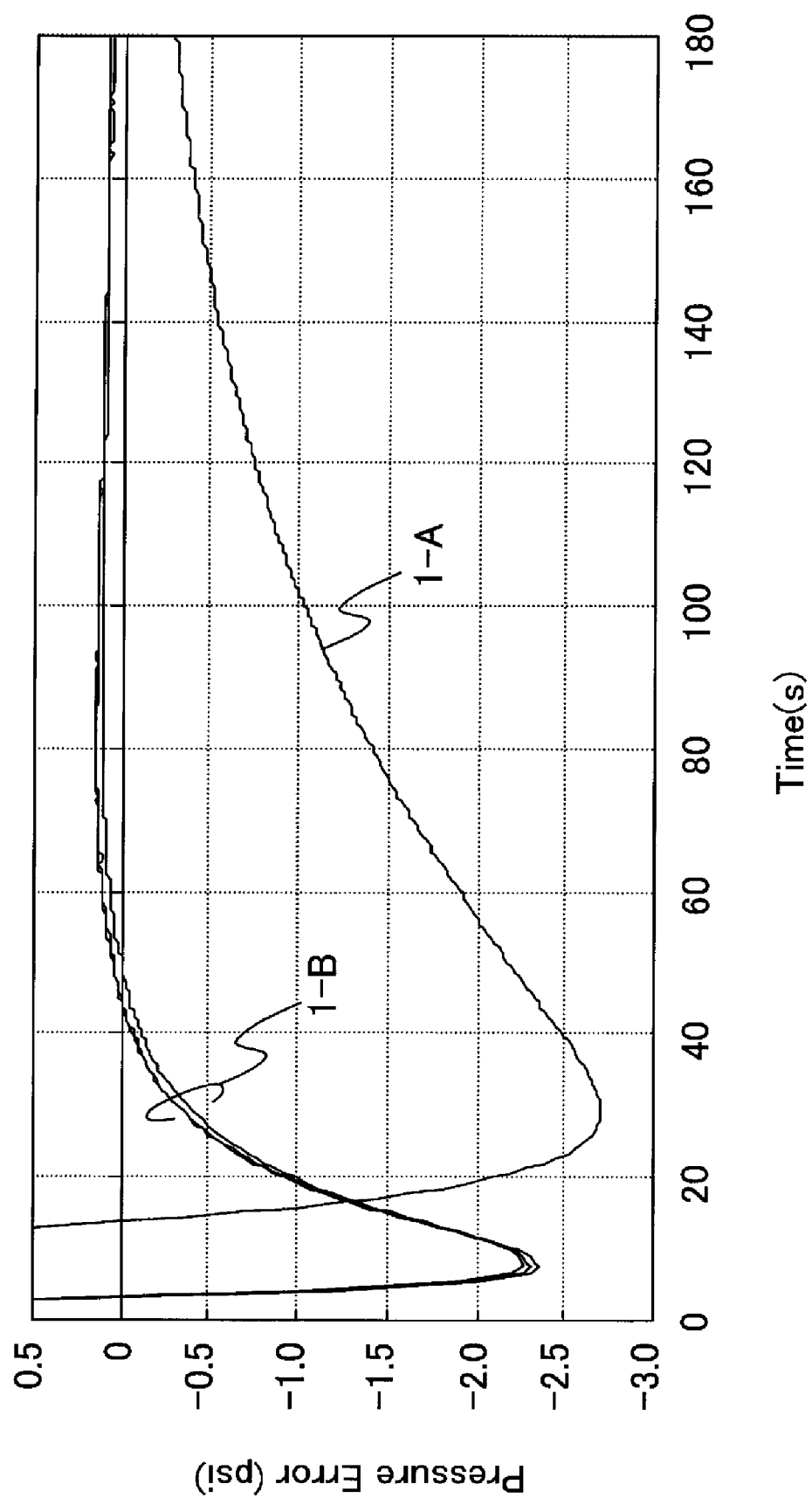
FIG. 1 shows a typical dynamic pressure response of a CQG against pressure drop from 5,000 psi to atmospheric pressure and its corrected pressure readings with a conventional compensation algorithm.

Throughout the drawings, identical reference numbers indicate similar, but not necessarily identical elements. While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the scope of the invention as defined by the appended claims.

DETAILED DESCRIPTION

Illustrative embodiments and aspects of the invention are described below. In the interest of clarity, not all features of an actual implementation are described in the specification. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such development effort might be complex and time-consuming, but would nevertheless be a routine undertaking for those of ordinary skill in the art having benefit of the disclosure herein.

Generally, if a physical system having parts with different thermal properties is subjected to pressure change under adiabatic condition, the temperatures of the system parts change by different degrees. Such temperatures take time to recover to their original values. Until then, the temperature profile in the parts is inhomogeneous and a gradient is created across the parts so as to generate heat flow from one part of the system to another. As used herein, the term "temperature profile" means temperature distribution in a material or space, as a function of spatial variable(s), and the term "time variation of temperature profile" means change of the temperature profile in time. The term "transient" applies to the result produced by making a sudden change in a system, i.e., an adjective expressing changing in time. The term "adiabatic pressure change" means a pressure change in which substantially no heat is taken in or given out from the system.

Figure 2:
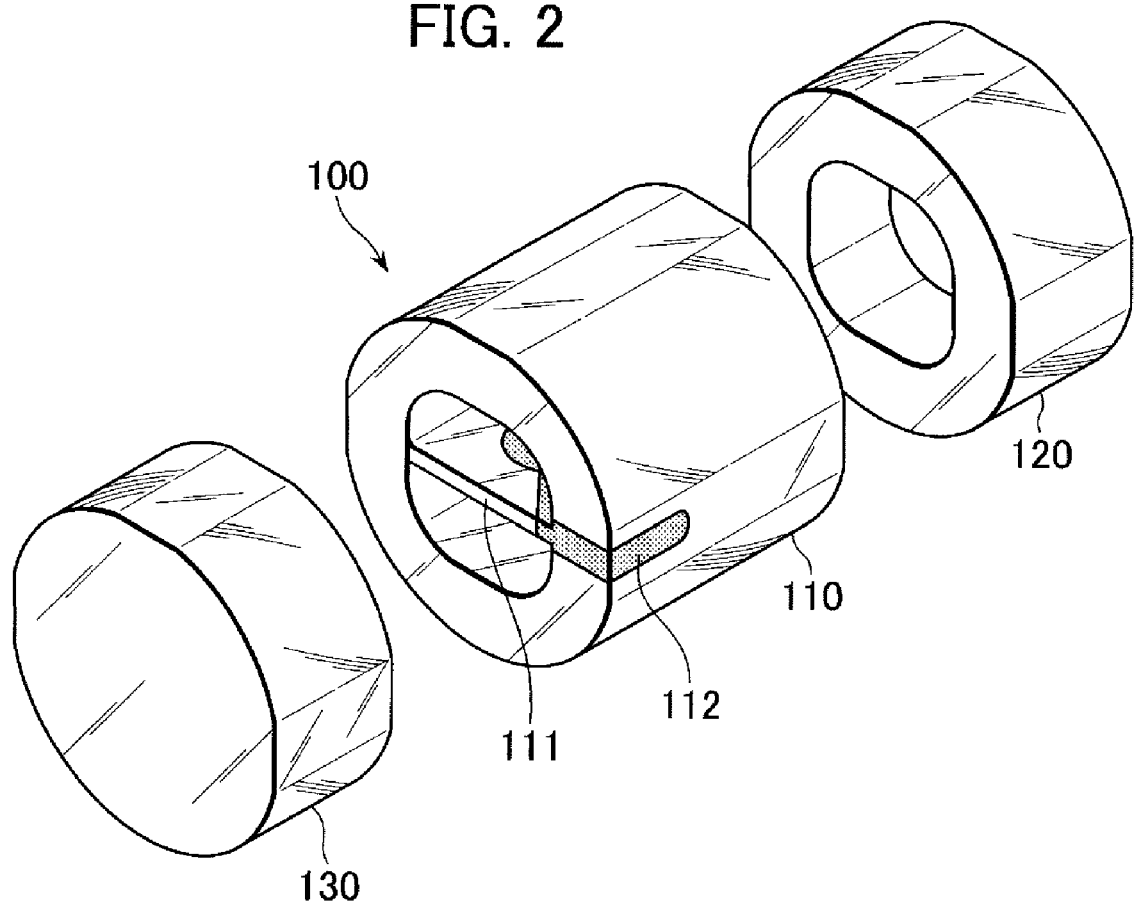
FIG. 2 is an exploded perspective view of a dual-mode oscillation pressure gauge (CQG)
Figure 3:
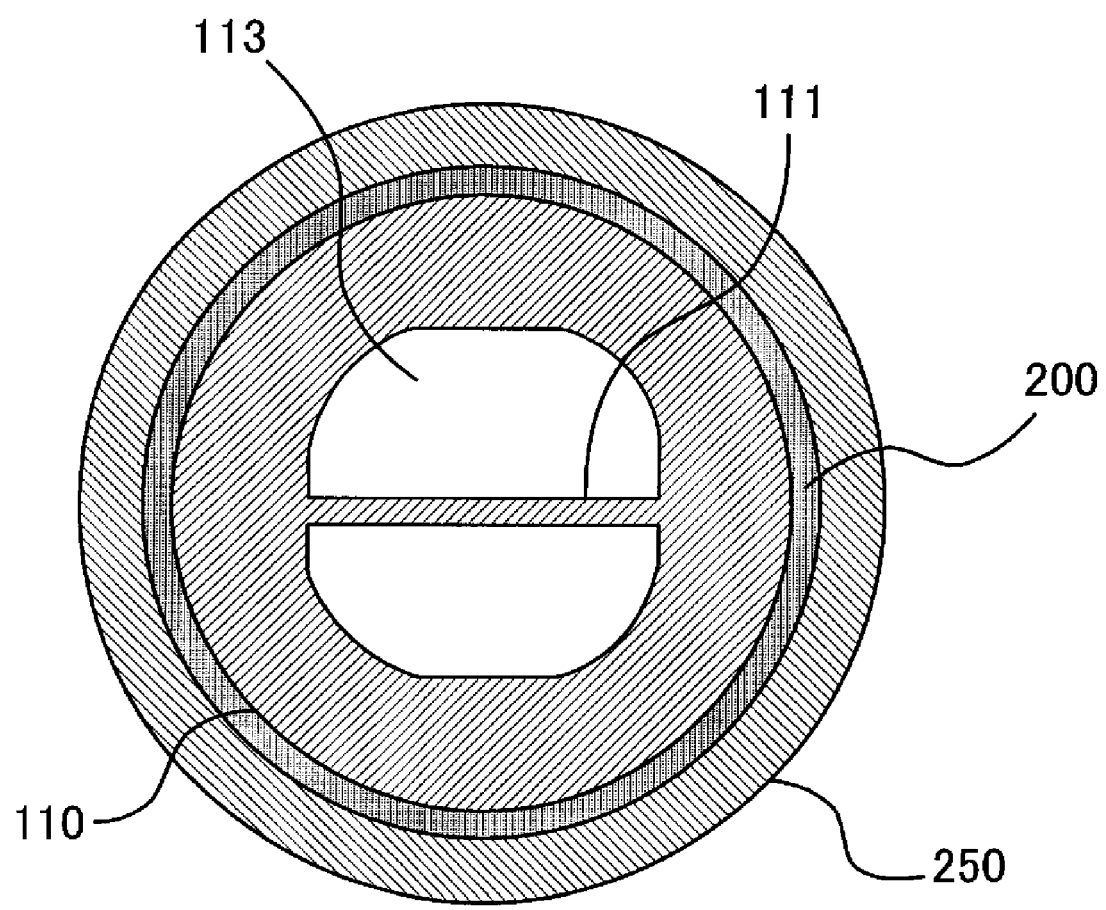
FIG. 3 is a schematic cross sectional view of a pressure sensor unit using a CQG.

In a piezoelectric crystal pressure gauge, such as the Compensated Quartz Gauge (CQG) described in U.S. Pat. No. 4,547,691 (the entire contents of which are hereby incorporated herein by reference), a similar phenomenon as described above occurs when the CQG is subjected to a sudden pressure variation. As shown in FIGS. 2 and 3, the pressure sensor unit includes a quartz pressure gauge 100, oil 200 as a pressure medium and packaging 250 made of, for example, a nickel based alloy. The quartz pressure gauge 100 comprises a cylindrical quartz body 110 and two quartz end caps 120, 130. A quartz resonator 111 is located at an inner portion of the quartz body 110. The gray area on the body surface shown in FIG. 2 is an electrode 112 for the resonator. Each part experiences adiabatic temperature change depending on its material property.

The following thermal dynamics formula describes the adiabatic temperature change:

$$\frac{dT}{dp} = T\frac{\frac{1}{V}\left[\frac{\partial V}{\partial T}\right]_p}{\rho C_p} \quad (1)$$

where T represents temperature, p represents pressure, V represents volume, $\rho$ represents density, $C_p$ represents heat capacity at constant pressure, and the expression:

$$\frac{1}{V}\left[\frac{\partial V}{\partial T}\right]_p$$

represents thermal expansion coefficient at constant pressure.

Among the three major components of the CQG, oil plays a dominant role in the phenomenon because the oil has a much lower density and larger thermal expansion coefficient. For example, for a commercially available oil sample named Rhodorsil oil 550, temperature change due to an adiabatic pressure change of 5,000 psi at 100° C. is about 6° C. On the other hand, temperature for quartz changes only a thousandth of that.

The inhomogeneous temperature profile induces thermal expansion differences in the quartz. This causes thermal stress, which the pressure gauge mistakes as a pressure signal, because it cannot distinguish between pressure stress and thermal stress.

Figure 4A:
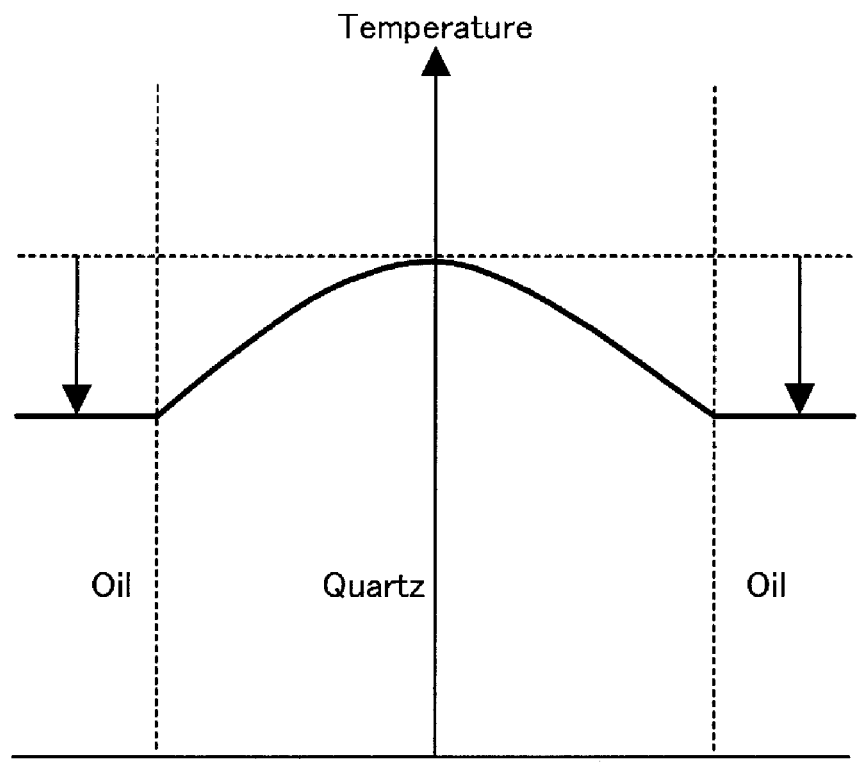
FIG. 4A is a graphical representation of temperature profile in the quartz body of a CQG and oil in an initial period after a pressure drop.
Figure 4B:
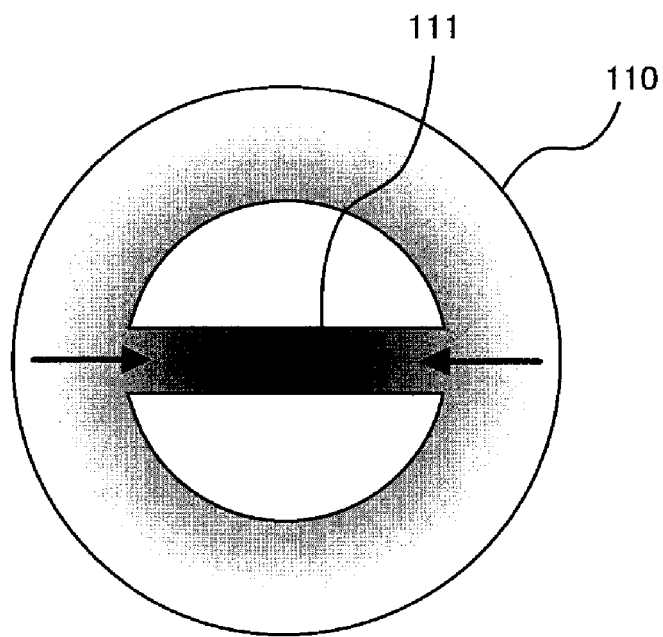
FIG. 4B is a schematic cross sectional illustration of the temperature distribution in the quartz body of the CQG in the initial period of FIG. 4A.
Figure 6A:
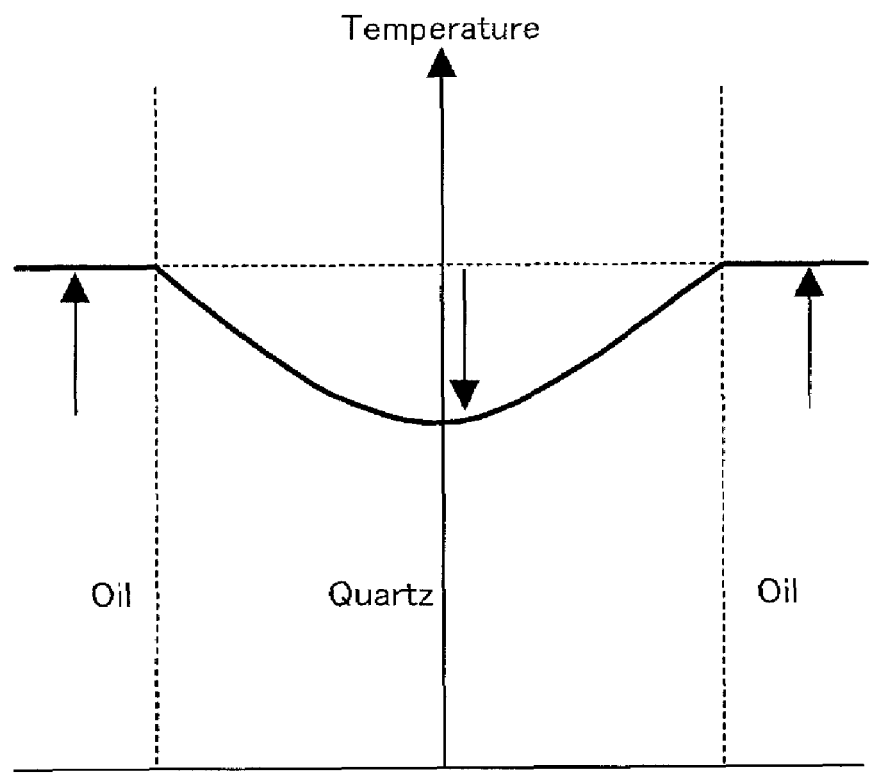
FIG. 6A is a graphical representation of temperature profile in the quartz body of the CQG and oil after the initial period depicted in FIG. 4A.
Figure 6B:
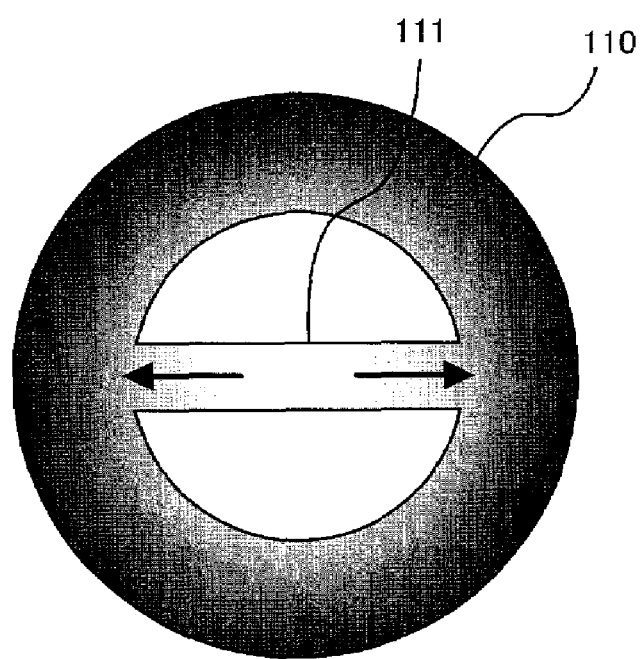
FIG. 6B is a schematic cross sectional illustration of the temperature distribution in the quartz body of the CQG after the initial period depicted in FIG. 4A.

The dynamic pressure response error due to the foregoing thermal stress for the CQG can be qualitatively interpreted as follows. Immediately after the oil temperature drops due to an adiabatic pressure drop, the surface temperature of the quartz body 110 is cooled down, but the temperature of the quartz resonator 111 has not yet responded due to thermal mass, as shown in FIGS. 4A and 4B. This induces compressive thermal stress at the center of the resonator 111, as indicated with arrows in FIG. 4B. The pressure gauge regards this phenomenon as an additional positive pressure. This positive response error is indicated as a hatched area 5-A in FIG. 5. The line 5-C in FIG. 5 is a pressure response curve same as the line 1-B in FIG. 1. Thereafter, the oil temperature recovers quite quickly to the environmental temperature by receiving heat from the housing and the quartz body 110, as shown in FIGS. 6A and 6B. The center temperature of the quartz resonator 111 is pulled down by loss of heat at the surface. This induces tensile thermal stress at the center of the resonator 111, as indicated with arrows in FIG. 6B. The pressure gauge regards this phenomenon as an additional negative pressure. This negative response error is indicated as a hatched area 5-B in FIG. 5.

Pressure disturbance propagates at the acoustic velocity of the medium (oil in this case), if no delay exists due to the oil viscosity in a narrow pressure path. The pressure response is much shorter than one second in this laboratory set-up. So almost all of the dynamic response error observed in a pressure gauge is attributed to the thermal stress. In this, applicants recognized that by modeling the thermal stress, dynamic response error could be corrected to obtain a correct pressure response, as represented by line 5-D shown in FIG. 5.

Based on the above, applicants discovered an improved method for dynamic correction of pressure measurements. In U.S. Pat. No. 5,394,345, discussed above, Equation 2 below provides the corrected pressure reading $P_{corrected}$, where $P_{raw}$ represents pressure readings before correction, $A_0$ represents a coefficient, $T(t+\tau)$ represents temperature measured after a time interval of duration $\tau$ has elapsed, and $T(t)$ represents temperature at instant t.

$$P_{corrected} = P_{raw} + A_0(T)[T(t+\tau) - T(t)] \qquad (2)$$

Considering the physical meaning of the pressure correction:

$$\Delta P = P_{corrected} - P_{raw} = A_0(T(t+\Delta t) - T(t)). \qquad (3)$$

Heat conduction phenomena are governed by the following physical principle:

$$\frac{\partial T(x, t)}{\partial t} = \kappa \frac{\partial^2 T(x, t)}{\partial x^2} \qquad (4)$$

where $\kappa$ represents heat diffusivity and "x" represents space variable.

Although for simplicity only a one-dimension exemplary case is described here, the following explanation does not change in a three-dimension case.

Equation 4 is converted into a difference equation in the same manner as in numerical computation.

$$\frac{T(x, t+\Delta t) - T(x, t)}{\Delta t} = \frac{\kappa}{\Delta x^2}\begin{pmatrix} T(x+\Delta x, t) - T(x, t) - \\ (T(x, t) - T(x-\Delta x, t)) \end{pmatrix} \qquad (5)$$

$$= \frac{2\kappa}{\Delta x^2}\begin{pmatrix} \frac{T(x+\Delta x, t) + T(x-\Delta x, t)}{2} - T(x, t) \end{pmatrix}$$

The pressure correction term $\Delta P = A_0(T(x, t+\Delta t) - T(x, t))$ is proportional to:

$$\frac{T(x+\Delta x, t) + T(x-\Delta x, t)}{2} - T(x, t).$$

Figure 7:
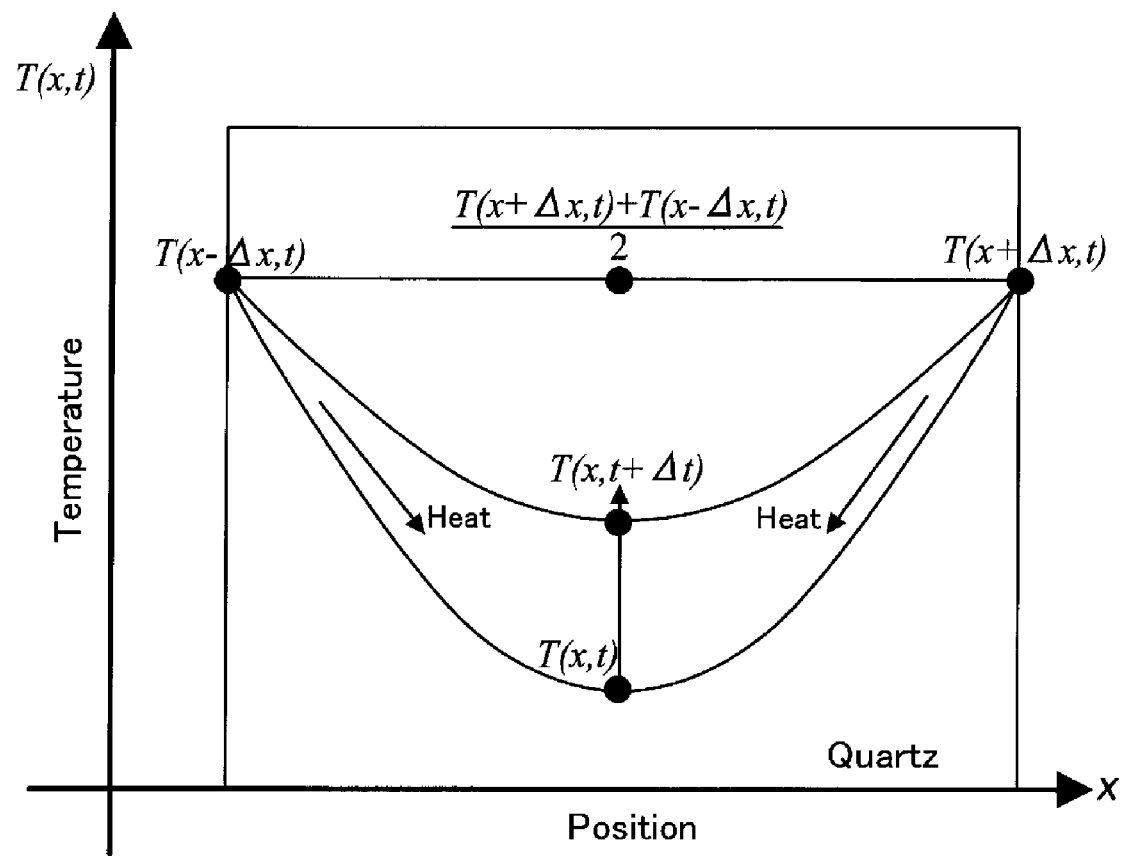
FIG. 7 is a graphical representation of how to translate temperature change in time into a temperature gradient around the center of a quartz resonator.

In the last term, temperature at a position x (the center of the resonator) is compared with an average of temperatures around the position x, as shown in FIG. 7. If the averaged temperature in the neighborhood is higher than that at the position x, the pressure correction $\Delta P = A_0(T(x, t+\tau t) - T(x, t))$ has a positive sign; the temperature at the position x increases in time, because heat flows into the portion at position x from the neighboring portion. In this, the conventional algorithm above assumes that the temperature change rate is proportional to the temperature gradient and to the thermal stress.

Applicants recognized assumptions that are inherent in the above conventional method for thermal correction of pressure measurements and cause overshoot or undershoot error to remain after dynamic pressure compensation in cases where oil temperature changes rapidly.

Figure 8:
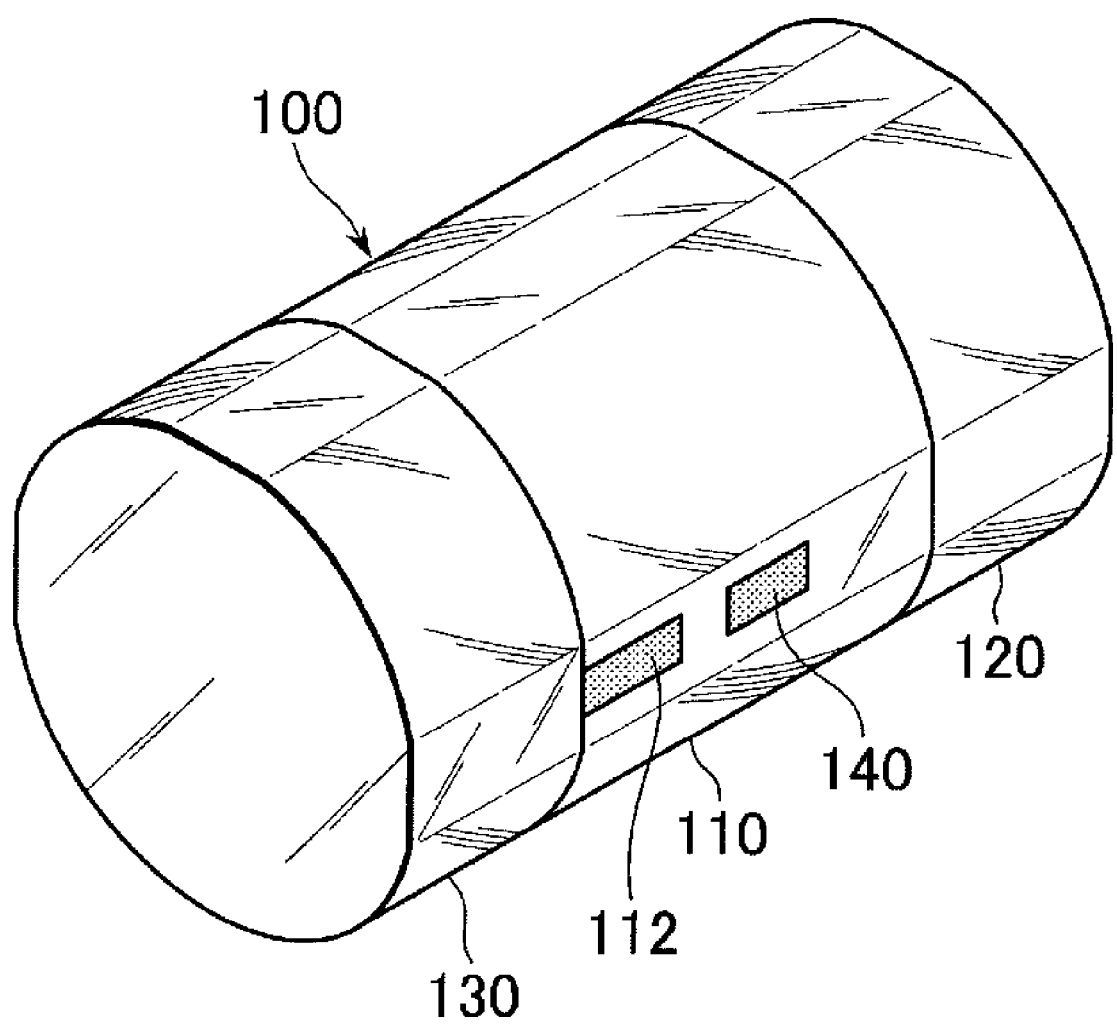
FIG. 8 is a perspective view of a quartz pressure gauge according to one embodiment of the present invention.

FIG. 8 shows a quartz pressure gauge 100 used in one embodiment according to the present invention in which a CQG is configured with three quartz parts that are assembled to form the pressure gauge. Dynamic pressure response error is caused by thermal stress, which is a function of the temperature profile in the quartz parts. Applicants investigated the heat conduction in the quartz parts to determine a temperature profile and its transient behavior. Furthermore, applicants considered the relationship between the temperature profile and thermal stress in the quartz pressure gauge.

Figure 9:
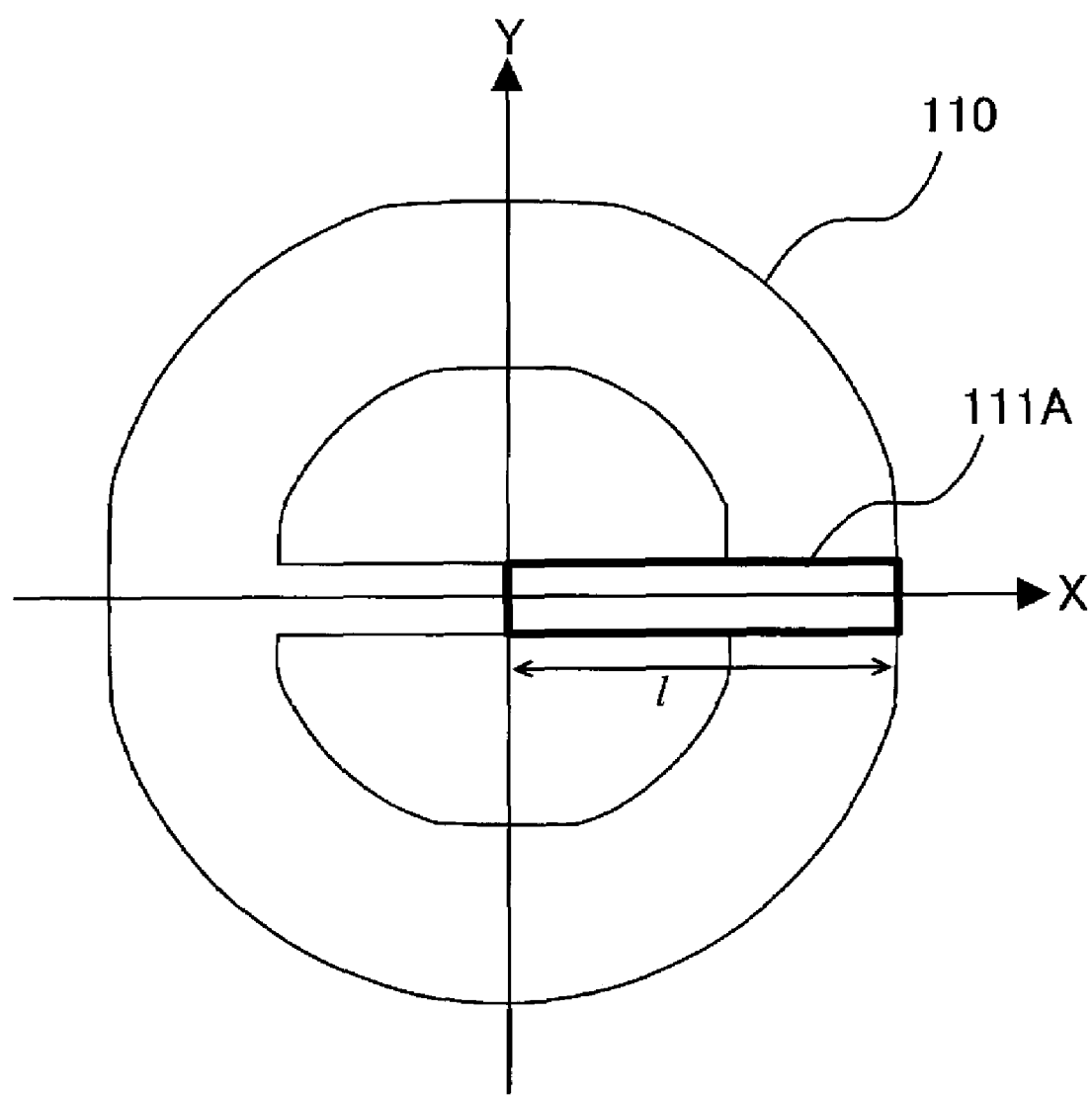
FIG. 9 is a schematic cross sectional view of the quartz body of a CQG.
Figure 10:
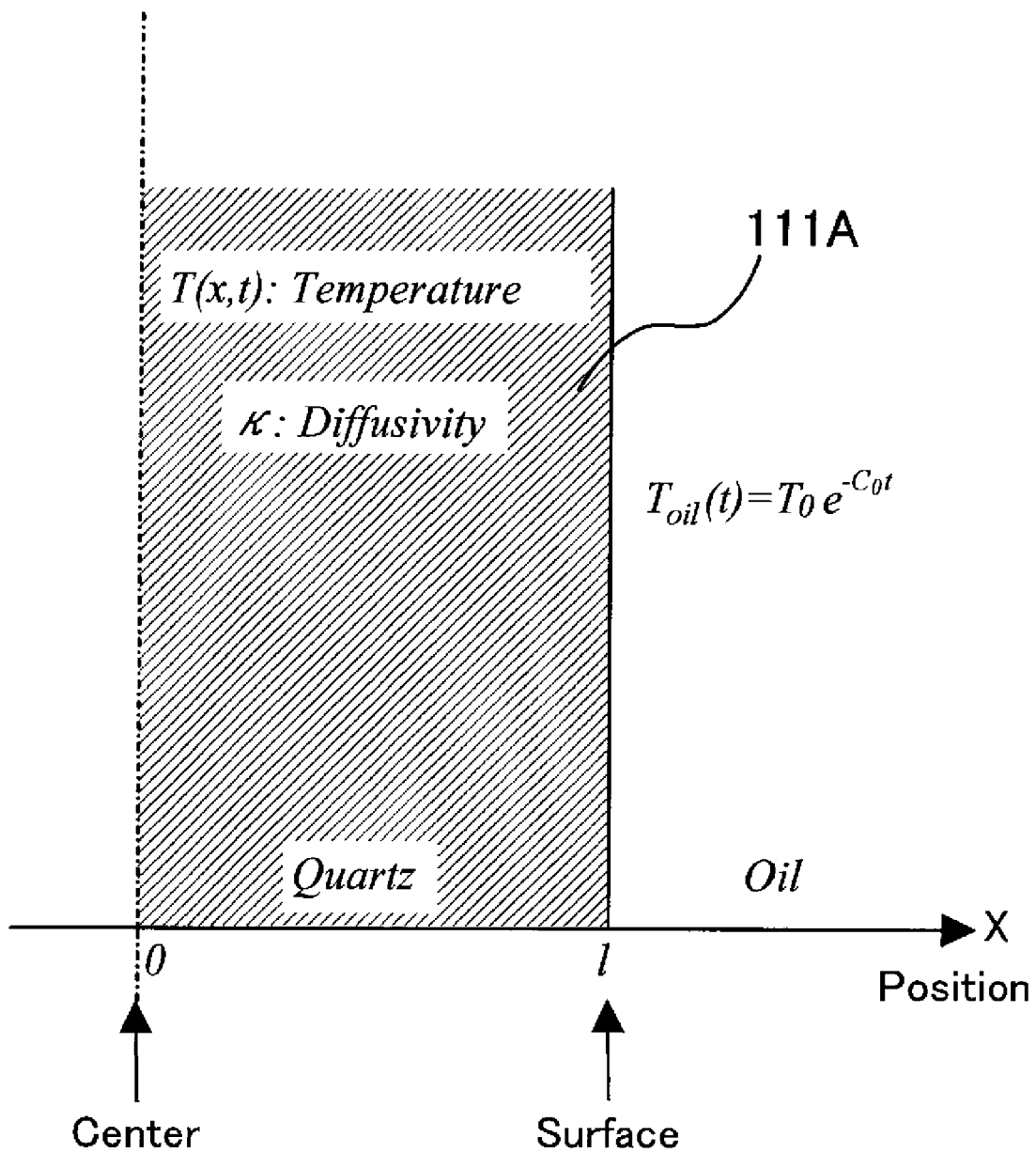
FIG. 10 shows in a graph a one-dimensional heat conduction model used for calculating temperature profile in the quartz body of a CQG and oil.
Figure 11:
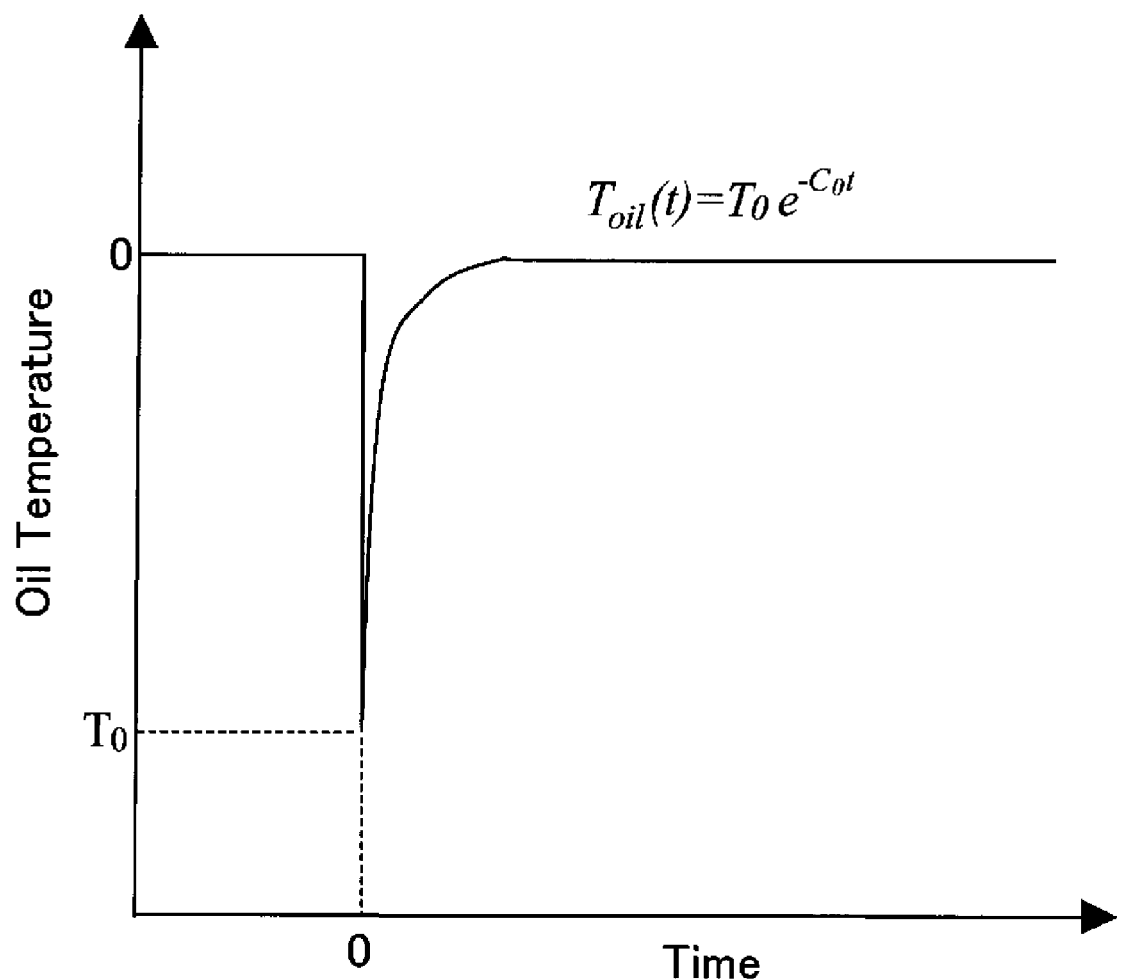
FIG. 11 is a graph of variation of oil temperature used in the heat conduction model of FIG. 10.

The CQG pressure gauge includes three parts as shown in FIGS. 2 and 8. The resonator 111, the sensing element, is located inside the body 110, as shown in FIG. 3. Referring to FIG. 9, the resonator 111 is assumed to be a rectangular quartz plate 111A with thickness of 1 mm and length of "l". Thus, a one-dimensional model is considered as the first approximation for heat conduction and generation of thermal stress. In this model, it is assumed that the quartz material constants, for example, $\kappa$: thermal diffusivity, are isotropic in a quartz plate 111A, as shown in FIG. 10, and that the temperature of the oil $T_{oil}(t)$ changes in the form of an exponential function with a relaxation time $1/C_0$, as shown in FIG. 11.

The heat conduction equation is $$\frac{\partial T(x, t)}{\partial t} = \kappa \frac{\partial^2 T(x, t)}{\partial x^2}. \qquad (6)$$

An initial condition is $$T(x,t) = 0,\ 0 \leq x < l. \qquad (7)$$

Boundary conditions are $$\kappa \frac{\partial T(0, t)}{\partial x} = 0,\ 0 \leq t < \infty, \qquad (8)$$

$$T(l, t) = T_0 e^{-C_0 t}, \qquad (9)$$

where $T_0$ represents oil temperature drop due to pressure drop under adiabatic condition and "l" represents surface position of the quartz in the x-axis.

For simplification, the initial temperature of the quartz plate 111A is set at 0 and a solution for any initial temperature may be derived by adding the actual initial temperature to the solution. The boundary condition of Equation 8 expresses that no heat flow exists at the center position, x=0, because it is the symmetry point.

Equation 6 is Laplace transformed into an ordinary differential equation. The solution is Inverse Laplace transformed by conducting a complex integration. In this case, since the solution of the Laplace transformed equation contains a hyperbolic function in the denominator, an infinite number of poles exist, the exact solution expressed with Equation 10 contains an infinite series of functions of the variables x and t.

$$T(x, t) = \qquad (10)$$

$$T_0 \frac{\kappa \pi}{l^2} \sum_{n=0}^{\infty} (-1)^n (2n+1) \cos\left[\frac{(2n+1)\pi}{2l} x\right] \frac{e^{-C_0 t} - e^{-\frac{\kappa(2n+1)^2 \pi^2}{4l^2} t}}{\frac{\kappa(2n+1)^2 \pi^2}{4l^2} - C_0},$$

where n represents an integer.

Figure 12:
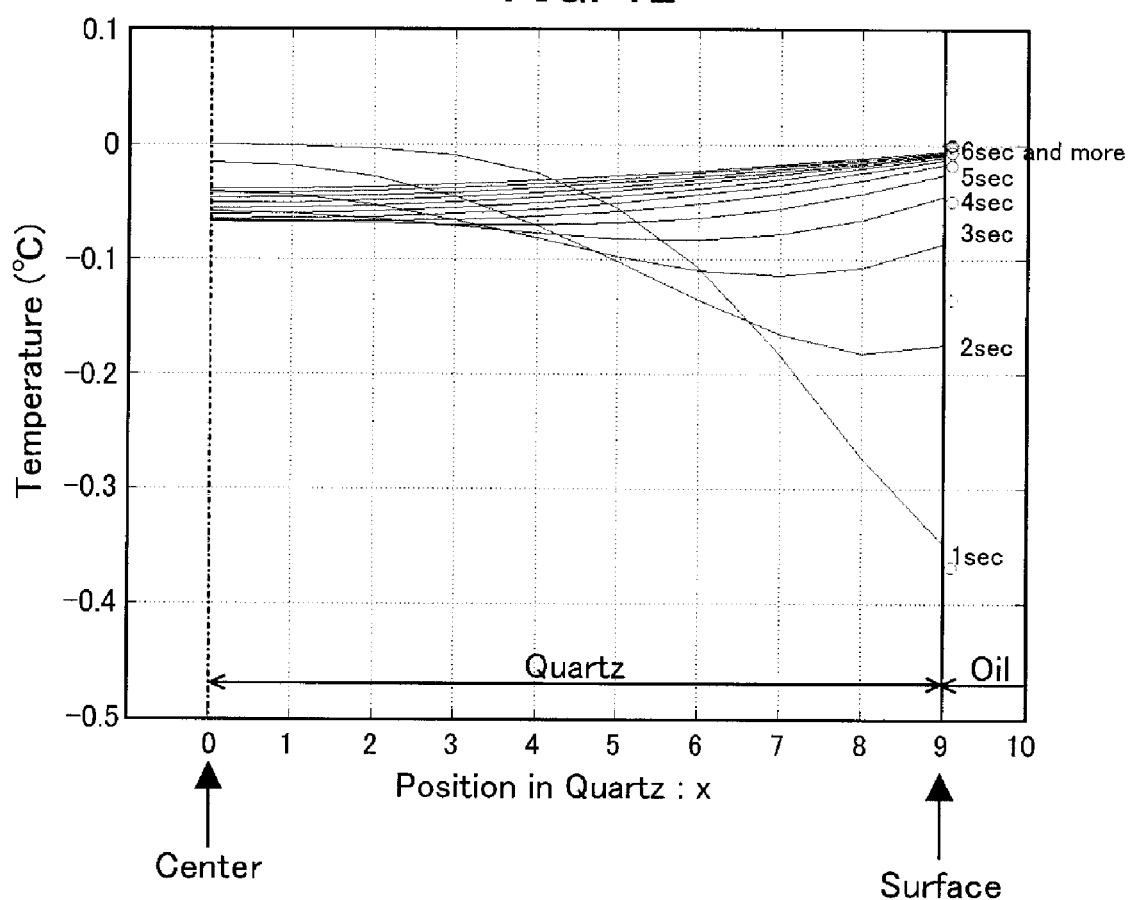
FIG. 12 is a graph of a computed temperature profile in the quartz body of the CQG.

Equation 10 is numerically evaluated for several positions of x and times, as shown in FIG. 12, using Equation 10':

$$T(x, t) = T_0 \frac{\kappa \pi}{l^2} \sum_{n=0}^{Ns} (-1)^n (2n+1) \cos\left[\frac{(2n+1)\pi}{2l} x\right] \frac{e^{-C_0 t} - e^{\frac{\kappa(2n+1)^2 \pi^2}{4l^2} t}}{\frac{\kappa(2n+1)^2 \pi^2}{4l^2} - C_0}, \quad (10')$$

and the following material constants: thermal diffusivity of quartz, $\kappa = 4.2560 \times 10^{-6}$ m$^2$/sec, $C_0 = 1$ sec$^{-1}$, $T_0 = -1°$ C. and l=10.5 mm (radius of the quartz body of the CQG). The terms in Equation 10' are summed up to appropriate number Ns by considering following points:

(A) the length of an impulse response should be less than the data length, and (B) in any case, a large indexed term can be negligible.

Circles in FIG. 12 represent the oil temperature. The elapsed times correspond to the quartz temperature curves. One second after the adiabatic compression of the oil, the oil temperature returned from $-1°$ C. to $-0.4°$ C. The temperature near the surface is pulled down by the oil temperature, but the quartz temperature at the center has not responded yet.

In the measured dynamic pressure error in FIG. 1, the previously proposed compensation algorithm (Equation 2 above) becomes effective after the overshoot peak that corresponds to around a 6 second time position in FIG. 12. At that time, the temperature gradient starts becoming constant.

Figure 13:
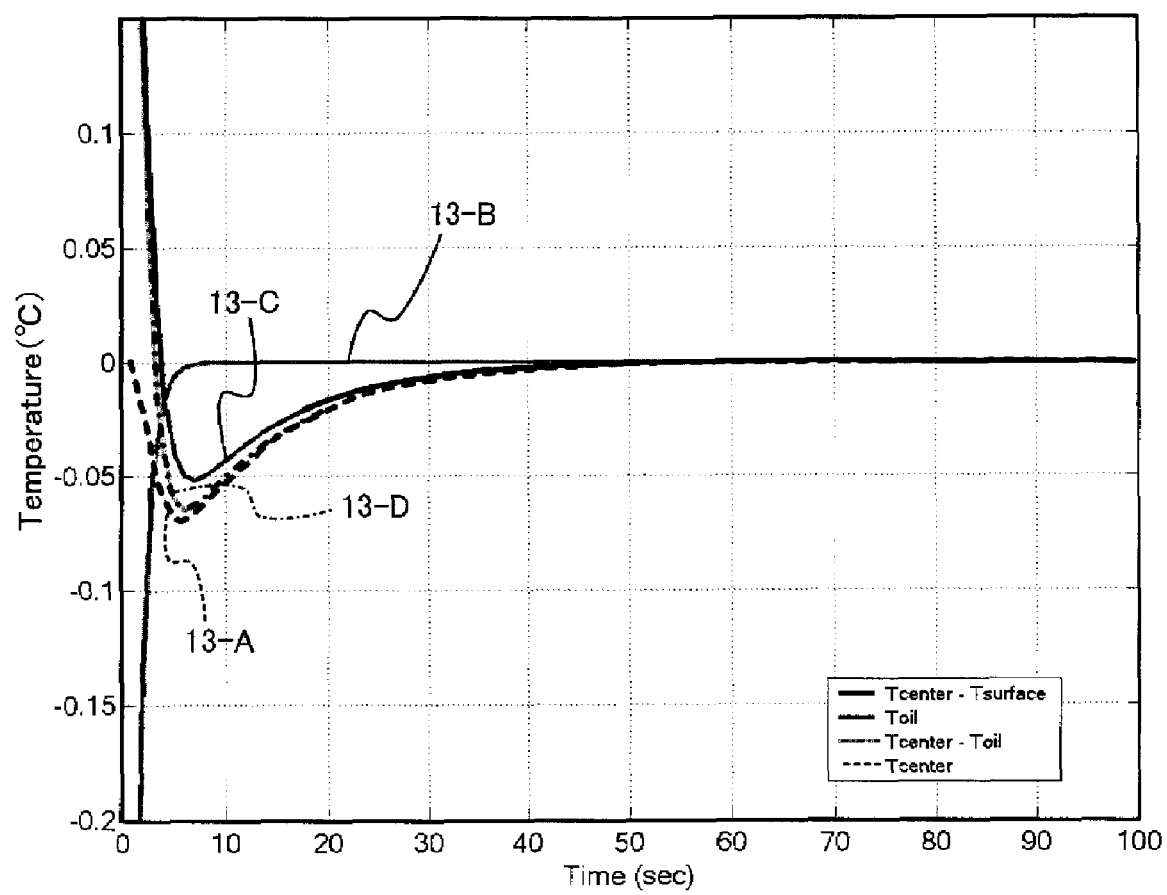
FIG. 13 is a graph of temperature transient behaviors at the center of the resonator quartz plate of the CQG and in the oil.

Applicants recognized how proportional a two-point temperature gradient is to the dynamic pressure error, because the conventional dynamic compensation algorithm assumes such proportionality. FIG. 13 represents transient behaviors at the center (curve 13-A) and surface position (curve 13-B) and two-point temperature gradients. The temperature gradients are calculated as:

Tcenter–Tsurface: the center temperature minus the surface temperature (curve 13-C), and Tcenter–Toil: the center temperature minus the oil temperature (curve 13-D).

Both the two-point temperature gradients (linear with regard to x) appear proportional to the dynamic pressure response error, i.e., overshoot. The overshoot peak is, however, at an earlier time position than the real data (refer to FIG. 1) probably because the real oil temperature response is not a simple exponential function with a single relaxation time.

Figure 14A:
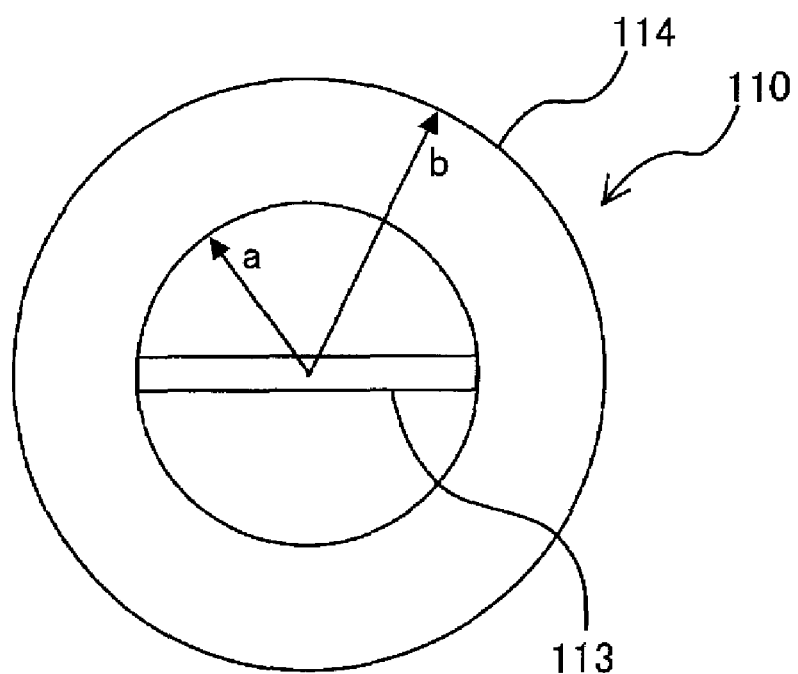
FIG. 14A is a schematic cross-sectional view of the quartz body used in a thermal stress model.
Figure 14B:
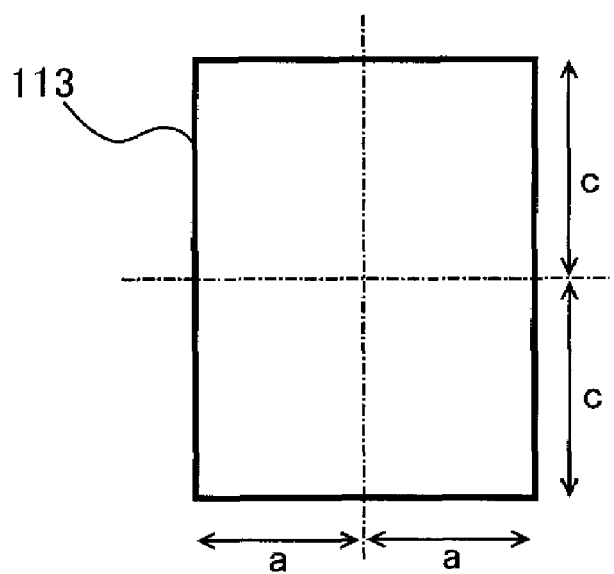
FIG. 14B is a schematic plan view of the resonator plate of the quartz body of the CQG.

Applicants devised a two dimensional (2D) analytic model to determine the relationship between a given temperature profile in the quartz plate and thermal stress in the resonator based on a cross-section perpendicular to the cylinder axis (note FIG. 3) and with the assumption that thermal expansion coefficient is isotropic. In this model, a CQG is regarded as a structure consisting of two parts: a rectangular resonator plate 113 and a circular hollow cylinder 114, as shown in FIGS. 14A and 14B. In FIG. 14A, "a" represents the inner radius of cylinder 114 and "b" represents the outer radius of cylinder 114. In FIG. 14B, "c" represents the half-length of the plate 113.

Each part 113, 114 suffers thermal expansion depending on an associated temperature profile. If they are not connected to each other and kept free from outer forces, the inner radius of the cylinder 114 changes by $U_C$ and the resonator plate length changes by $2U_R$. When the resonator plate 113 and the cylinder body 114 are connected, as shown in FIG. 14A, their displacements are restricted so as to be identical. In consequence, $U_C$ becomes $U_C + \Delta U_C$, $U_R$ becomes $U_R + \Delta U_R$, where $\Delta U_C$ and $\Delta U_R$ are displacement change due to the restriction.

$$U_C + \Delta U_C = U_R + \Delta U_R. \quad (11)$$

$\Delta U_C$ and $\Delta U_R$ can be expressed by the force and stress applied to the cylinder and the resonator at the connection point.

$$\Delta U_C = \frac{F}{E_{eff}}, \Delta U_R = \frac{\sigma_R a}{E}, \quad (12)$$

where F represents force applied to the cylinder (N), Eeff represents an effective elastic constant of the cylinder (N/m), $\sigma_R$ represents stress in the resonator (N/m$^2$), E represents a Young's modulus of quartz (N/m$^2$).

Figure 15:
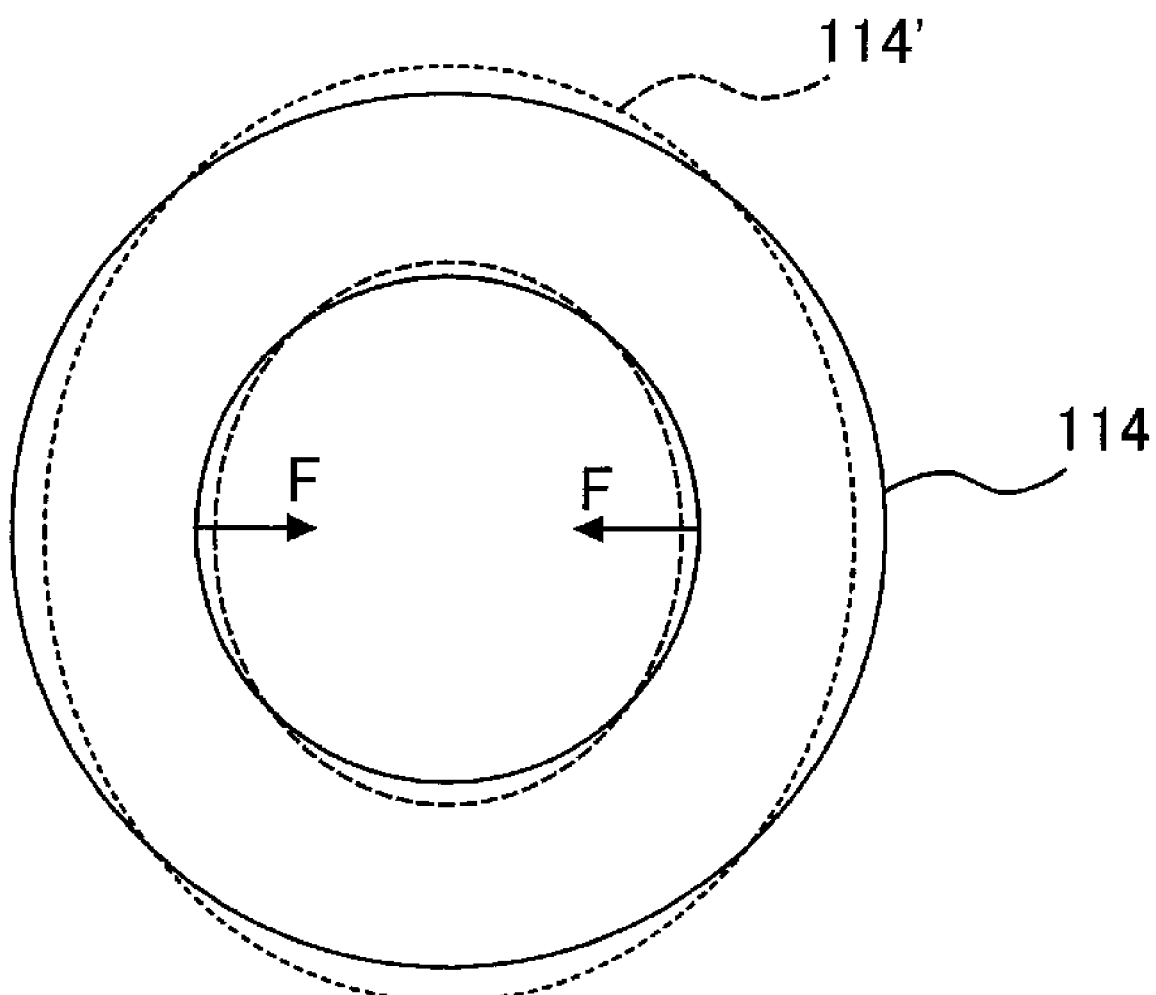
FIG. 15 is a schematic cross sectional view of the quartz body of the CQG illustrating cylindrical distortion by force F.

F is defined as the force applied to a point at the inner surface of the cylinder 114, as shown in FIG. 15, and $E_{eff}$ as the proportional constant between F and $\Delta U_C$. In FIG. 15, solid line 114 and broken line 114' show shapes of the cylinder before and after the distortion due to the force F, respectively.

Under no outer forces, these two forces, F and $\sigma_R$s, must be in balance, where "s" represents the area of the cross section of the resonator 113.

$$F = \sigma_R s \quad (13)$$

Re-writing Equation 11 using Equations 12 and 13, it can be solved for $\sigma_R$.

$$U_C + \frac{\sigma_R s}{E_{eff}} = U_R + \frac{\sigma_R a}{E} \quad (14)$$

$$\sigma_R = \frac{U_C - U_R}{\frac{a}{E} - \frac{s}{E_{eff}}} \quad (15)$$

Considering temperature dependency of $\sigma_R$, an assumption is made that temperature dependencies of E and $E_{eff}$ are only through quartz elastic constants and negligible compared to those of $U_C$ and $U_R$, i.e., the uncoupled condition, so that only temperature dependencies of $U_C$ and $U_R$ are considered.

$U_R$ is the radius direction component of the displacement:

$$U_R = \int_0^a \alpha \Delta T(r) dr, \quad (16)$$

where $\Delta T$ represents temperature change along the radius direction, "r" represents radius variable, and $\alpha$ represents a thermal expansion coefficient of quartz.

Radial displacement of the hollow cylinder 114 due to thermal expansion is expressed with the following equation:

$$U_r = \frac{1+\nu}{1-\nu}\frac{\alpha}{r}\int_a^r \Delta T(r) r\, dr + C_1 r + \frac{C_2}{r} \quad (17)$$

where $\nu$ represents Poisson's ratio.

When r=a, the first term of the right hand of Equation 17 vanishes and then, $$U_C = C_1 a + \frac{C_2}{a} \quad (18)$$

where $$C_1 = \frac{(1+\nu)(1-2\nu)}{1-\nu}\frac{\alpha}{b^2-a^2}\int_a^b \Delta T(r) r\, dr - \frac{2\alpha\nu}{b^2-a^2}\int_a^b \Delta Tr\, dr, \quad (19)$$

$$C_2 = \frac{1+\nu}{1-\nu}\frac{\alpha a^2}{b^2-a^2}\int_a^b \Delta T(r) r\, dr. \quad (20)$$

When the temperature profile is a linear function of the radial variable "r", it can be shown that $\sigma_R$ is proportional to the temperature difference between the center of the resonator 113 and the surface of the cylinder body 114. Hence, it is sufficient to prove only that the integrals $$\int_0^a \Delta T(r)\, dr \text{ and } \int_a^b \Delta T(r) r\, dr$$

are proportional to the temperature difference. Suppose that a linear temperature profile in the radial direction of the cylinder is $$T(r)=\gamma r + T_0, \quad (21)$$

where $\gamma$ represents a proportional constant and $T_0$ represents temperature at the center of the resonator.

The temperatures at the points a (the inner surface of the cylinder body 114) and b (the outer surface of the cylinder body 114) are $$T(a)=\gamma a + T_0, \quad (22)$$

$$T(b)=\gamma b + T_0. \quad (23)$$

The integral of $U_R$ is $$\int_0^a \Delta T(r)\, dr = \int_0^a (T(b) - T_0)\, dr$$
$$= \int_0^a \gamma b\, dr$$
$$= \frac{\gamma}{2} a^2$$
$$= \frac{a}{2}\gamma a$$
$$= \frac{a}{2}(T(a) - T_0).$$

T(a) can be expressed with T(b) as follows:

$$T(a) - T_0 = \frac{a}{b}(T(b) - T_0). \quad (24)$$

$$\int_0^a \Delta T(r)\, dr = \frac{a^2}{2b}(T(b) - T_0) \propto (T(b) - T_0). \quad (25)$$

The integral of $U_C$ is $$\int_a^b \Delta T(r) r\, dr = \int_a^b (T(r) - T_0) r\, dr$$
$$= \int_a^b (\gamma r + T_0 - T_0) r\, dr$$
$$= \frac{\gamma}{3}(b^3 - a^3)$$
$$= \frac{\gamma}{3}(b^3 - a^3)$$
$$= \frac{\gamma}{3}(b-a)(b^2 + ab + a^2)$$
$$= \frac{1}{3}(b-a)(b(\gamma b) + a(\gamma b) + a(\gamma a)).$$

Using Equations 22 and 23, $$\int_a^b \Delta T(r) r\, dr = \frac{1}{3}(b-a)\begin{pmatrix}(T(b) - T_0) + a(T(b) - T_0) + \\ a(T(a) - T_0)\end{pmatrix} \quad (26)$$

$$= \frac{1}{3}(b-a)\begin{pmatrix}(T(b) - T_0) + a(T(b) - T_0) + \\ \frac{a^2}{b}(T(b) - T_0)\end{pmatrix}$$

$$= \frac{1}{3}(b-a)\left(1 + a + \frac{a^2}{b}\right) \quad (27)$$

$$(T(b) - T_0) \propto (T(b) - T_0).$$

Consequently $\sigma_R$ is proportional to the temperature difference between the center and the surface when the temperature is a linear function of the variable r.

For temperature profiles as a higher order polynomial function of r, even a parabolic function of r, $\sigma_R$ does not seem rigorously proportional to the temperature difference.

Next the thermal stress $\sigma_R$ needs to be converted into the resonance frequency and then into pressure readings of the CQG. The pressure and temperature dependency of the resonance frequency show that thermal stress $\sigma_R$ may have no global linearity to the pressure reading in the entire pressure and temperature ranges. However, the local linearity of $\sigma_R$ to the pressure reading in small ranges can be expected where dynamic response occurs. To cover the wider pressure and temperature ranges, the proportional constant as a function of pressure and temperature may be considered.

This result holds not only for a CQG but also for any other sensor structures to which Equation 16 or 17 is applicable.

Applicants conducted experiments to validate the modeling results using a CQG with a commercially available Resistance Thermal Device (RTD) installed in the oil inside a packaging. The CQG with an RTD was kept in an oven at 100° C. Pressure was decreased rapidly from 5,000 psi to atmospheric pressure. CQG pressure and CQG temperature, and the oil temperature were acquired every 1.253 seconds with a ceramic packaged Pt RTD having a diameter of 0.5 mm. In this, small size of the RTD is desirable for not only installation in a small space, but also for a quick response time. The Pt RTD used in the experiments has a specification of 0.4 second to reach to 90% of the true temperature amplitude in water.

Figure 16:
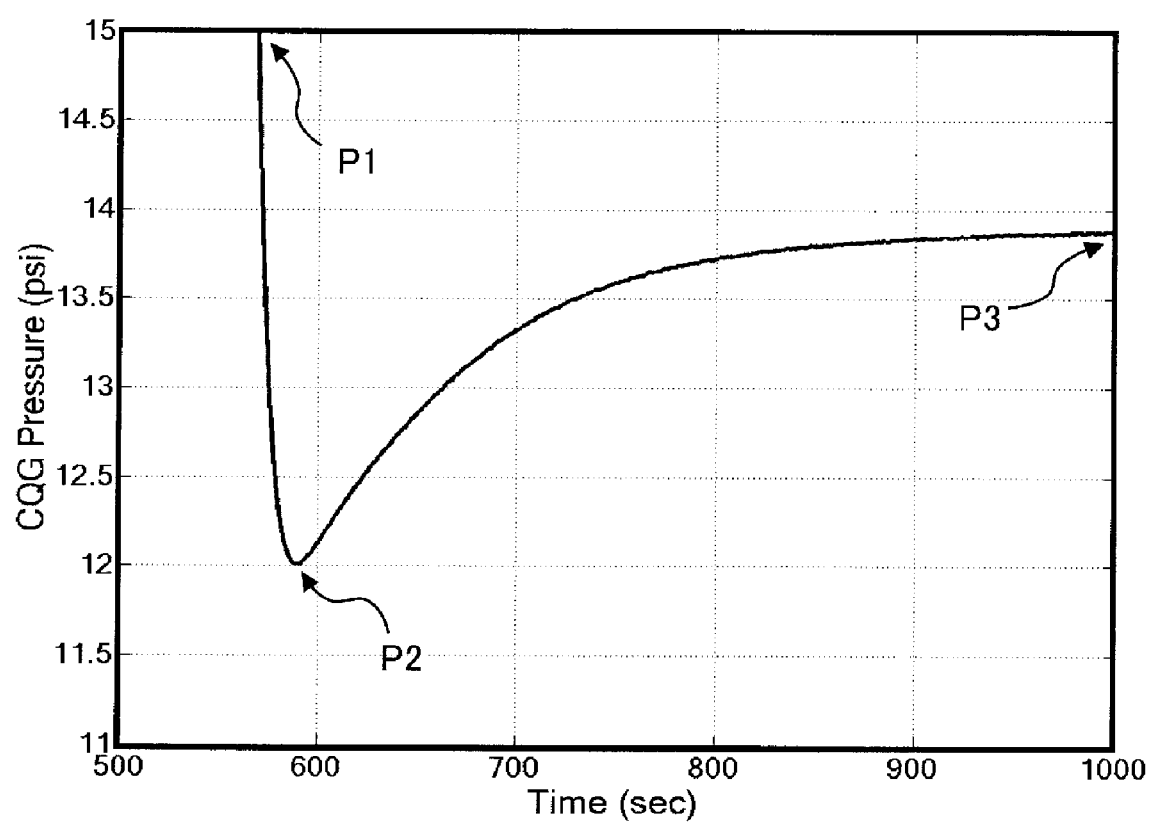
FIG. 16 is a graph of experimental raw pressure readings measured with a CQG after a pressure drop from 5,000 psi to atmospheric pressure at 100° C.
Figure 17:
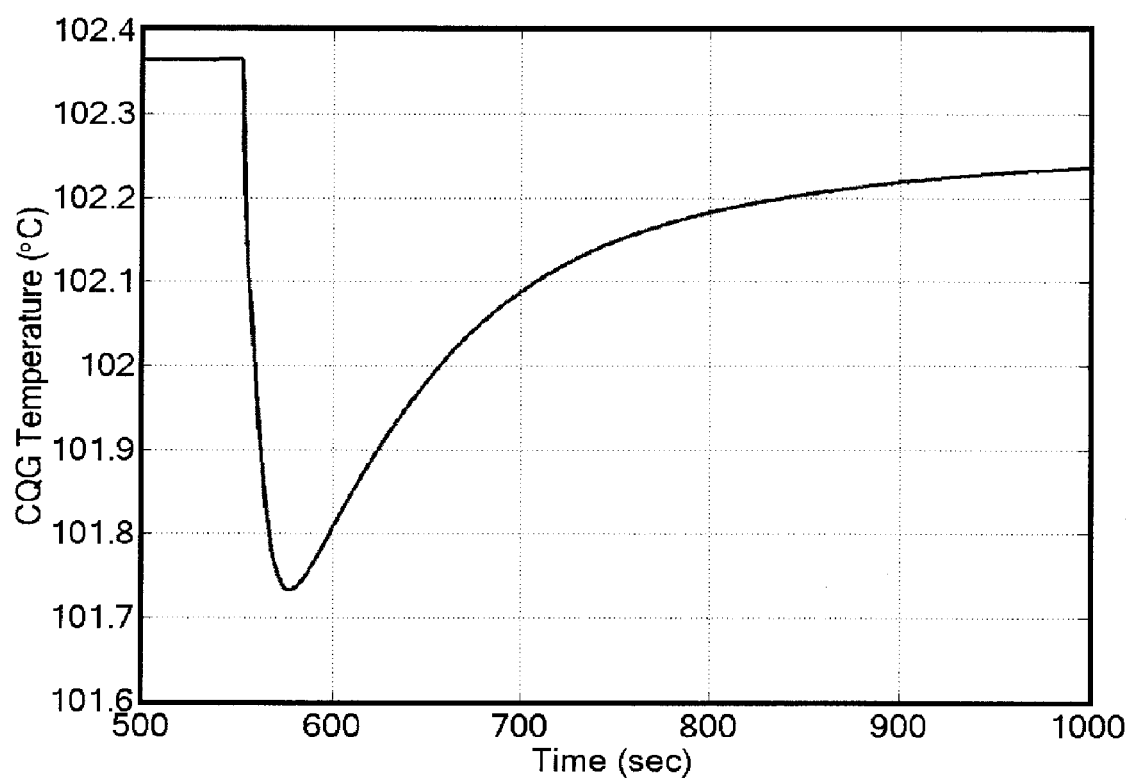
FIG. 17 is a graph of experimental raw CQG temperature readings after the pressure drop depicted in FIG. 16.
Figure 18:
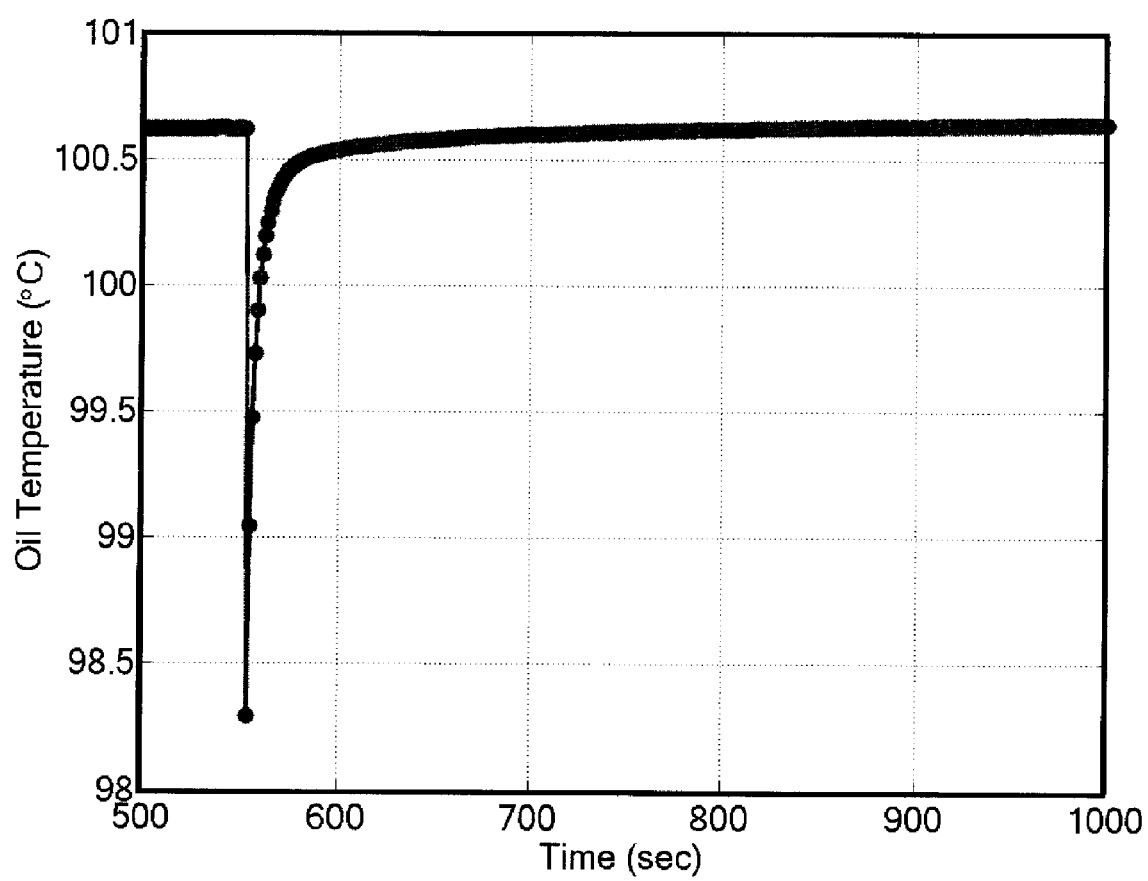
FIG. 18 is a graph of experimental raw oil temperature readings just after the pressure drop depicted in FIG. 16.

FIGS. 16 and 17 show the results of the CQG pressure and temperature responses, respectively. FIG. 18 shows experimental raw temperature of the oil surrounding the CQG in the packaging. Circles represent measured data points with the sampling time of 1.253 seconds. The actual response of the oil temperature to the adiabatic pressure drop was slightly different from the exponential function used in the model (refer to Equation 9) because the oil exchanges heat with not only the quartz body but also the metal housing in the experimental process. The adiabatic temperature change in this case was estimated with Equation 1 to be about $-6°$ C.

Figure 19:
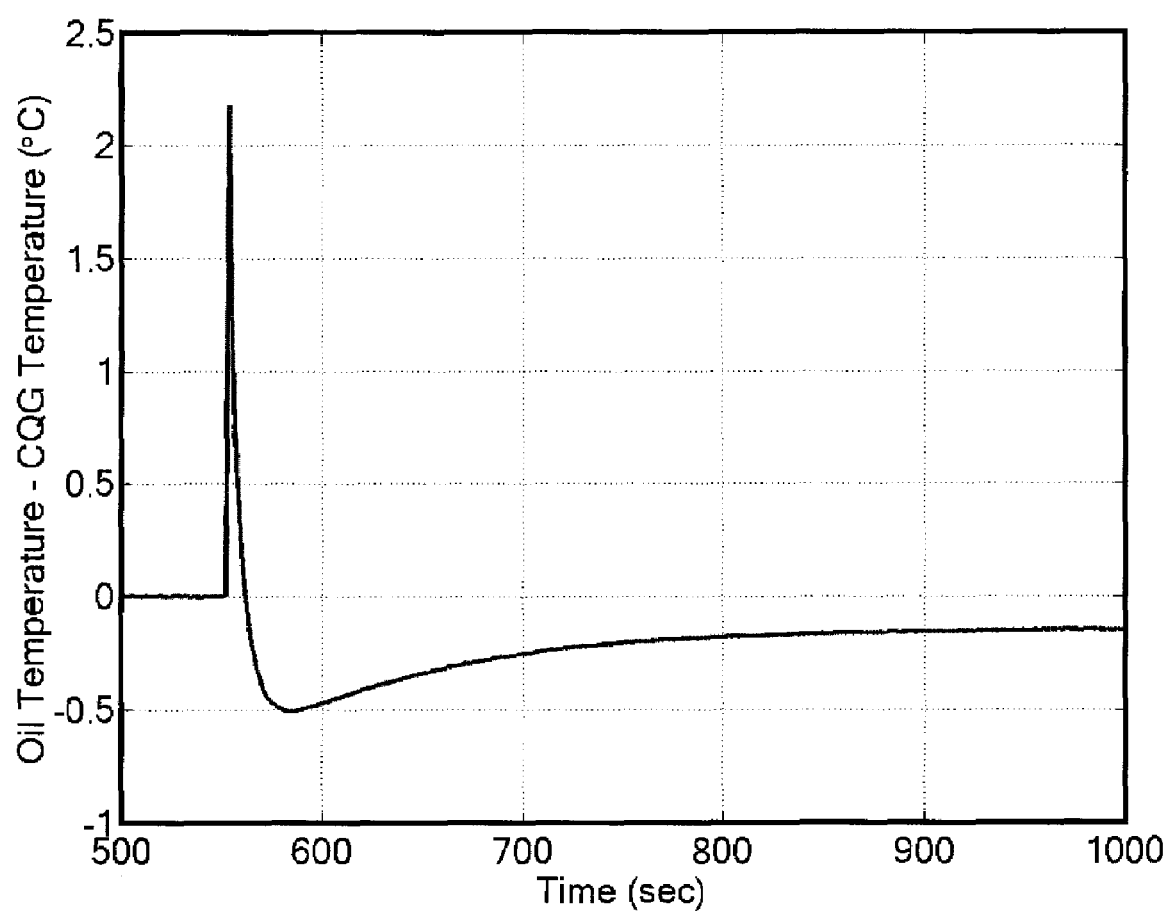
FIG. 19 shows a graph of differences between CQG temperature and oil temperature readings depicted in FIGS. 17 and 18.

FIG. 19 shows the difference between the CQG temperature readings and the oil temperature readings. An offset in temperature readings between the CQG and the RTD was corrected before the pressure change. The curve in FIG. 19 resembles those seen in FIGS. 1 and 13.

Figure 20:
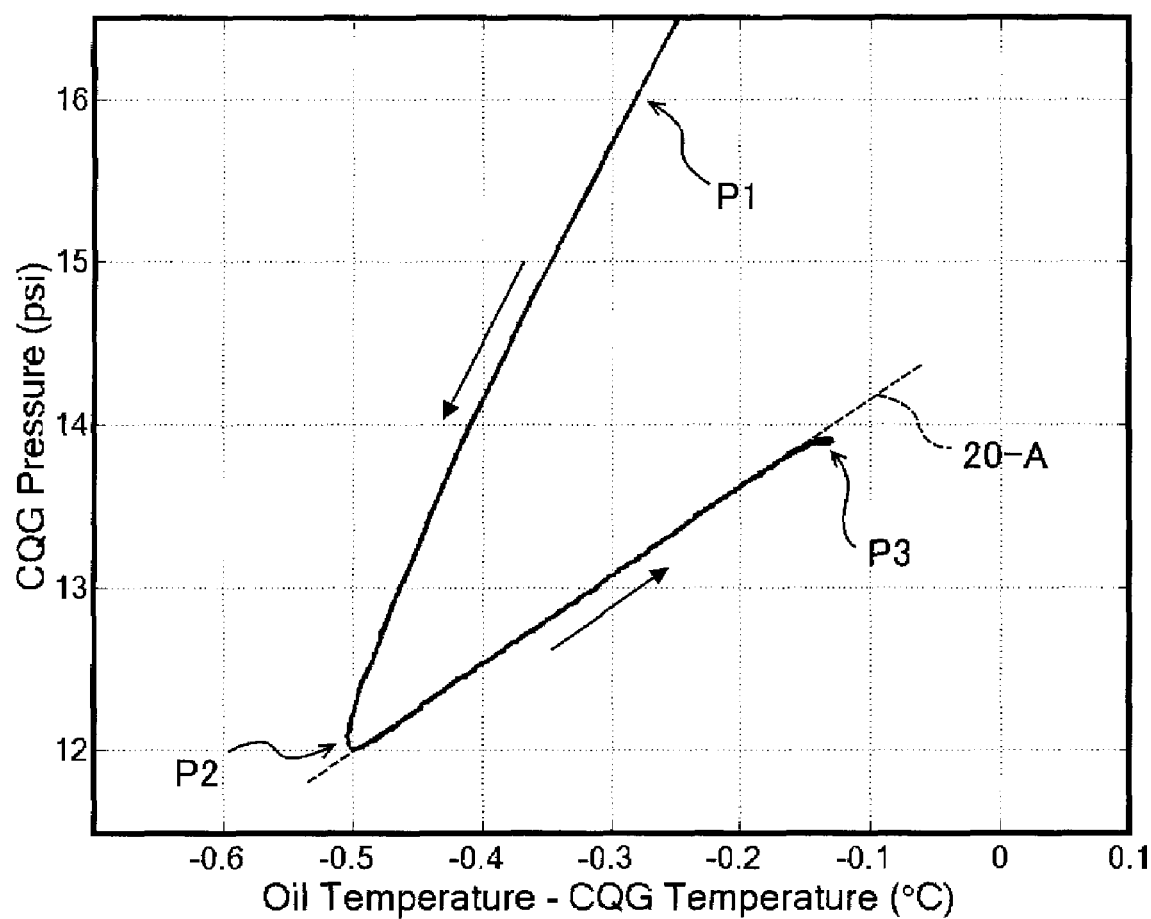
FIG. 20 is a graph of cross plot between CQG pressure readings and CQG temperature readings depicted in FIGS. 16 and 17.

Referring again to FIG. 16, the enlarged curve of overshoot and undershoot region in FIG. 19 may be seen. FIG. 20 shows the cross plot between the CQG pressure readings and the temperature differences between the CQG and the oil with the RTD. Arrows along the curve indicate the direction of time. The points indicated with P1, P2 and P3 correspond to the same time in both plots of FIGS. 16 and 20. This cross plot in FIG. 20 provides proportionality between the temperature difference and the dynamic response error, i.e., thermal stress.

FIG. 20 shows that there are two processes with a different proportional constant; one is the phase of the pressure going down from the initial pressure value to the minimum peak of the undershoot (from P1 to P2). The other is the phase of the pressure going up from the minimum peak to the final stabilizing pressure value (from P2 to P3). The interval data between the points P2 and P3 in the second phase fits very well to a straight broken line 20-A in FIG. 20, i.e., the temperature difference is quite proportional to the CQG pressure error. The scale factor (SF) was determined to be 5.26 psi/° C. from the slope of the line 20-A. The first phase (from P1 to P2) has a larger proportional constant (scale factor) and is slightly curved, i.e., not a straight line, due to the nonlinear temperature gradient in the quartz cylinder body near the surface in the initial phase, as discussed in the above-mentioned modeling.

Figure 21:
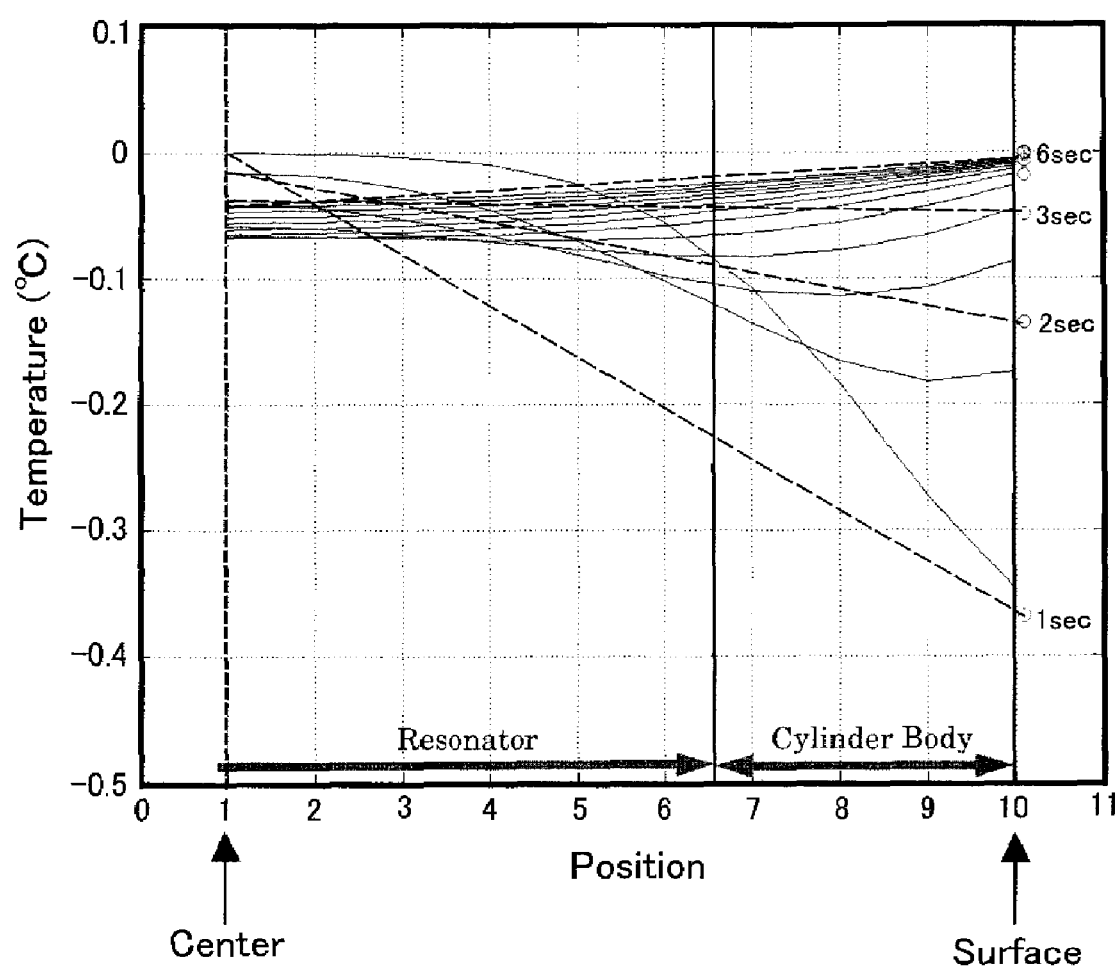
FIG. 21 is graph of two-point temperature gradients defined as the temperature difference between the center of the resonator and the oil.

In the first process, however, a two-point temperature gradient is an acceptable approximation of the real temperature profiles. FIG. 21 shows the two-point temperature gradients defined as the temperature difference between the center of the resonator and the oil. The elapsed times with circles correspond to the oil temperatures. In FIG. 21, the same simulation results as FIG. 13 are used to show how close the two-point temperature gradients are to each quartz temperature profile. Even for the initial non-linear temperature profiles at elapsed times 1, 2 and 3 seconds, the two-point temperature gradients are a good approximation.

In one embodiment of the present invention, dynamic thermal compensation of a dual-mode pressure gauge, such as the CQG, is achieved by knowing the temperature outside the quartz, for example, the oil temperature, and calculating the temperature difference between the gauge temperature and the oil temperature, i.e., a two-point temperature gradient. In this, embodiments of the present invention for thermal compensation of dynamic pressure measurements include measuring the quartz surface or oil temperature, or using an inverse heat conduction algorithm to estimate the quartz surface or oil temperature from the CQG temperature. Some embodiments of the present invention are described below in more detail.

In one embodiment of the present invention, a temperature sensor such as a thermometer, e.g., a Pt RTD (Resistance Thermal Device), is provided in the surrounding medium, e.g., oil, of the quartz pressure gauge and the raw pressure reading $P_{raw}$ is corrected by:

$$P_{corrected} = P_{raw} - SF \cdot (T_{INSIDE} - T_{OUTSIDE}) \quad (28)$$

where $P_{corrected}$ represents a corrected pressure reading, SF represents a scale factor as the coefficient in the correction term, $T_{gauge}$ represents temperature value measured with a pressure gauge, such as a CQG, and $T_{oil}$ represents temperature value measured with a thermometer.

Figure 22:
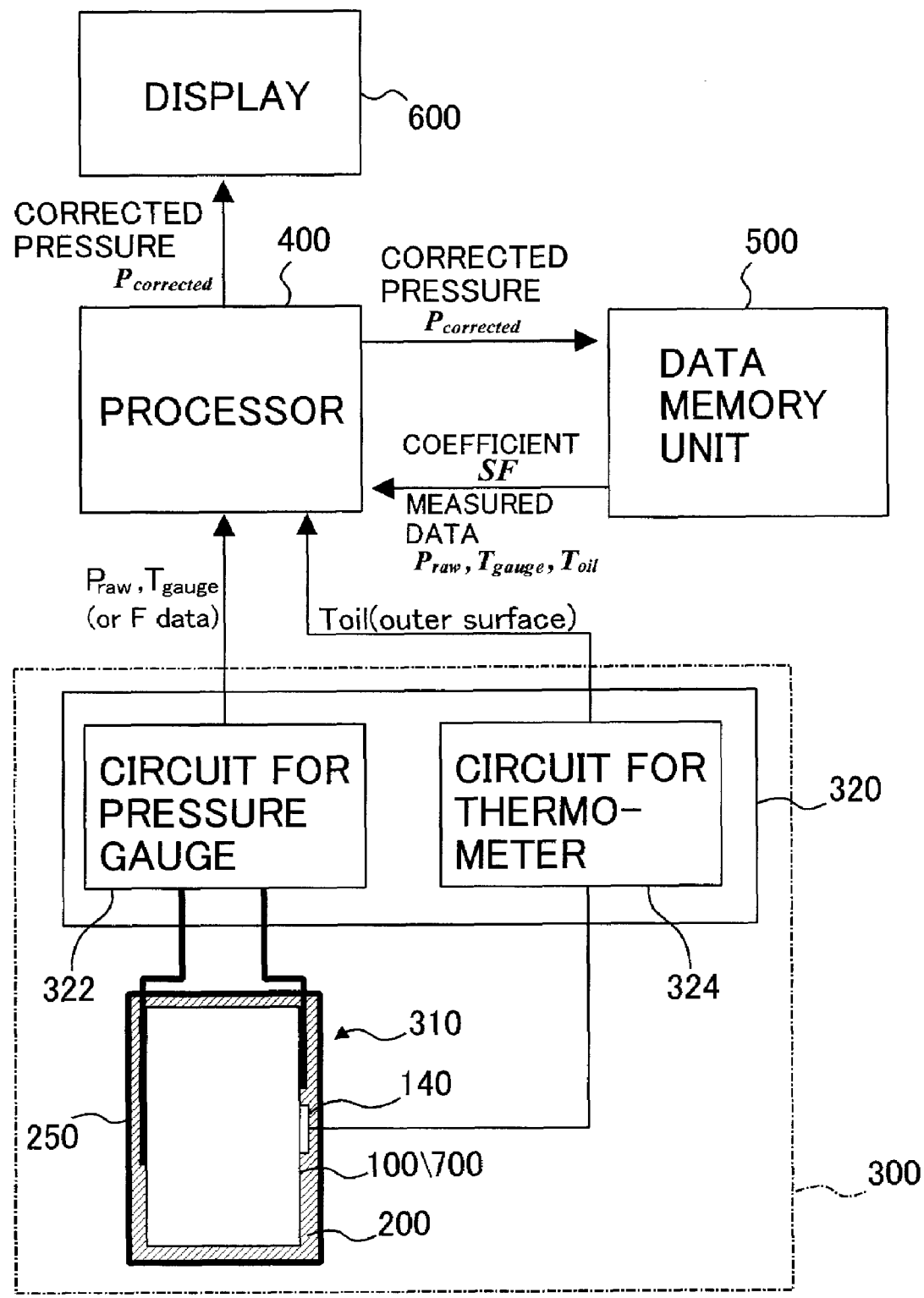
FIG. 22 is a block diagram of one system for thermal compensation of pressure measurements according to the present invention.
Figure 23:
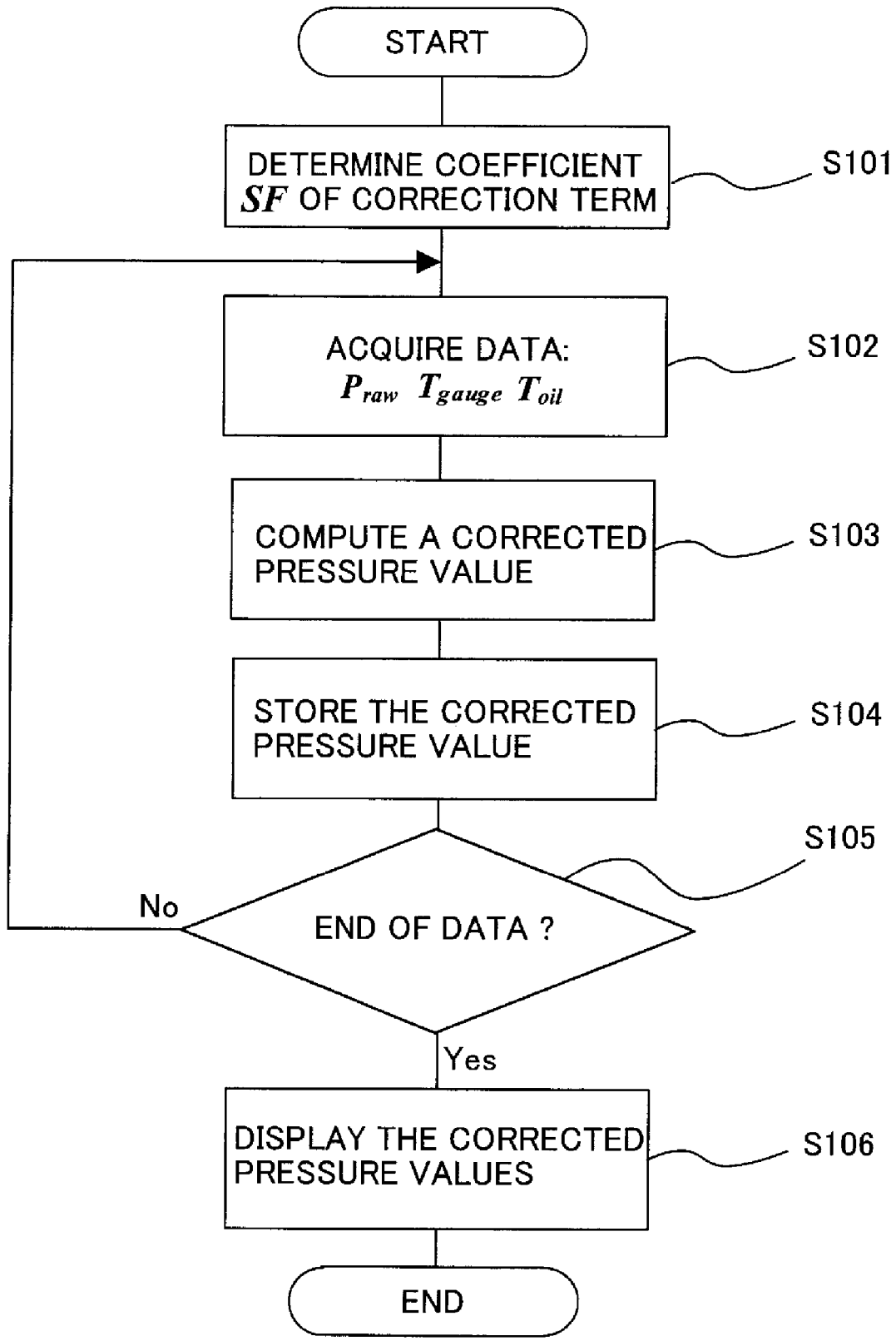
FIG. 23 is a flow chart of one method for thermal compensation of pressure measurements according to the present invention.

FIGS. 22 and 23 show embodiments of the present invention for thermal correction of pressure readings by a variety of pressure gauges. In this, the present invention contemplates applicability of the methods and systems disclosed herein to dual-mode and/or single-mode oscillating pressure gauges. Furthermore, the techniques disclosed herein may be applied to data acquired from stored data, i.e., data in a memory unit, or in real-time to data that are acquired from on-going operations, for example, at an oil well site. In this, applicants contemplate broad applicability of the present invention to diverse situations that require thermal compensation of pressure measurements, for example, pressure measurements that are subject to error due to sudden, sharp temperature changes, such as experienced due to adiabatic pressure changes in downhole environments.

FIG. 22 shows a block diagram of one system for thermal compensation of pressure values obtained by a pressure gauge, for example, a CQG. The system of FIG. 22 includes a processor 400, a memory unit 500 and a display 600. In one aspect of the present invention, the processor 400 may perform calibration of output data from a pressure gauge 100, for example, data stored in the memory unit 500, and also may provide thermally corrected pressure values based on the calibrated data. In this, the processor 400 may compute thermally corrected pressure values by using the pressure values and temperature values obtained with the pressure gauge 100, the oil temperature values measured with a thermometer 140, and Equation 28 for dynamic compensation of the measured pressure values. The pressure and temperature values may be stored in the memory unit 500 after measurement and used for the compensation by reading from the memory unit 500. The corrected pressure value $P_{corrected}$ may be stored in the memory unit 500 and displayed on the display 600, such as an LCD and CRT. As the processor 400, various types of data processing means, such as a circuit board or an IC chip designed for processing the pressure and temperature data, a microcomputer and a personal computer, may be used. As the memory unit 500, various types of data memorizing media, such as semiconductor memory, magnetic disc, magnetic tape, and optical disc, may be used.

The system of FIG. 22 may include a pressure sensor tool 300. The pressure sensor tool 300 may include a sensor unit 310 having a pressure gauge 100, such as a CQG in one embodiment of the present invention, a thermometer 140 attached, for example, on the outer surface of the pressure gauge 100 (refer to FIG. 8), and a housing 250 filled with a medium, such as oil 200. The pressure sensor tool 300 may also include a measurement circuit unit 320 including a circuit 322 for the pressure gauge 100 and a circuit 324 for the thermometer 140. The circuit 322 processes signals from the pressure gauge 100, and outputs the measured pressure data or frequency data corresponding to the pressure to the processor 400. The circuit 324 processes signals from the thermometer 140, and outputs the measured temperature data or frequency data corresponding to the temperature to the processor 400.

FIG. 23 shows a flow chart of thermal compensation of pressure values obtained by a pressure gauge, for example, a dual-mode gauge, such as a CQG, or a single-mode oscillating pressure gauge, described in more detail below. First, a coefficient, such as in the present embodiment the SF (Scale Factor) of the correction term in the foregoing compensation Equation 28, may be determined with the processor 400 by using, for example, experimental data sets of dynamic pressure responses (S101). The determined coefficient may be stored in the data memory unit 500, for example. Next, in one aspect of the present invention, the processor 400 may read a set of pressure values $P_{raw}$ and temperature values $T_{gauge}$ measured with the pressure gauge, such as the CQG, and temperature values of oil $T_{oil}$ from the data memory unit 500 (S102). Then, the processor 400 computes corrected pressure values $P_{corrected}$ by using the acquired data $P_{raw}$, $T_{gauge}$ and $T_{oil}$, and the foregoing compensation Equation 28 (S103). The computed pressure values may be stored in the data memory unit 500 (S104). Computation of the corrected pressure data may be repeated for all pressure data to be corrected over a predetermined period of time after commencement of the pressure measurements (S102-S105). The computed corrected pressure values may be displayed as a dynamic pressure response curve on the display 600 (S106).

The systems and methods described above may also be used for real-time correction of pressure measurements, for example, measurements conducted at an oil well site by placing the pressure sensor tool 300 in, for example, an oil or gas well. In this, steps S102-S106 may be implemented, as described above, for a set of pressure values $P_{raw}$ and temperature values $T_{gauge}$ measured with a pressure gauge, such as the CQG, and temperature values of oil $T_{oil}$ in real-time with acquisition of the data from the pressure sensor tool 300. Alternatively, the measured data $P_{raw}$, $T_{gauge}$ and $T_{oil}$ may be stored in the data memory unit 500 before computing the corrected pressure values.

Figure 24:
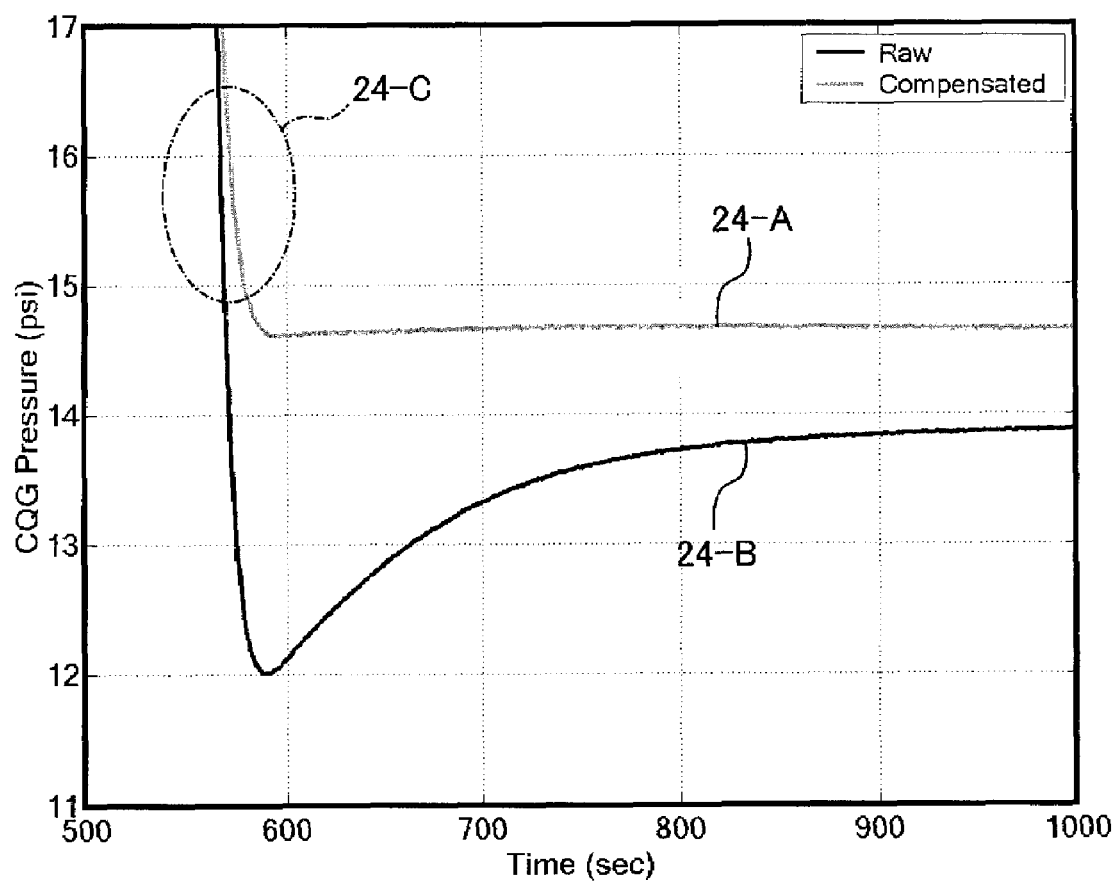
FIG. 24 shows graphically one example of dynamic pressure compensation with one method according to the present invention using experimental data.

FIG. 24 shows one example of dynamic pressure compensation with one method of the present invention using experimental data shown in FIGS. 16-20. The compensated pressure (line 24-A) is compared with the uncompensated pressure readings (line 24-B). The scale factor (SF) of 5.26 psi/° C., which is obtained from the slope of the second phase (P2 to P3) in FIG. 20, was used.

At 10 to 15 seconds after the pressure drop, the compensated pressure showed a constant pressure value, 14.58 psi, around the atmospheric pressure, with neither overshoot nor undershoot error. The compensated pressure can contain a pressure offset error if a temperature mismatch remains between the measured oil temperature and the true temperature on the outer surface of the pressure gauge, but even if an offset pressure error exists, the compensated pressure curve will maintain this flat response in time as long as the proportionality between pressure error and temperature difference between inside and outside the gauge holds.

Another error remained in the time where the pressure is going down in the initial region 24-C in FIG. 24. This positive error is because the two-point temperature gradient is different from the true profile especially for the initial transient time, e.g., refer to FIG. 21. The true thermal stress (pressure reading) seems to change its sign slightly slower than that of the two-temperature gradient. This causes overcompensation, but this time interval is short, about ten seconds, as mentioned in FIGS. 20 and 21. Applicants believe the over compensation is likely to be negligible for primary applications.

Temperature matching between the oil temperature and the outer surface temperature of a CQG under the thermal equilibrium condition must be +/-0.02° C. to keep the pressure offset error within +/-0.1 psi. This comes from the scale factor (SF) of 5.263 psi/° C. This error can be minimized down to an acceptable level by calibrating the oil thermometer, e.g., RTD, and the CQG against temperature and pressure at the same time.

Another embodiment of the present invention includes an indirect method to estimate the oil temperature from a known CQG temperature, for example, temperature near the center of the resonator, described as the inverse heat conduction problem.

Based on modeling, a transfer function of the heat conduction of the quartz body may be determined. This function can be used to calculate the quartz temperature for any oil temperature variation and may be used as a basis for a solution of the inverse heat conduction problem.

Figure 25:
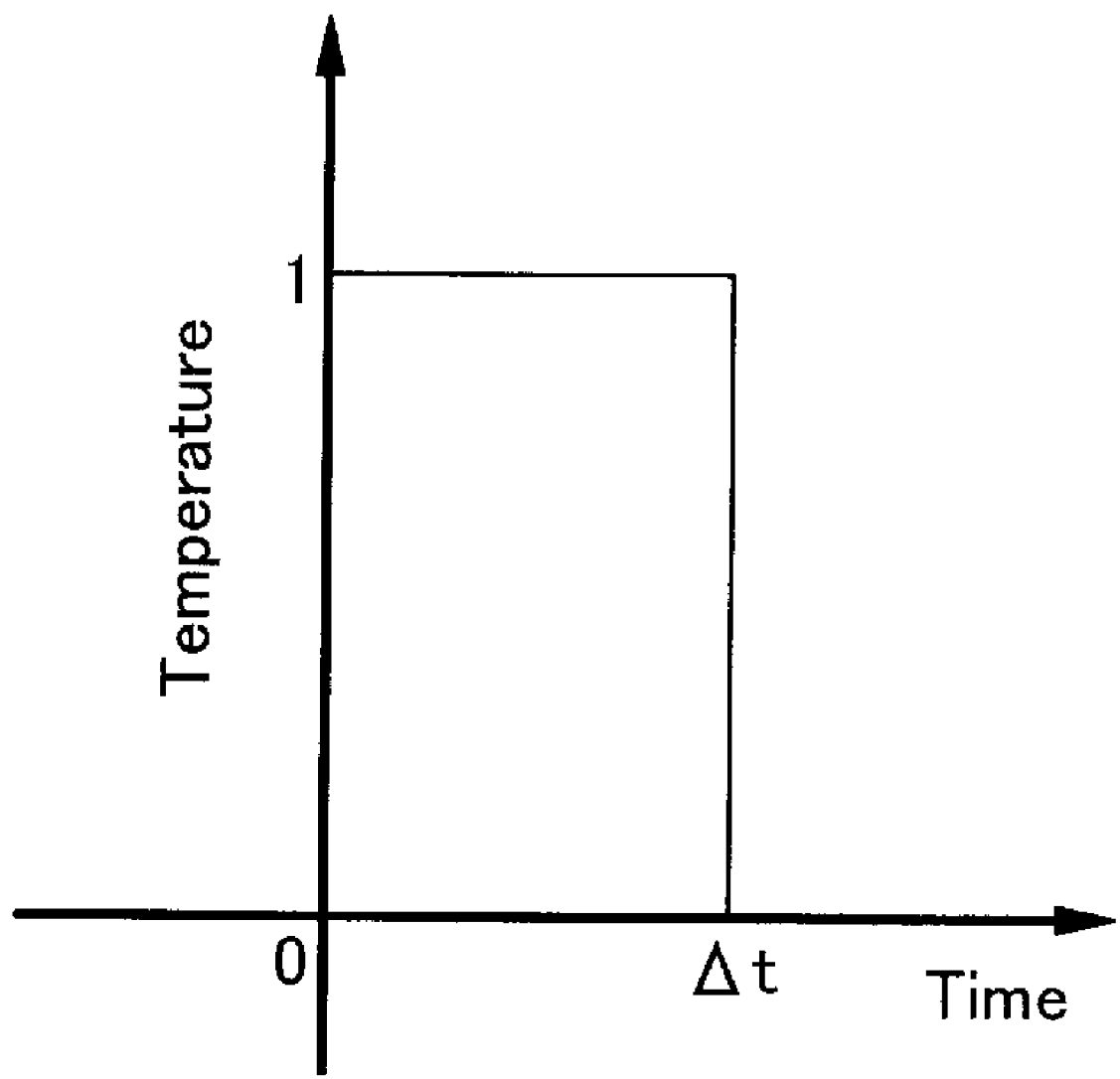
FIG. 25 is a graph of unit amplitude temperature pulse with the width of a sampling time.

Instead of the foregoing boundary condition at Equation 9 above, a unit amplitude temperature pulse with the width of a sampling time is considered, as shown in FIG. 25. Its Laplace transform is $$L(1) = \int_0^{\Delta t} 1 e^{-st} dt = \left[-\frac{e^{-st}}{s}\right]_0^{\Delta t} = \frac{1}{s}(1 - e^{-s\Delta t}), \quad (29)$$

where "s" represents complex variable.

The solution of the Laplace transformed Equation 6, $$\mathfrak{I}(x,s) \text{ is } \mathfrak{I}(x,s) = \frac{(1-e^{-s\Delta t})\cosh\left(\sqrt{\frac{s}{\kappa}}x\right)}{s\cosh\left(\sqrt{\frac{s}{\kappa}}l\right)}. \quad (30)$$

This is the transfer function of the heat conduction in the quartz for an oil temperature impulse that is digitalized with the sampling time of $\Delta t$. The digitization is equivalent to assuming that input temperature is kept constant during the time duration of $\Delta t$.

Applying inverse Laplace transform to Equation 30, $$T(x,t) = \frac{1}{2\pi i} \int_{\gamma-i\infty}^{\gamma+i\infty} \mathfrak{I}(x,s) ds \quad (31)$$

$$= \frac{1}{2\pi i} \int_{\gamma-i\infty}^{\gamma+i\infty} \frac{(1-e^{-s\Delta t})\cosh\left(\sqrt{\frac{s}{\kappa}}x\right)}{s\cosh\left(\sqrt{\frac{s}{\kappa}}l\right)} ds,$$

where $\gamma$ represents a constant real number and "i" represents the imaginary number, $\sqrt{-1}$.

Then the following impulse response is obtained.

$$T(x, t) = \frac{4}{\pi} \sum_{n=0}^{\infty} \frac{(-1)^n}{(2n+1)} \cos\left[\frac{(2n+1)\pi}{2l} x\right] e^{-\frac{\kappa(2n+1)^2 \pi^2}{2l^2} t} \left( e^{\frac{\kappa(2n+1)^2 \pi^2}{2l^2} \Delta t} - 1 \right). \quad (32)$$

T(x,t) calculated for each sampling time at a certain x will become an Infinite Impulse Response (IIR) digital filter, to calculate a temperature at the position x in quartz by convolving oil temperature data with it.

Figure 26:
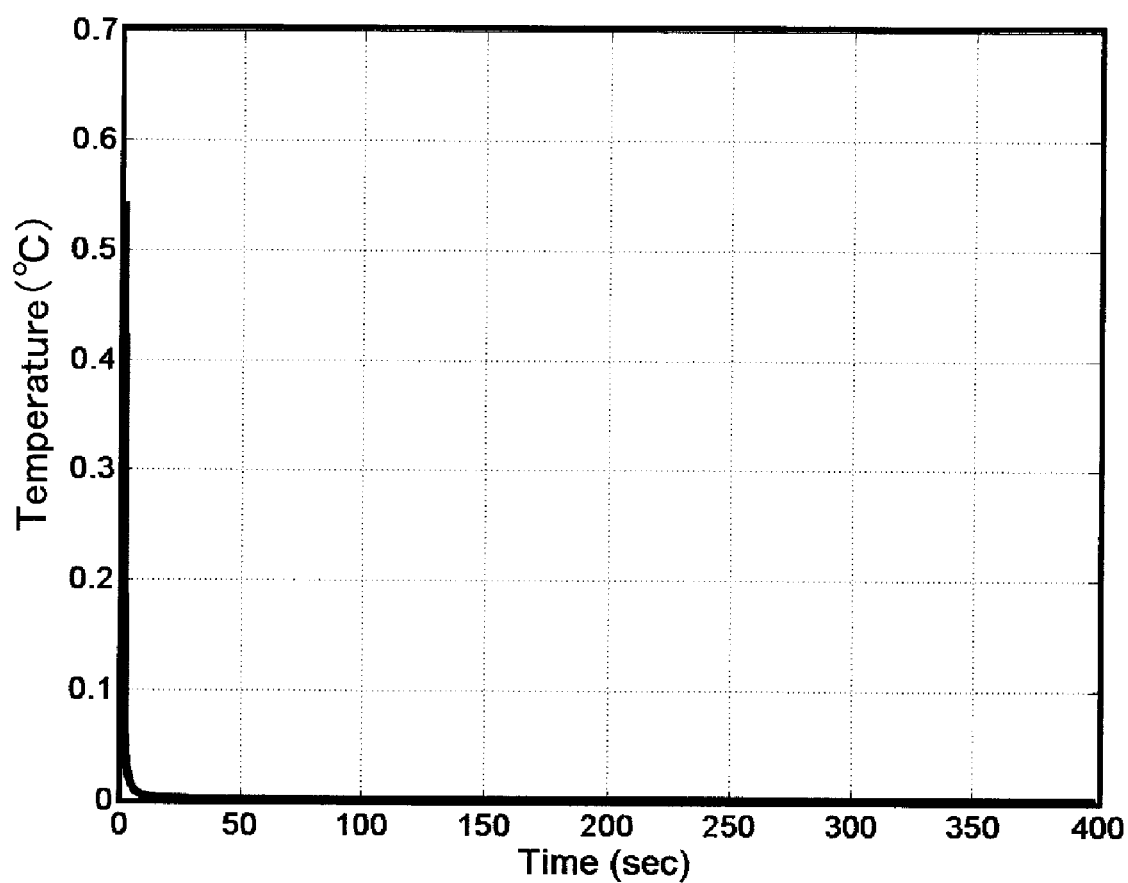
FIG. 26 is a graph of computed temperature impulse response at the outer surface of a quartz resonator.
Figure 27:
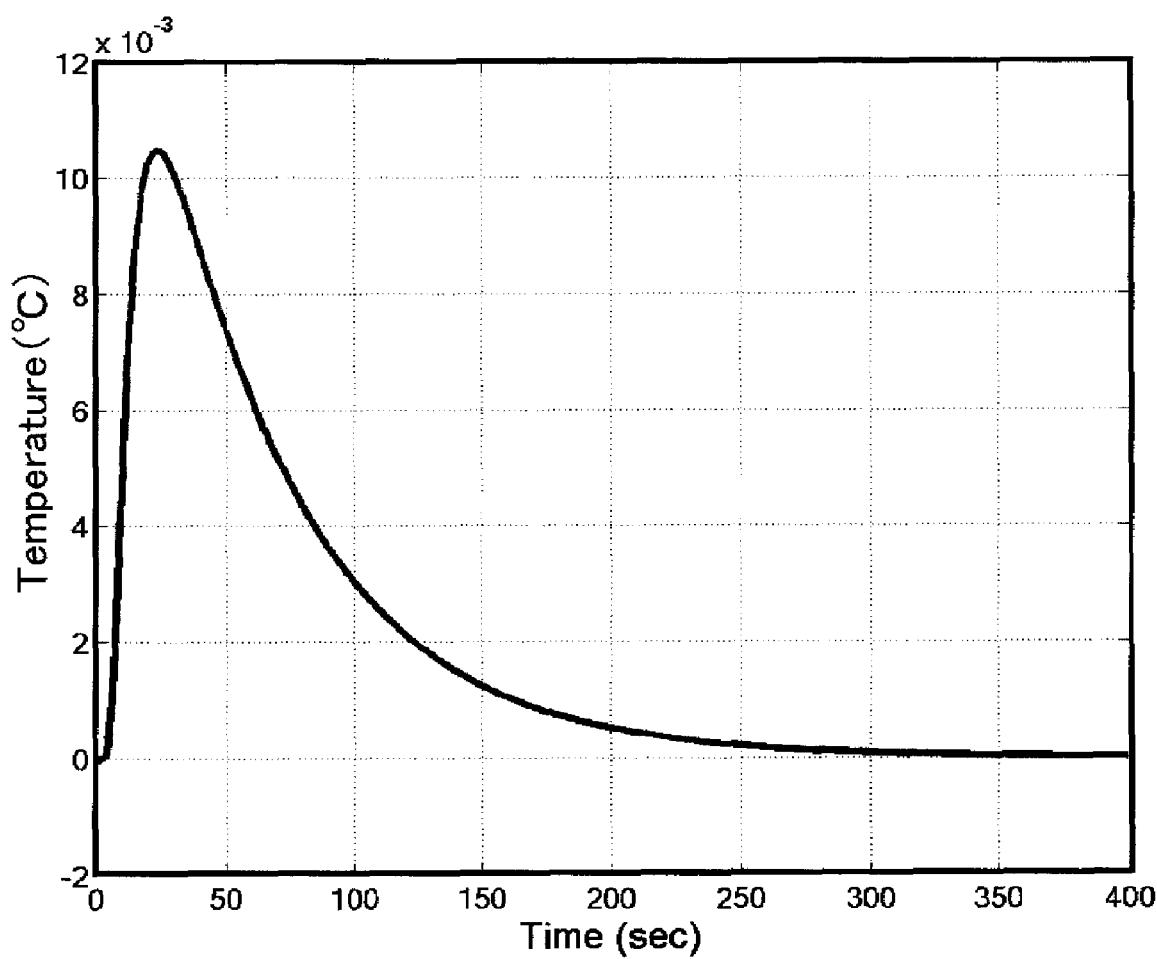
FIG. 27 is a graph of computed temperature impulse response at the center of the quartz resonator.
Figure 28:
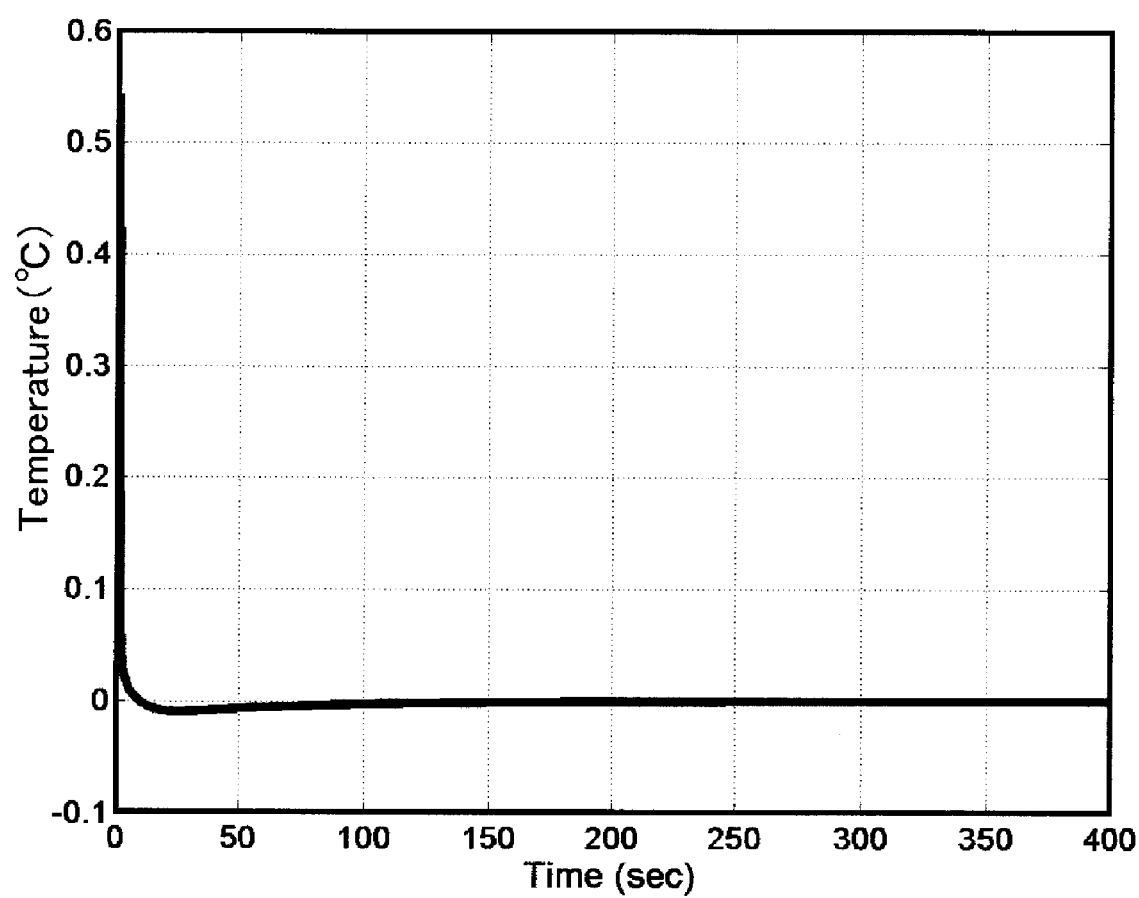
FIG. 28 is a graph of temperature differences between the center and the outer surface of the quartz body of the quartz resonator.

FIGS. 26, 27 and 28 show calculated impulse using Equation 32. FIG. 26 shows the temperature impulse response at the outer surface of the quartz resonator of the CQG. FIG. 27 shows the temperature impulse response at the center of the quartz body of the CQG. FIG. 28 shows the temperature difference of the temperature impulse responses between the center and outer surface of the quartz body. The sampling time was 1 second.

By convolving the impulse response with any temperature variation of the oil, it is possible to calculate the induced temperature profiles and its transient behaviors in the quartz body of the CQG.

$$T_{quartz}(x, t) = \int_0^t T_{IR}(x, t - t') T_{oil}(t') dt', \quad (33)$$

where $T_{quartz}(x,t)$ represents quartz temperature, $T_{IR}(X,t\text{-}t')$ represents an impulse temperature filter, and $T_{oil}(t)$ represents oil temperature.

Numerical calculation of the filter assumed the same material constants as in the modeling shown in FIGS. 9, 10 and 11. The filter length was approximated to be 400 seconds long, which implies more than 400-second pressure data acquisition (about 7 minutes) for convolution. A shorter filter length may cause reduction of the gain and then a low amplitude resultant temperature response.

In order to reduce the data that are acquired, the filter length may be reduced by converting it to a recursive form (FIR filter), as described in, for example, J. L. Shanks, "Recursive Filters for Digital Processing", Geophysics, vol. XXXII, No. 1, 1967. However, the methodology would not change; to determine the present center temperature all contributions over several past minutes (about 7 minutes in this case) are integrated. Alternatively, filter length may be cut at the n-th term so that the length is short enough for practical use since impulse response decays and only negligible effect remains at a large n, as shown in FIG. 28.

Operation of the IIR temperature filter is demonstrated by some examples in which oil temperature variations are simulated with the filter. Temperature differences between the center temperatures and outer surface temperatures are calculated.

Figure 29:
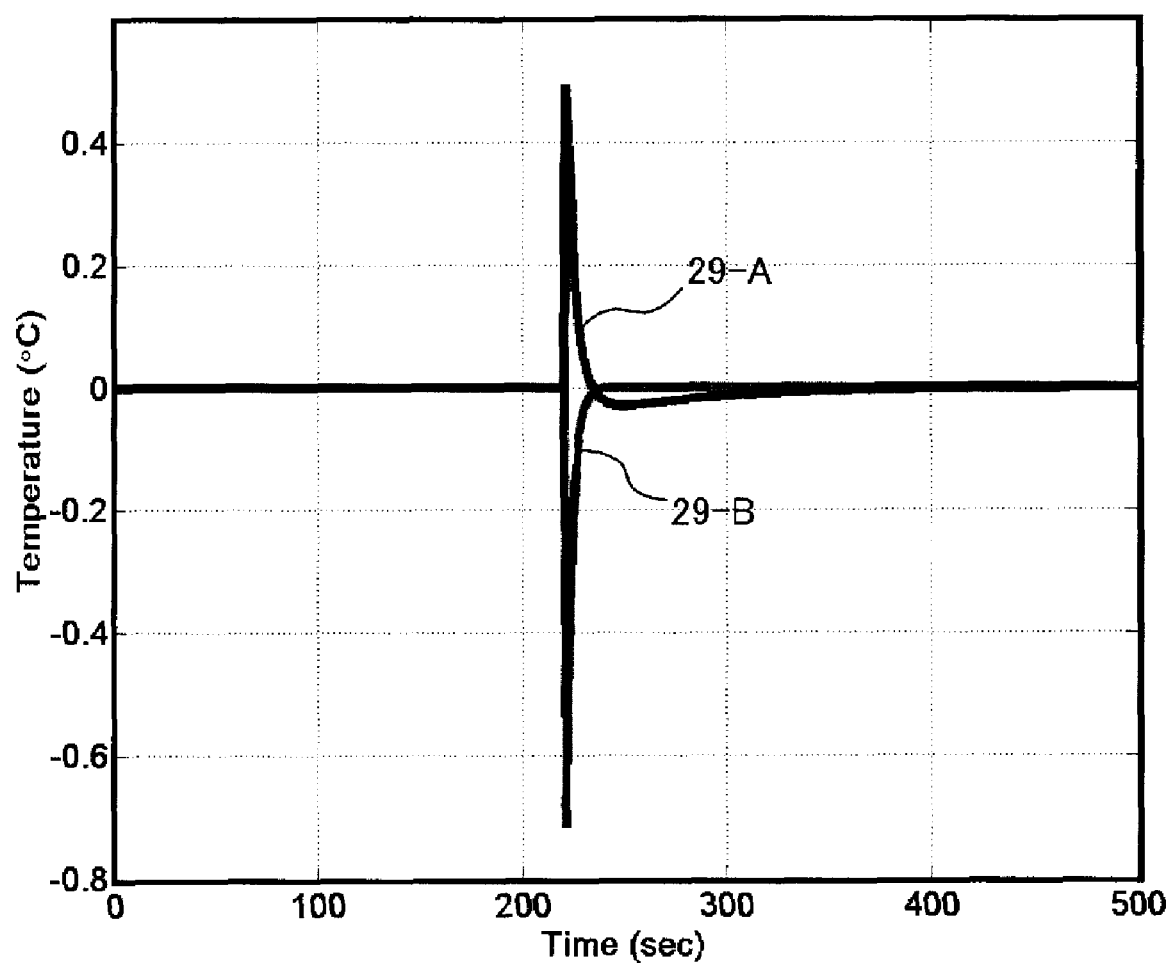
FIG. 29 is a graph of temperature differences between the center and the outer surface of the quartz body for an exponential oil temperature change.

FIG. 29 shows the response to an exponential variation similar to the boundary condition of the modeling shown in FIGS. 9, 10 and 11. In FIG. 29, the line 29-A indicates the calculated temperature differences between the center and outer surface of the quartz body. The line 29-B indicates oil temperature. The results obtained were similar to the modeling result in FIG. 13.

Figure 30:
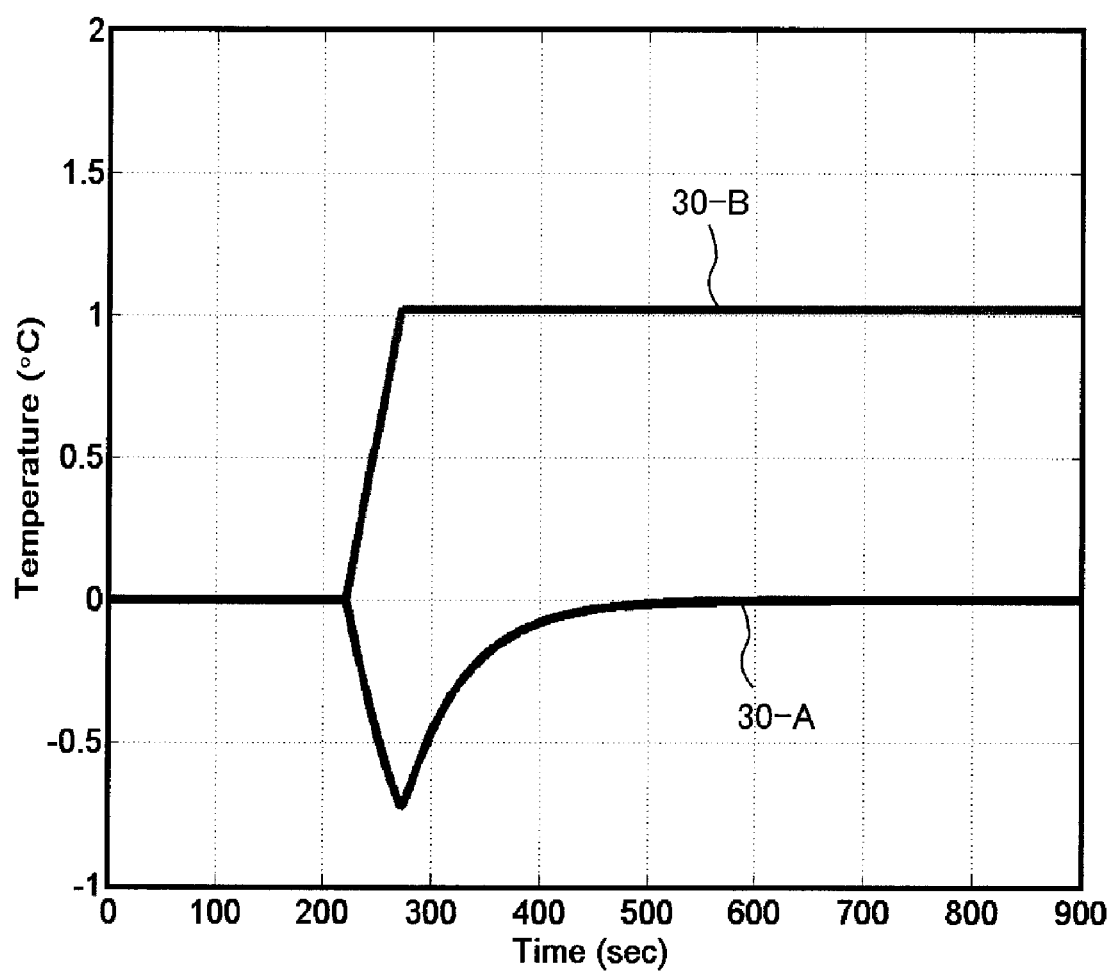
FIG. 30 is a graph of temperature differences between the center and the outer surface of the quartz body for an oil temperature ramp.

FIG. 30 shows response to a temperature ramp. In FIG. 30, the line 30-A indicates the calculated temperature differences between the center and outer surface of the quartz body. The line 30-B indicates oil temperature. The calculated temperature difference Tcent-Tsurf looks similar to an actual response of the CQG, except for a sharp undershoot peak due to the sharp edge of the input oil temperature ramp, which is unlikely in actuality.

Figure 31:
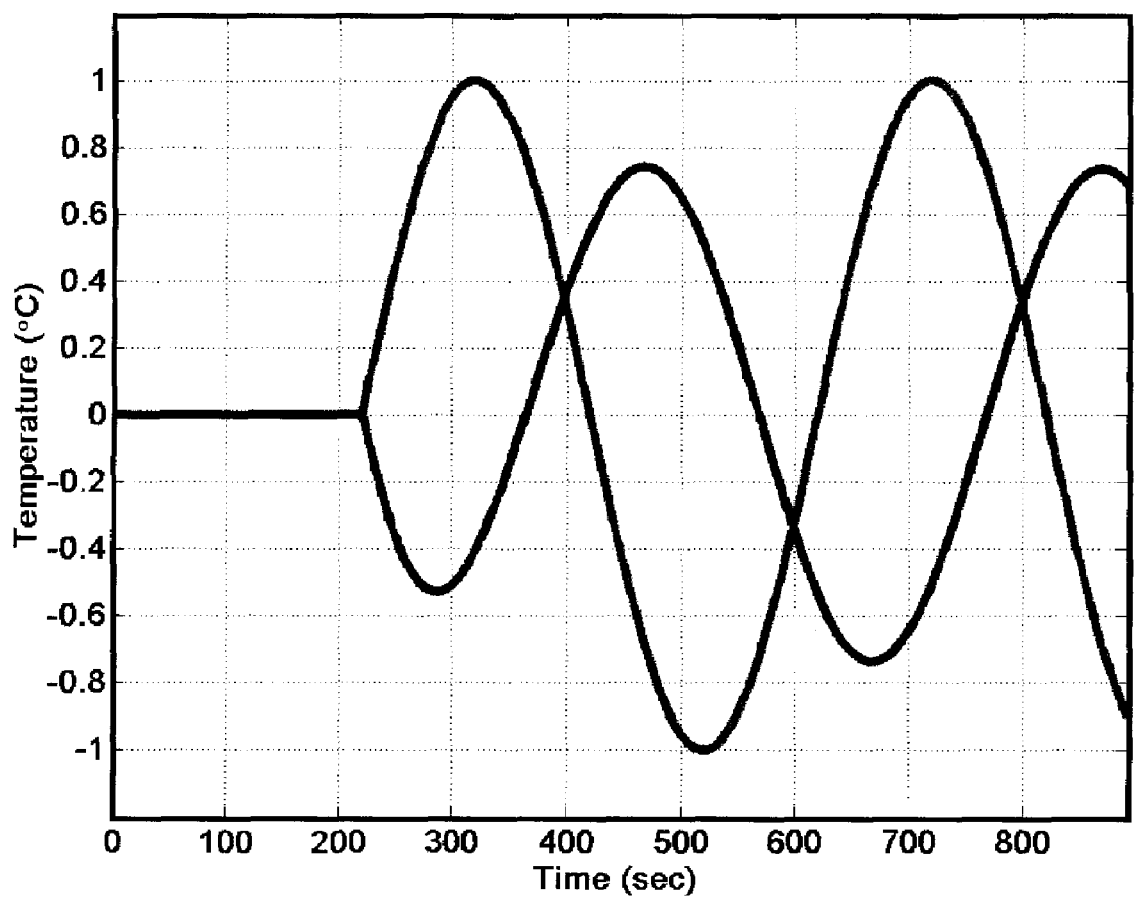
FIG. 31 is a graph of temperature differences between the center and the outer surface of the quartz body for a sinusoidal oil temperature change.

FIG. 31 shows response to a sinusoidal oil temperature change in which gain and phase delay of the filter at this frequency are seen Inversing the temperature impulse response filter at Equation 32 above, a filter to convert CQG temperature to oil temperature can be obtained. However, this requires inversion of the transform function at Equation 30 above $$\Im(x, s)^{-1} = \frac{s \cosh\left(\sqrt{\frac{s}{\kappa}} l\right)}{(1 - e^{-s\Delta t}) \cosh\left(\sqrt{\frac{s}{\kappa}} x\right)}, \quad (34)$$

which does not enable an inverse Laplace transform integration because $\Im(x,s)^{-1}$ diverges to infinity when s goes to infinity.

Alternatively, to numerically inverse the impulse response filter, InverseIR(t), may be considered. Convolution and deconvolution in the time domain are equivalent to simple multiplication and division in the frequency domain. Therefore, after Fourier transformation, the filter can be inverted.

Figure 32:
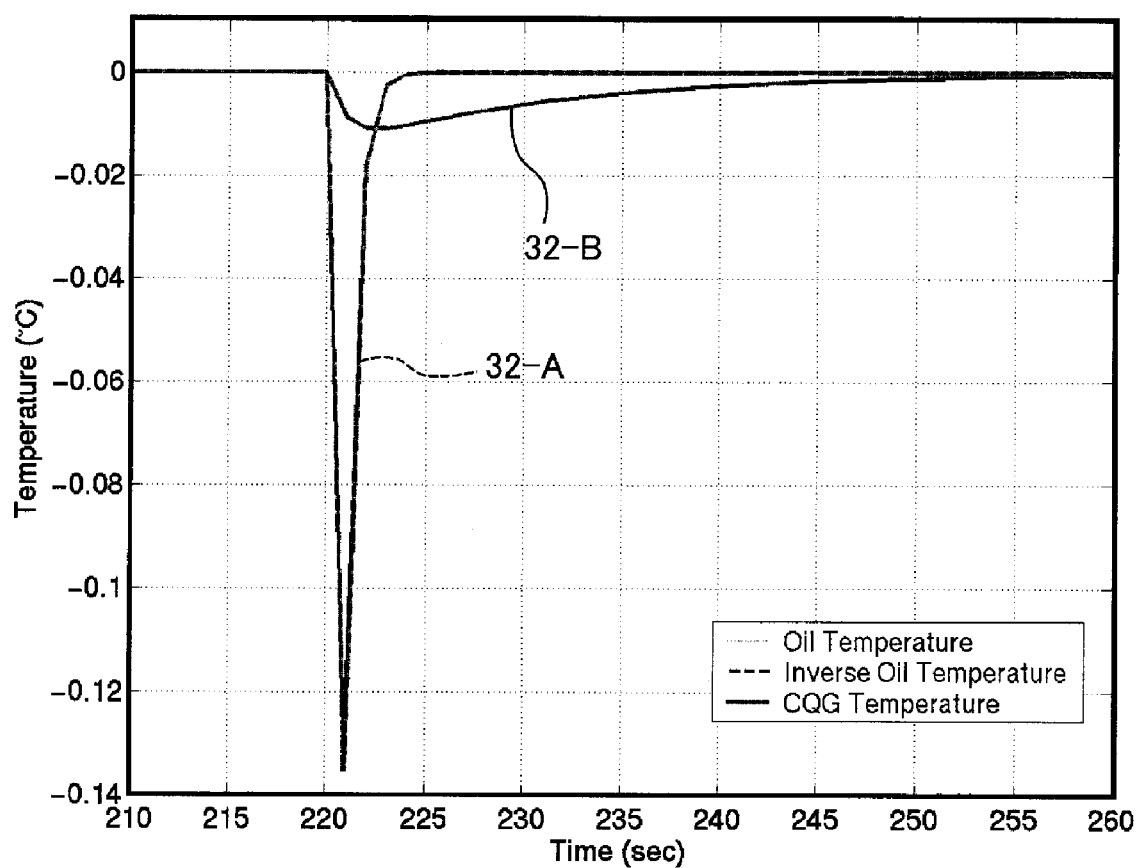
FIG. 32 shows in a graph a simulation result of deconvolution with a temperature filter.

FIG. 32 shows a first example for the inversion. Using the simulation data shown in FIG. 27, the calculated synthetic oil temperature from the CQG temperature was deconvolved with the impulse response filter. The inverse oil temperature curve 32-A is calculated from the CQG temperature curve 32-B with deconvolution using the temperature impulse response filter. It is overlapped on the original oil temperature curve.

$$T_{oil}(T) = \int_0^t \text{InverseIR}(t - t') T_{CQG}(t') dt' \quad (35)$$

Once the oil temperature is available, the dynamic correction term can be calculated with the foregoing Equation 28.

Another embodiment according to the present invention, for another type of pressure gauge, may be used to correct any dynamic pressure errors induced by outside temperature changes. Based on mechanical design of the quartz pressure gauge, a thermal stress model is analytically calculated. The thermal stress model is numerically evaluated to make a digital filter of the thermal stress impulse response. The thermal stresses are calculated by convolving the thermal stress impulse response with temperature data measured on or near the outer surface of the pressure gauge. Since the dynamic pressure response errors are proportional to the thermal stress, the dynamic pressure response errors can be compensated.

Figure 33:
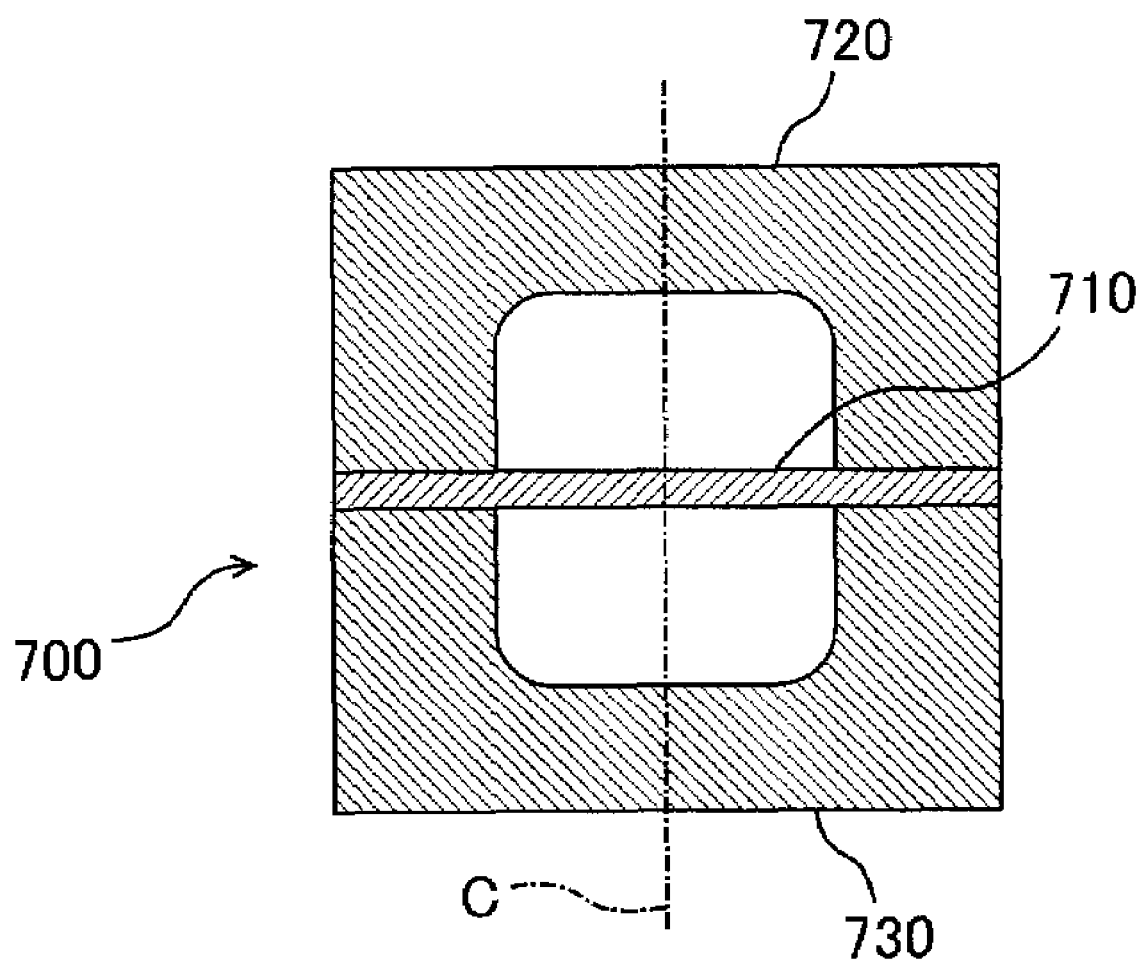
FIG. 33 is a schematic cross sectional view of an exemplary single-mode oscillation pressure gauge.

FIG. 33 shows a quartz pressure gauge 700 of another embodiment of the present invention. The present embodiment utilizes a single-mode oscillation pressure gauge, in contrast with the dual-mode oscillation pressure sensors previously described above. Pressure gauge 700 has a transducer which typically is based on a resonator disc 710 perpendicular to the axis C. The resonator disc 710 is located between two end caps 720, 730. Hydraulic pressure is applied on a peripheral surface of the disc so that the system is substantially cylindrically symmetric.

The following methodology was used in modeling:
(1) Make a heat conduction model to calculate temperature transients and profiles in the pressure gauge.
(2) Make a thermal stress model of the pressure gauge.
(3) Calculate the thermal stress of the pressure gauge.
(4) Correlate the thermal stress with the pressure gauge.

The following assumptions/approximations were used in the model:
(A) Dynamic pressure error is proportional to the thermal stress, at least in a relatively small temperature range. In a global temperature range, it may be preferable to determine a proportional constant as a function of temperature.
(B) All material constants are isotropic and temperature-independent. The temperature dependency may be brought in the model via the proportional constant between the thermal stress and the dynamic pressure error.
(C) An infinitely long cylinder model can be used to calculate temperature transient profiles since both disc surfaces are exposed to vacuum. Heat can dissipate from the quartz gauge surface to the vacuum only through the process of radiation, which is negligible. Therefore, because of no heat flow along the cylinder axis, the heat propagation situation in the disc is equivalent to that in the cylinder.
(D) A thermal stress can be calculated in a disc where we assume the temperature transient profiles obtained from the cylinder model.
(E) Only the resonator disc is considered, but end caps are not considered. The effect of the end caps may be incorporated later via slight modification of the material constants of the quartz disc.

Figure 34:
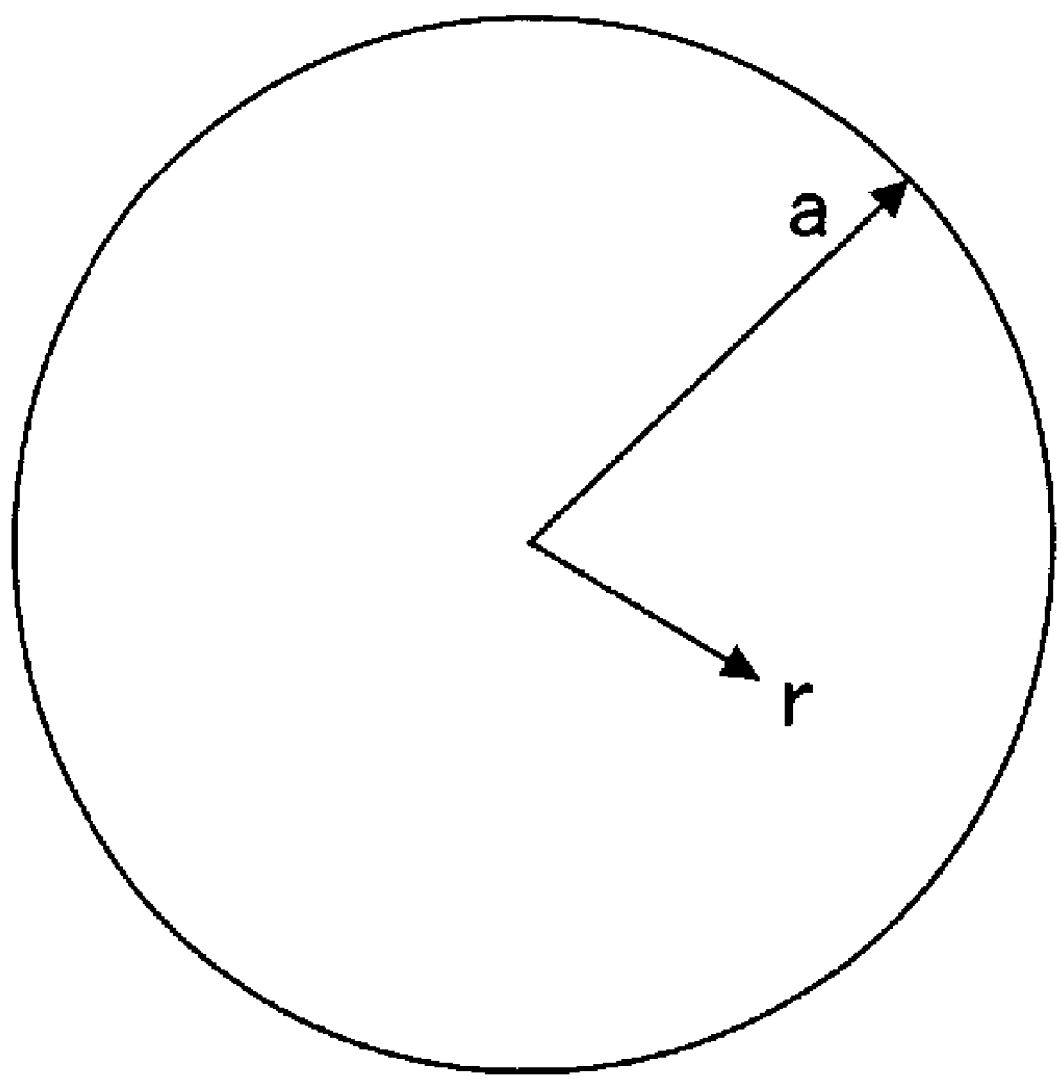
FIG. 34 is a diagram of the cylindrical coordinates used for a temperature impulse response.

The modeling uses a conduction equation in a quartz cylinder with the radius of "a" shown in FIG. 34. The heat conduction equation in the cylindrical coordinates is expressed with:

$$\frac{\partial^2 T(r,t)}{\partial r^2} + \frac{1}{r}\frac{\partial T(r,t)}{\partial r} - \frac{1}{\kappa}\frac{\partial T(r,t)}{\partial T} = 0, \quad 0 \le r < a, \quad t > 0, \tag{36}$$

where T(r,t) is temperature in the quartz disc, r is radial coordinate and κ is thermal diffusivity of quartz. An initial condition is $$T(r,0)=0, \quad 0 \le r < a. \tag{37}$$

A boundary condition is $$T(a,t) = 1, \quad 0 \le t < \Delta t. \tag{38}$$
$$= 0, \quad \Delta t < t.$$

This is a unit-amplitude temperature impulse with the pulse width of one sampling time, Δt, applied to the outer surface of the cylinder. The subsidiary equation of Laplace transformation of Equation 36 is $$\frac{d^2\overline{T}}{dr^2} + \frac{1}{r}\frac{d\overline{T}}{dr} - q^2\overline{T} = 0, \quad 0 \le r < a, \tag{39}$$

where $q^2=p/\kappa$. This is known to be Bessel's equation and is solved with Equation 38 above. Laplace transformation of Equation 38 is $$\overline{T} = \frac{1-e^{-p\Delta t}}{p}, \quad r = a. \tag{40}$$

The solutions of Equation 39 are $I_0(qr)$ and $K_0(qr)$. The latter tends to infinity at r→0, and then must be excluded. The solution of Equations 39 and 40 is $$\overline{T} = \frac{(1-e^{-p\Delta t})I_0(qr)}{pI_0(qa)}. \tag{41}$$

Using the inversion theorem, $$T(r,t) = \frac{1}{2\pi i}\int_{\gamma-i\infty}^{\gamma+i\infty} e^{pt}\frac{(1-e^{-p\Delta t})I_0(qr)}{pI_0(qa)}\,dp. \tag{42}$$

T(r,p) is rewritten to be $T(r,t)=T_1(r,t)-T_2(r,t)$, where $$T_1(r,t) = \frac{1}{2\pi i}\int_{\gamma-i\infty}^{\gamma+i\infty} e^{pt}\frac{I_0(qr)}{pI_0(qa)}\,dp, \tag{43}$$

$$T_2(r,t) = \frac{1}{2\pi i}\int_{\gamma-i\infty}^{\gamma+i\infty} e^{p(t-\Delta t)}\frac{I_0(qr)}{pI_0(qa)}\,dp. \tag{44}$$

The zeros of $I_0(qa)$ are at $p=-\kappa\beta_n^2$, where $\pm\beta_n$, n=1, 2, ... are the roots of $$J_0(a\beta)=0. \tag{45}$$

Line integrals in Equations 43 and 44 are found to be equal to 2πi times the sum of the residuals at the poles of the integrands. The residuals are evaluated using the result $$\left[p\frac{d}{dp}I_0(qa)\right]_{p=-\kappa\beta_n^2} = \left[\frac{1}{2}qaI_1(qa)\right]_{q=i\beta_n} = -\frac{1}{2}a\beta_n J_1(a\beta_n). \tag{46}$$

The pole at p=0 has residue 1, since $I_0(z)=1$ when z=0. Thus, $$T_1(r,t) = 1 - \frac{2}{a}\sum_{n=1}^{\infty} e^{-\kappa\beta_n^2 t}\frac{J_0(r\beta_n)}{\beta_n J_1(a\beta_n)}, \tag{47}$$

$$T_2(r,t) = 1 - \frac{2}{a}\sum_{n=1}^{\infty} e^{-\kappa\beta_n^2(t-\Delta t)}\frac{J_0(r\beta_n)}{\beta_n J_1(a\beta_n)}. \tag{48}$$

And,

-continued $$T(r, t) = \frac{2}{a}\sum_{n=1}^{\infty} e^{-\kappa\beta_n^2 t}(e^{\kappa\beta_n^2 \Delta t} - 1)\frac{J_0(r\beta_n)}{\beta_n J_1(a\beta_n)}. \quad (49)$$

Figure 35:
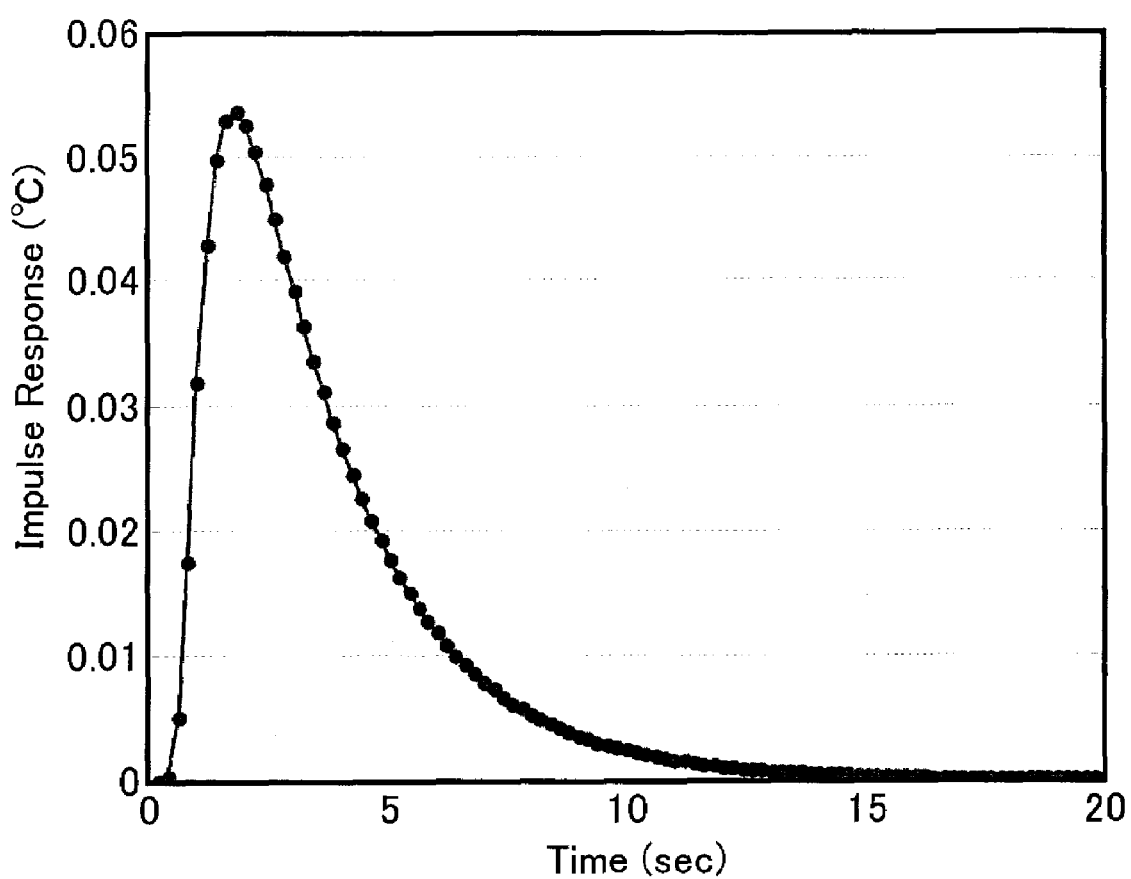
FIG. 35 is a graph of the temperature impulse response of a quartz disc.

Equation 49 is numerically evaluated at the center of the disc and the result is shown in FIG. 35. In this evaluation, following parameters are used.

κ: Thermal diffusivity: 0.0397 (cm$^2$/sec)
a: Radius of Quartz disc: 0.75 (cm)
Δt: Sampling time: 0.2 (sec)
r: Radius position 0.0 (cm)

Figure 36:
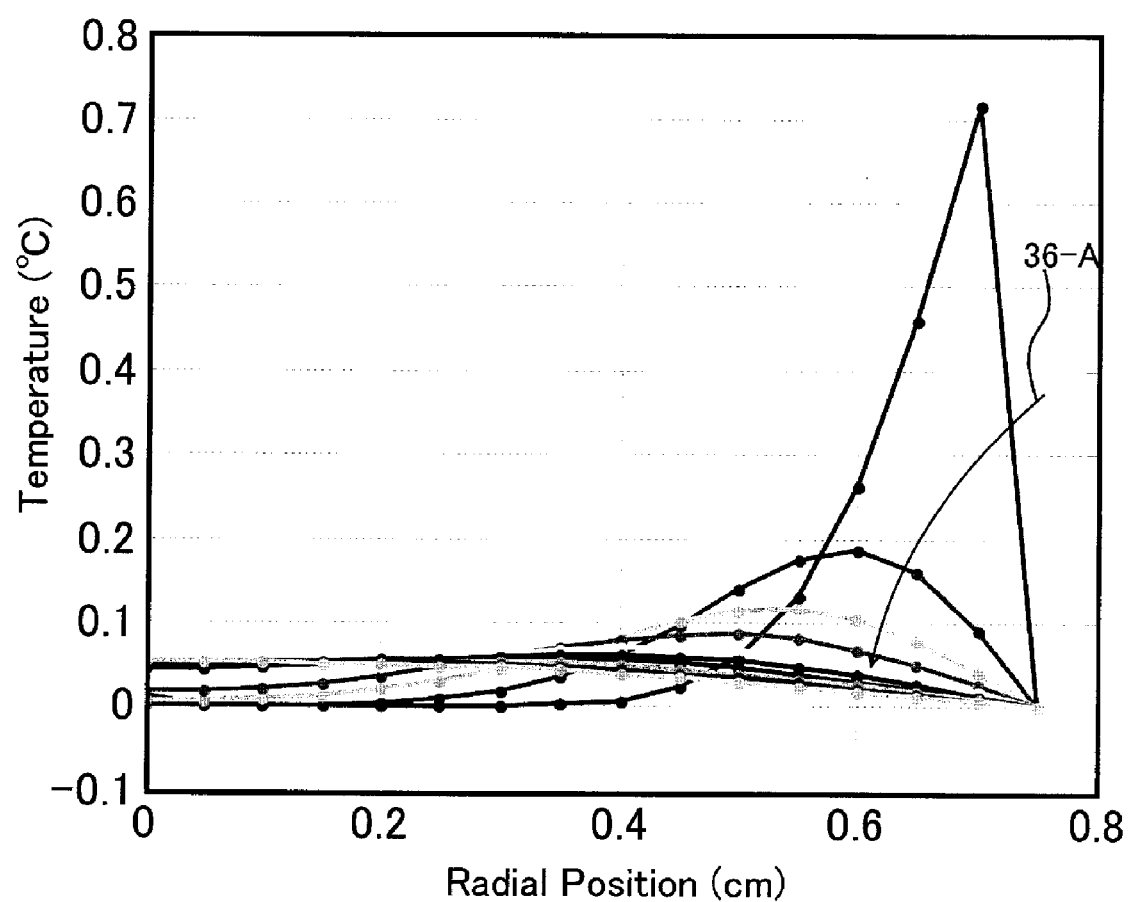
FIG. 36 is a graph of the evaluated result of temperature profiles in the quartz disc.

FIG. 36 shows the evaluated result of temperature profiles in the quartz cylinder. Each transient temperature profile is induced by a temperature impulse of 1° C. amplitude with 0.2 seconds time duration on the disc peripheral surface. These temperature profiles are changing in the direction indicated with an arrow 36-A in FIG. 36. For the initial 2 seconds, the temperature is computed with each step of 0.05 cm and 0.2 seconds in the radial position and time, respectively. The first temperature profile is at the elapsed time of 0.2 seconds, when the surface temperature has already returned back from 1° C. to 0° C. Therefore, the temperature is 0° C. at the surface (r=7.5 cm). The result in FIG. 35 corresponds to the temperature transient behavior at the center (r=0 cm).

Figure 37:
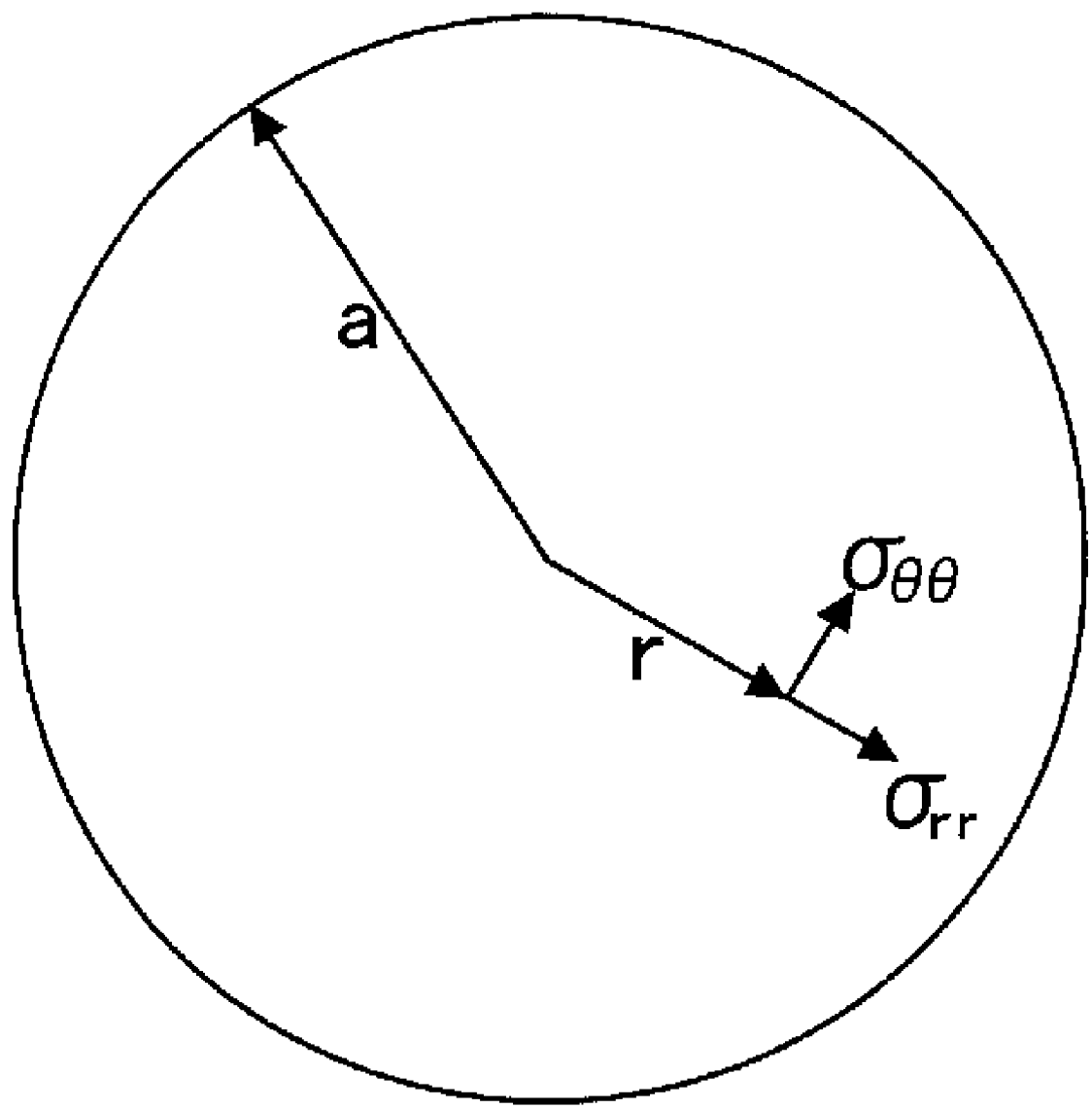
FIG. 37 is a diagram of the cylindrical coordinates used for a thermal stress impulse response.

Cylindrical coordinates in a quartz cylinder with the radius of "a" shown in FIG. 37 is used in the modeling. The thermal stresses in a quartz disc are described with:

$$\sigma_{rr}(r, t) = \frac{\alpha E}{r^2}\left\{-\int_0^r rT(r, t)dr + \frac{r^2}{a^2}\int_0^a rT(r, t)dr\right\}, \quad (50)$$

$$\sigma_{\theta\theta}(r, t) = \alpha E\left\{\begin{array}{l}\frac{1}{r^2}\int_0^r rT(r, t)dr + \\ \frac{1}{a^2}\int_0^a rT(r, t)dr - T(r, t)\end{array}\right\}, \quad (51)$$

where α represents a thermal expansion coefficient of quartz and E represents Young's modulus of quartz.

$\sigma_{rr}$ and $\sigma_{\theta\theta}$ tend to infinity at r=0. However, if temperature at r=0 is finite, as is typical when there is no heat source at r=0, then $$\lim_{r\to 0}\frac{1}{r^2}\int_0^r rT(r, t)dr = \frac{1}{2}T(0, t). \quad (52)$$

In this case, since displacement at r=0 is zero, the stresses at the center of the disc are $$\sigma_{rr}(0, t) = \sigma_{\theta\theta}(0, t) = \alpha E\left\{\frac{1}{a^2}\int_0^a rT(r, t)dr - \frac{1}{2}T(0, t)\right\}. \quad (53)$$

Inserting Equation 49 of the temperature profile response into Equation 53, $$\sigma_{rr}(0, t) = \sigma_{\theta\theta}(0, t) \quad (54)$$
$$= \frac{2\alpha E}{a^3}\sum_{n=1}^{\infty} e^{-\kappa\beta_n^2 t}(e^{\kappa\beta_n^2 \Delta t} - 1)\frac{1}{\beta_n J_1(a\beta_n)}$$
$$\left\{\int_0^a rJ_0(r\beta_n)dr - \frac{a^2}{2}J_0(0)\right\}.$$

where $$\int_0^a rJ_0(r\beta_n)dr = \frac{a}{\beta_n}J_1(a\beta_n).$$

Consequently, the following thermal stress impulse response can be obtained, $$\sigma(0, t) = \sigma_{rr}(0, t) \quad (55)$$
$$= \sigma_{\theta\theta}(0, t)$$
$$= \frac{2\alpha E}{a^3}\sum_{n=1}^{\infty} e^{-\kappa\beta_n^2 t}(e^{\kappa\beta_n^2 \Delta t} - 1)\frac{1}{\beta_n J_1(a\beta_n)}$$
$$\left\{\frac{a}{\beta_n}J_1(a\beta_n) - \frac{a^2}{2}J_0(0)\right\}$$
$$= \frac{2\alpha E}{a^2}\sum_{n=1}^{\infty} e^{-\kappa\beta_n^2 t}(e^{\kappa\beta_n^2 \Delta t} - 1)\left\{\frac{1}{\beta_n^2} - \frac{aJ_0(0)}{2\beta_n J_1(a\beta_n)}\right\}.$$

Figure 38:
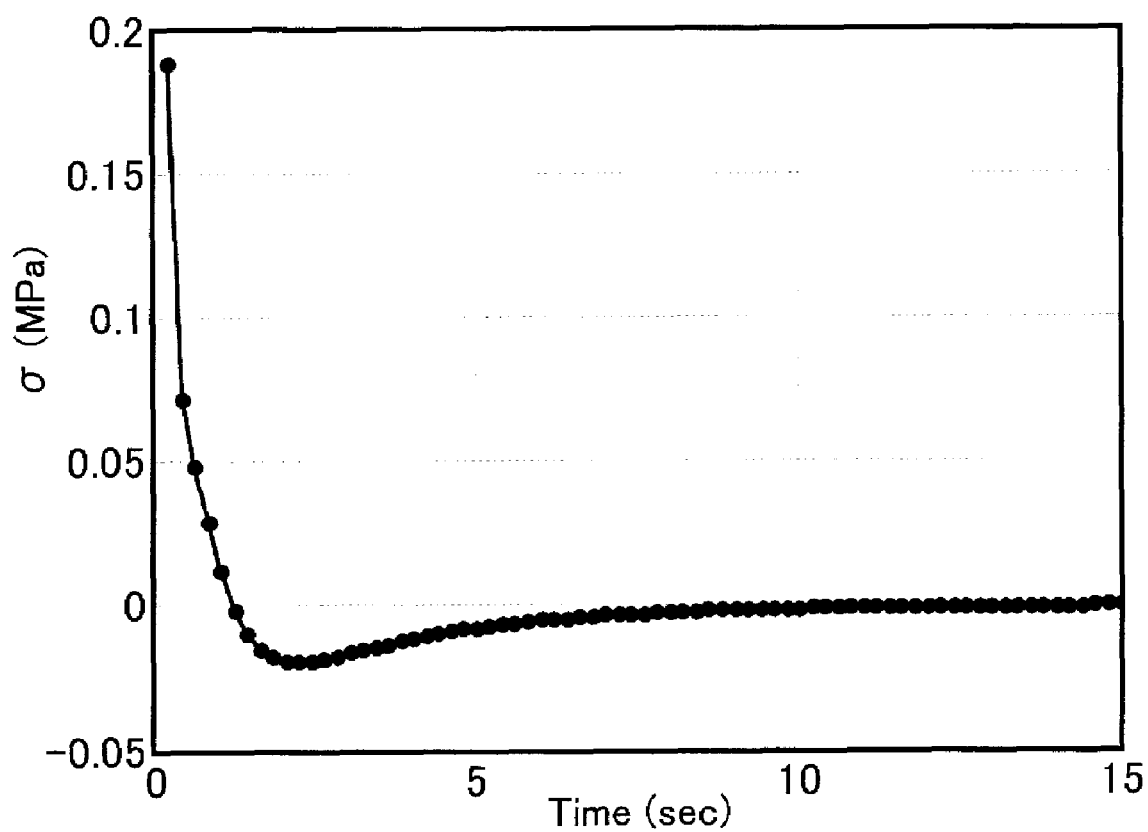
FIG. 38 is a graph of thermal stress impulse response at the center of the quartz disc.

FIG. 38 shows the numerically evaluated result of Equation 55 where positive stress means expansion and negative stress indicates compression. In this case, a positive temperature impulse is applied and the quartz disc expands. After the disc gets warmer, the peripheral part cools back earlier than the center. The computed stress changes its sign from positive to negative. The calculated stress behaves as explained above: First positive then negative and finally stabilized. Additional material constants used here are the thermal expansion coefficient, α=14.45×10$^{-6}$ (K$^{-1}$) and Young's modulus of quartz, E=1.03×10$^5$ (MPa). The sampling time, Δt=0.2 (seconds).

The thermal stress impulse response corresponds with the dynamic pressure response of a quartz pressure gauge to a pressure drop because the observed pressure error is the pressure response error to oil temperature pulse due to an adiabatic pressure change. The oil temperature pulse can be regarded as an impulse except for the fact that the oil temperature pulse does not have a sharp return edge, which can make the stabilizing behavior different from that in FIG. 38.

By convolving surface temperature data with the thermal stress impulse response expressed with Equation 55, the thermal stress is calculated.

$$\sigma(0, t) = \int_0^t T_{surface}(t - t')\sigma(t')dt' \quad (56)$$

Dynamic responses in pressure reading are assumed to be proportional to the thermal stress as seems to be true at least in a relatively narrow temperature range. In a wide temperature range, a proportional constant as a function of temperature, $C_0(T)$ may have to be experimentally determined.

Dynamic response error ΔP can be calculated by convolving surface temperature data with the thermal stress impulse response described above.

$$\Delta P(T, t) = \int_0^t T_{surface}(t-t')c_0(T)\sigma(t')dt'. \quad (57)$$

$$\Delta P(T, t) = C_0(T)\frac{2\alpha E}{a^2} \quad (58)$$
$$\int_0^t dt' T_{surface}(t-t')\sum_{n=1}^{\infty} e^{-\kappa\beta_n^2 t'}\left(e^{\kappa\beta_n^2 \Delta t'}-1\right)\left\{\frac{1}{\beta_n^2} - \frac{aJ_0(0)}{2\beta_n J_1(a\beta_n)}\right\}.$$

$$\Delta P(T, t) = C(T) \quad (59)$$
$$\int_0^t dt' T_{surface}(t-t')\sum_{n=1}^{\infty} e^{-\kappa\beta_n^2 t'}\left(e^{\kappa\beta_n^2 \Delta t}-1\right)\left\{\frac{1}{\beta_n^2} - \frac{aJ_0(0)}{2\beta_n J_1(a\beta_n)}\right\},$$

where $$C(T) = C_0(T)\frac{2\alpha E}{a^2}.$$

Figure 39:
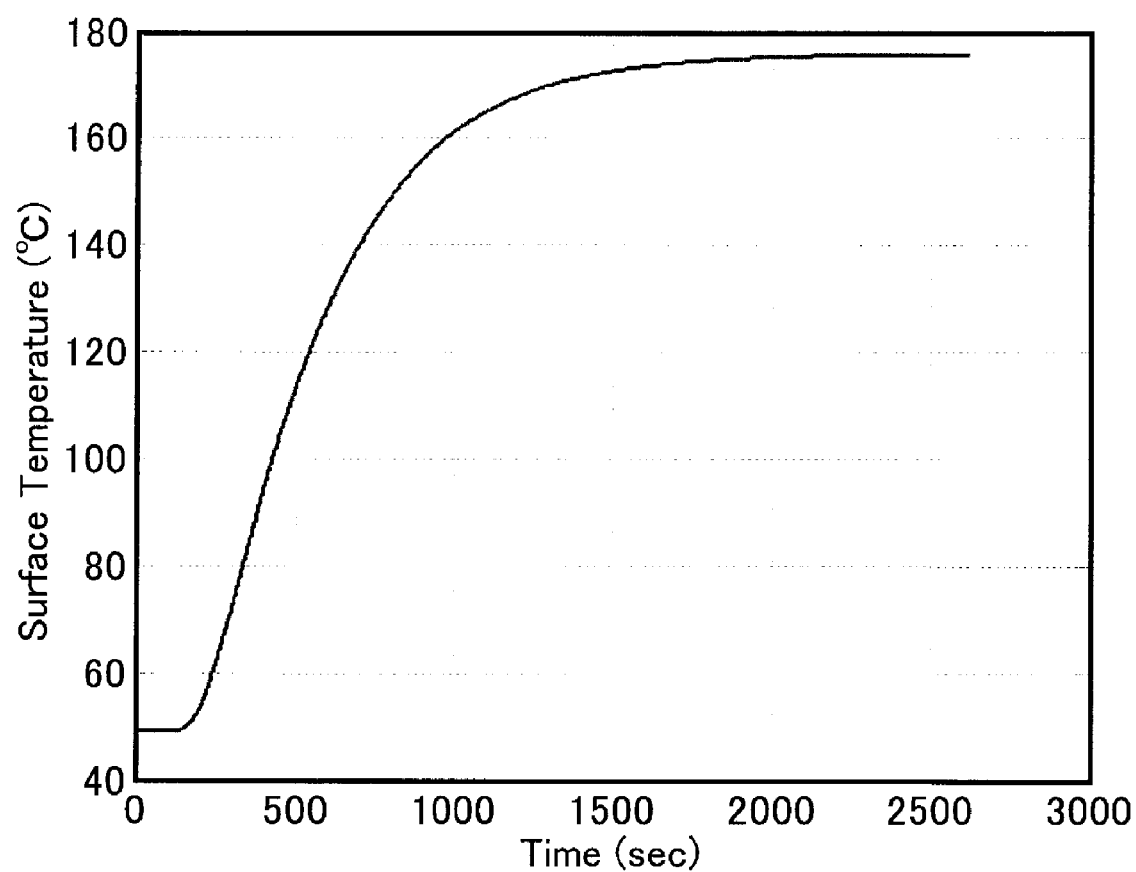
FIG. 39 is a graph of given surface temperature data in the case of a temperature ramp.

Thermal stresses are calculated by using Equation 59 for given surface temperature data in temperature ramp condition in FIG. 39.

Figure 40:
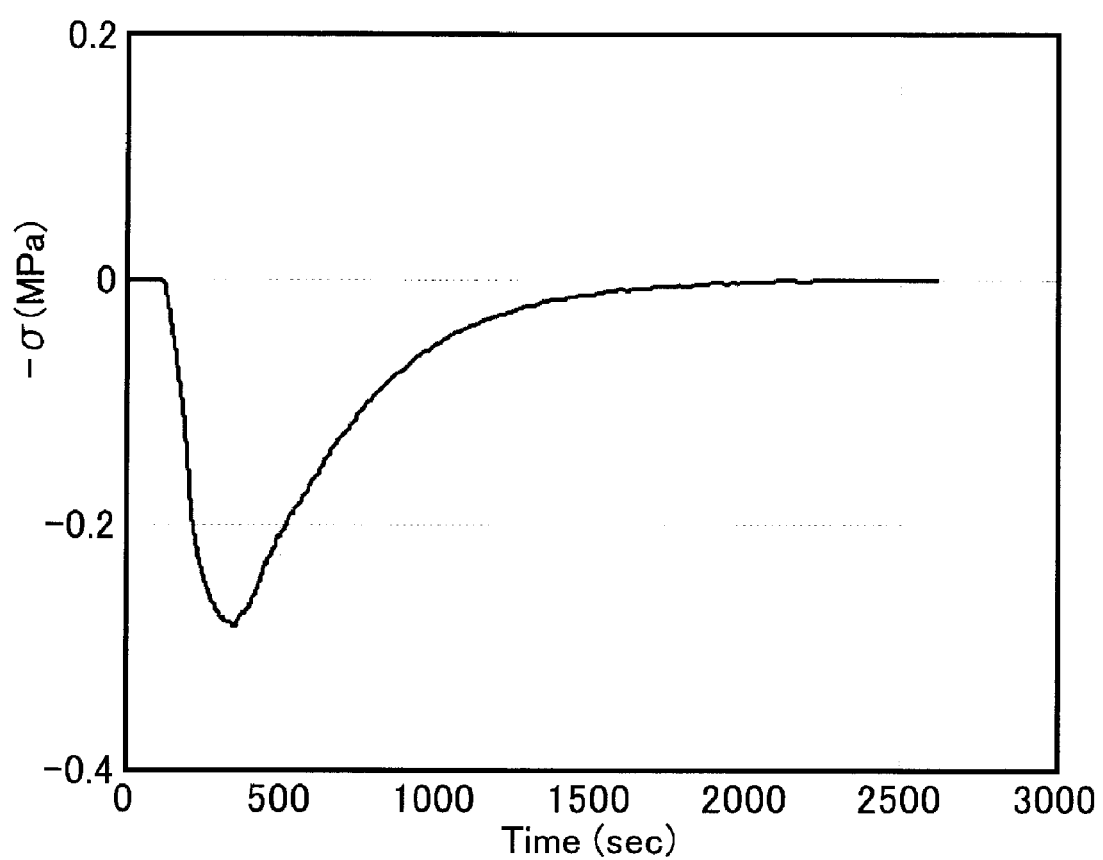
FIG. 40 is a graph of calculated thermal stress at the center of the quartz disc.
Figure 41:
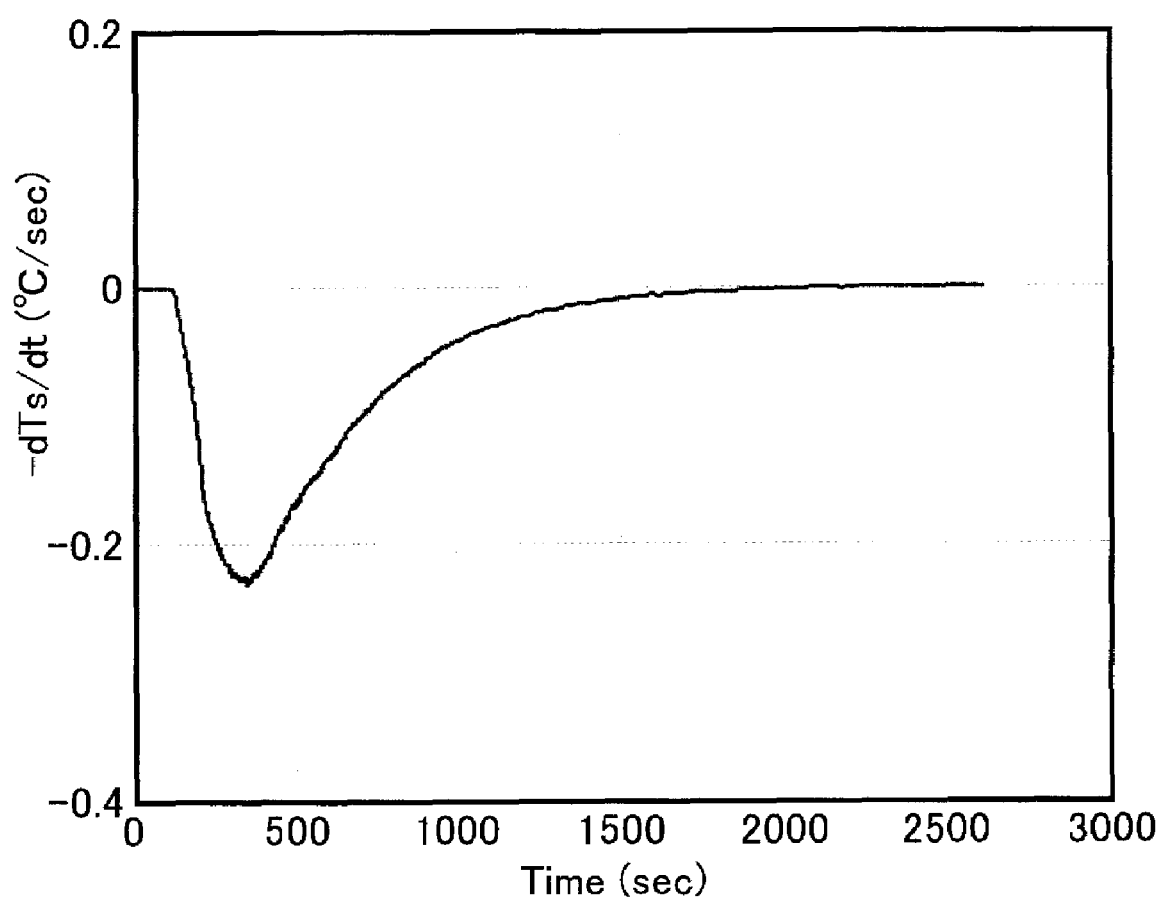
FIG. 41 is a graph of time derivative of the surface temperature shown in FIG. 39.

The computed thermal stress (note FIG. 40) resembles the time derivative of the surface temperature (note FIG. 41). The sign of the vertical axis in FIG. 41 is negative to compare the computed thermal stress with a typical dynamic pressure response. Pressure reading and thermal stress on the resonator have opposite signs. In the case of temperature ramp, a temperature gradient is almost constant across the quartz sensor body and time derivative of the temperature is proportional to the temperature gradient. The thermal stress is also proportional to the temperature gradient as evident if a constant temperature gradient profile, $T(r,t)=\Delta T \cdot r + T_0$, is put into Equation 53, where $\Delta T$ and $T_0$ represent a constant temperature gradient and a constant temperature offset, respectively. $\sigma$ is now proportional to $\Delta T$.

In order to convert the thermal stress response into a dynamic pressure response, the proportional constant C(T) is utilized. Its temperature dependency may slightly deform the response curve.

Figure 42:
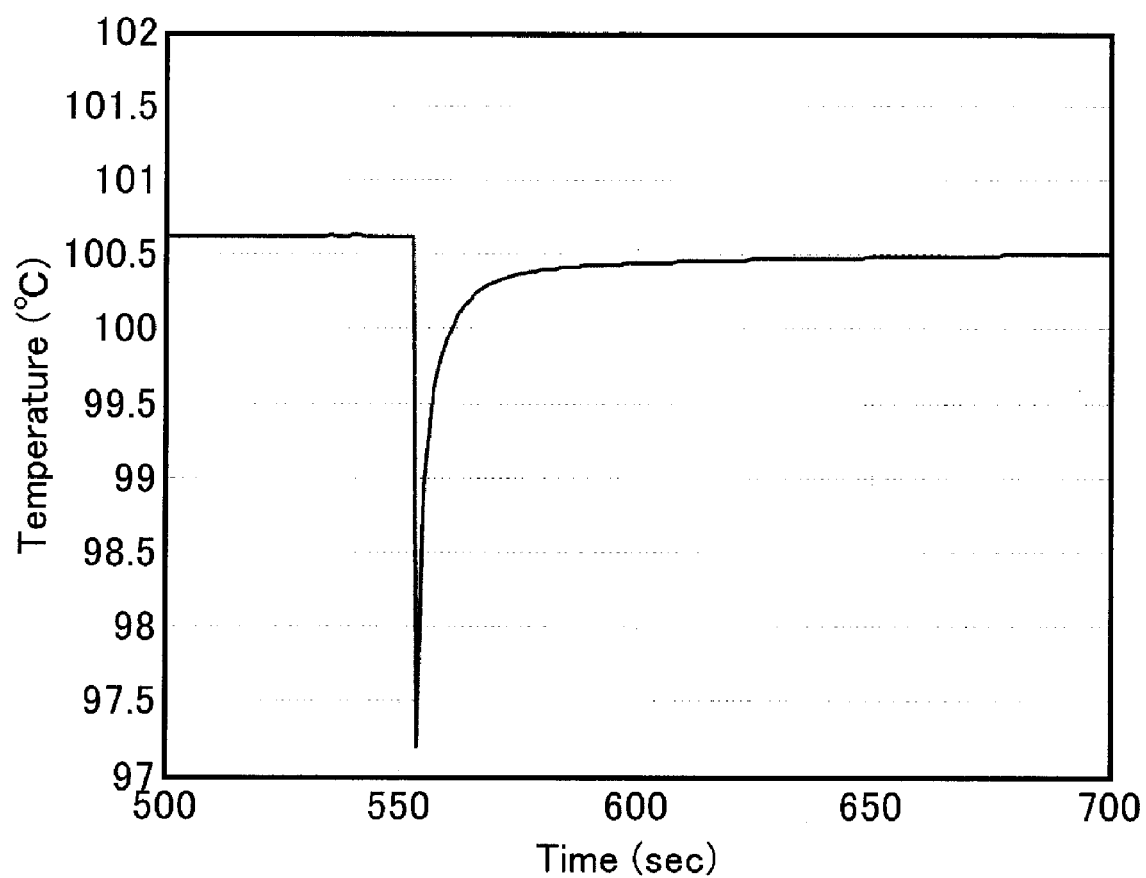
FIG. 42 is a graph of given surface temperature data in the case of a pressure drop.

Thermal stresses in FIG. 42 are calculated by using Equation 59 for given surface temperature data in a pressure step condition. A sudden pressure change induces an adiabatic temperature change in the oil surrounding the quartz sensor body. The oil temperature recovers quickly, but the final stabilization speed is limited by heat flow from the environment outside the sensor housing.

Figure 43:
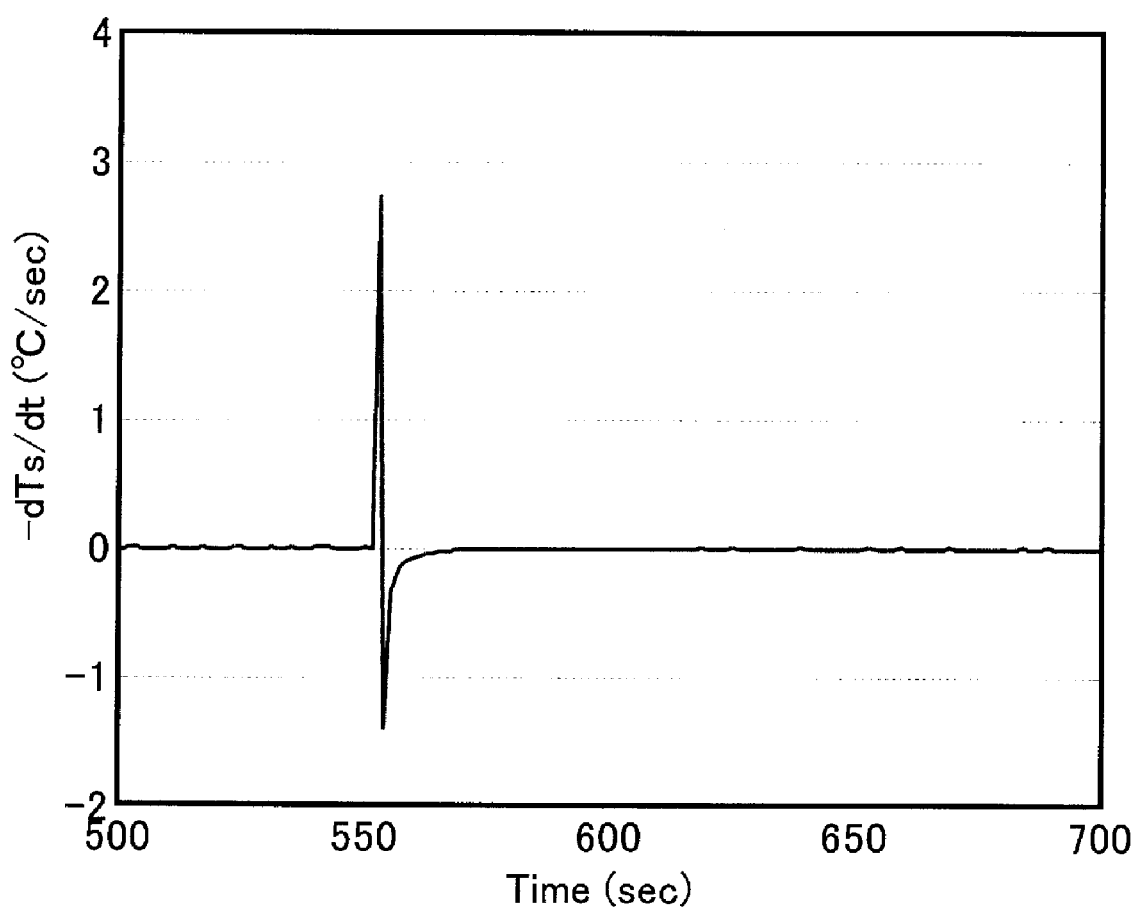
FIG. 43 is a graph of time derivative of the surface temperature shown in FIG. 42.
Figure 44B:
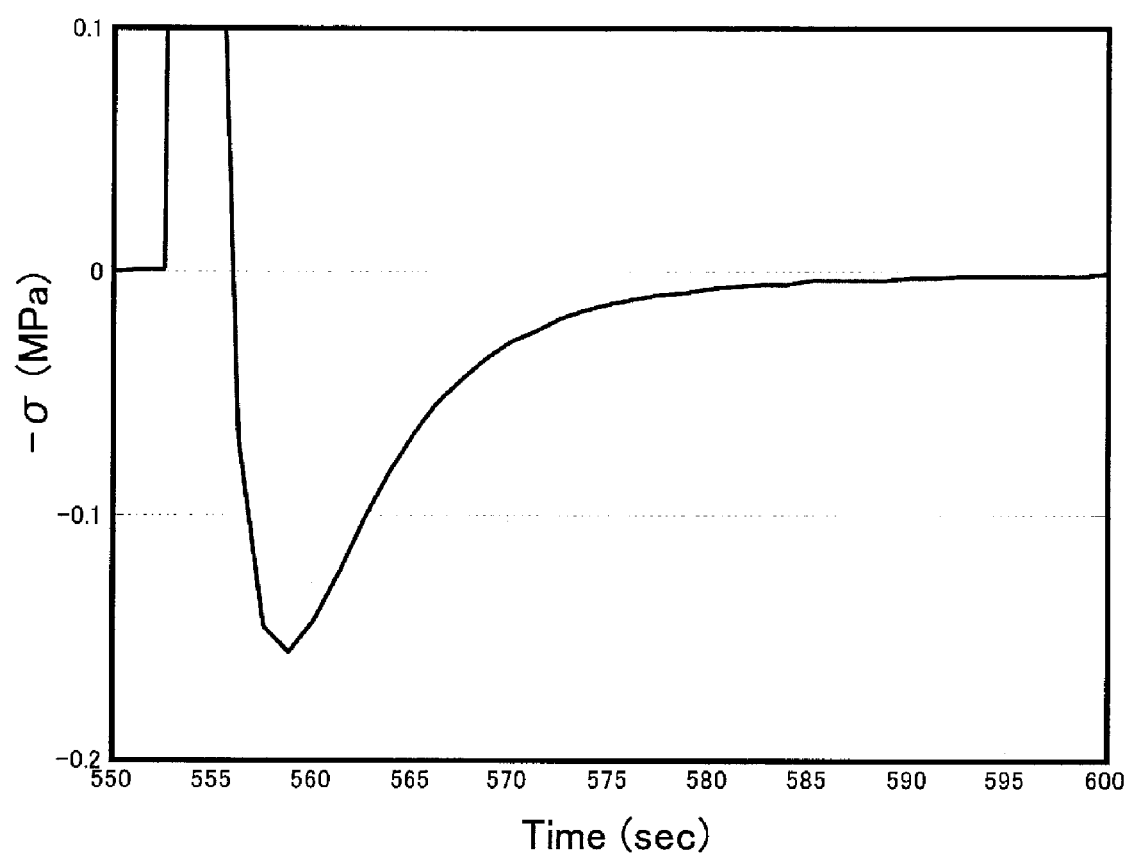
FIG. 44B is a partially enlarged graph of the region 44-A in FIG. 44A.

The thermal stress was computed for the surface temperature input (note FIG. 42) with Equation 59. A comparison of the time derivative of the surface temperature, as shown in FIG. 43, to the computed thermal stress, shown in FIGS. 44A and 44B, shows that computation of the thermal stress is not simple differentiation of the surface temperature with respect to time. Note again that the sign of the vertical axis in FIG. 43 is negative to compare the computed thermal stress with a typical dynamic pressure response. The calculated thermal stress seems to correspond to both positive and negative dynamic pressure errors.

The surface temperature on a pressure gauge can be obtained with a thermometer. For example, an RTD may be used as the thermometer and may be attached to the peripheral surface of the disc, such as a thin film platinum (Pt) resistor deposited directly on the quartz surface. The Pt resistor is also sensitive to pressure, but is repeatable. Both pressure sensor and thermometer may be calibrated simultaneously to temperature and pressure.

Figure 45:
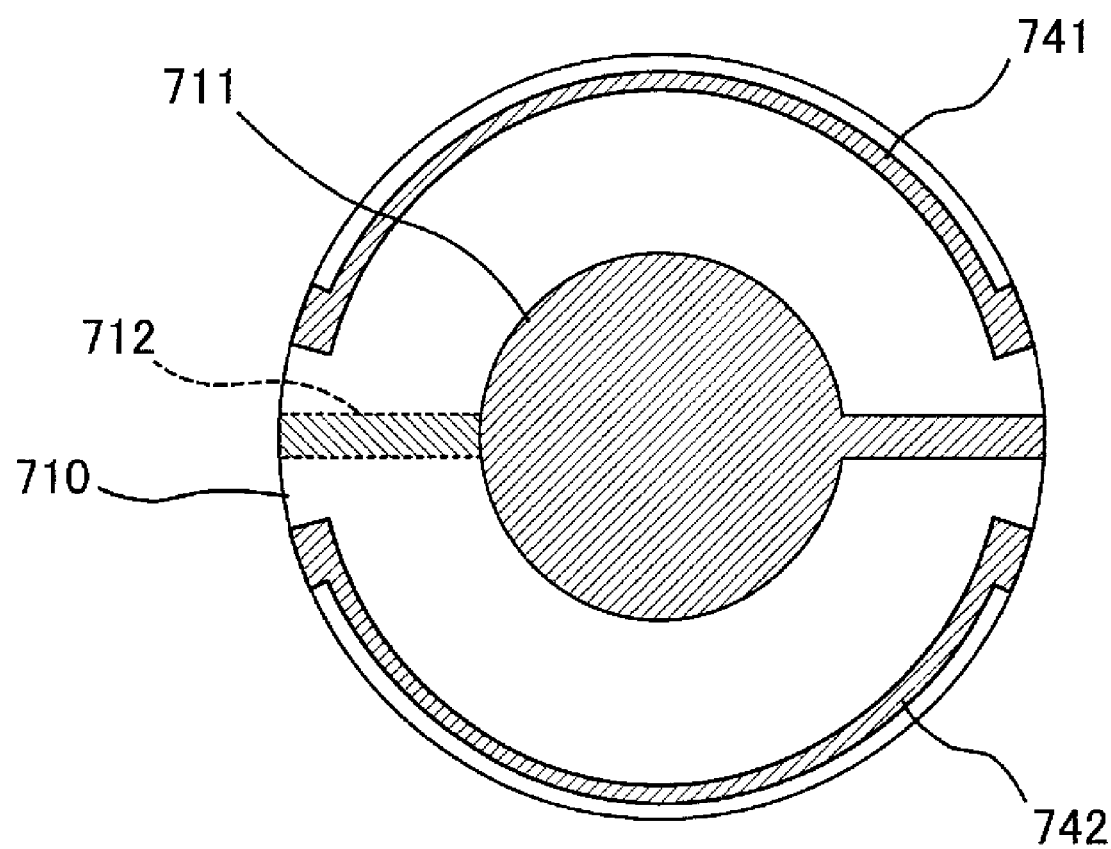
FIG. 45 is a plan view of a resonator plate of one pressure gauge with a thin film thermal resistor according to the present invention.

FIG. 45 shows one embodiment of a single-mode pressure gauge with thin film thermal resistors 741 and 742. Electrodes 711 and 712 for vibration of the resonator disc 710 are located at a central portion of opposite surfaces of the resonator disc 710. The thin film thermal resistors 741 and 742 are located on a surface of the resonator disc 710 in the vicinity of a peripheral surface exposed to oil. Although two thin film thermal resistors are depicted in FIG. 45, the instant invention contemplates one or more resistors as desirable or necessary for purposes of the present invention. Various methods may be used for fabrication of the thin film thermal resistors. In this, a sputtering method is preferable for a uniform and stable thin film with relatively simple apparatus, although other fabrication methods also are contemplated by the present invention.

Figure 46:
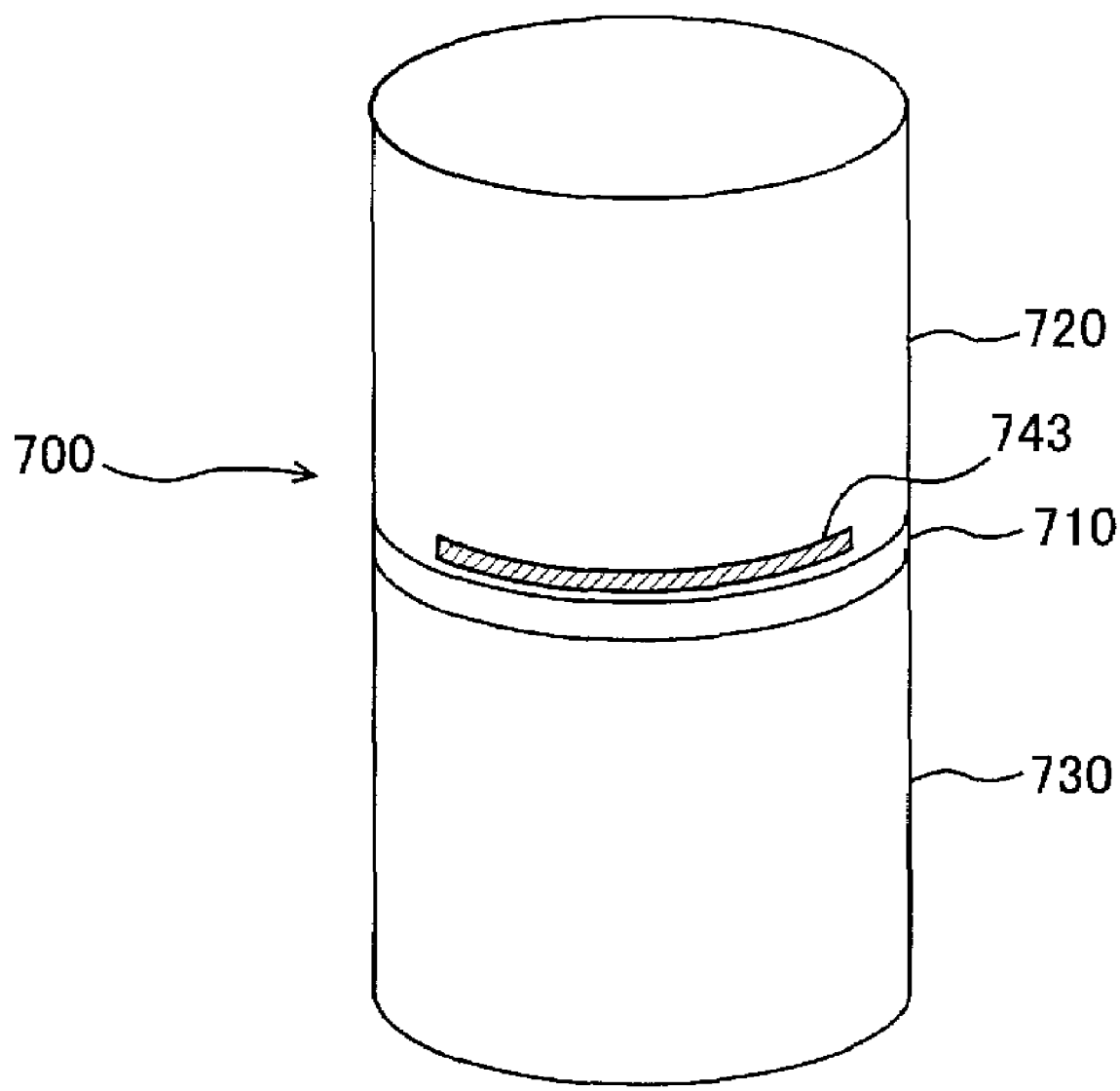
FIG. 46 is a perspective view of another quartz pressure gauge with a thin film thermal resistor according to the present invention.

FIG. 46 shows another embodiment of a single-mode pressure gauge 700 with thin film thermal resistor 743. In this embodiment, the thin film thermal resistor 743 is located on at least one of the lateral surfaces of end caps 720. The thin film 743 is located in the vicinity of resonator disc 710.

FIG. 47 shows one embodiment of a fabrication process of thin film, such as a platinum (Pt) thin film, on a quartz pressure gauge for a temperature sensor according to the present invention. First, a buffer layer may be deposited on the quartz surface by a suitable process, such as a vacuum evaporation method or a sputtering method (S301). Next, a thin film is deposited on the buffer layer by suitable method, such as a vacuum evaporation method or a sputtering method (S302). The thin film is then heated for sintering or annealing at as high a temperature as possible, in the range from about 400° C. to about 500° C., however, below such temperature so that twinning does not occur (S303). The thin film may be patterned so that pattern resistance becomes a convenient resistance for the acquisition circuit (S304). The pattern resistance is preferably within the range from about 100Ω to about 1 kΩ.

In one embodiment described above, due to the simple and highly symmetrical structure of single-mode quartz oscillation pressure gauges, a theoretical model of thermal stress was provided. The thermal stress response to a surface temperature impulse was derived from the heat conduction and thermal stress equations of the disc. The thermal stress impulse response can be used as a digital filter to compute thermal stress at the center of the disc by convolving it with any surface temperature data. By determining the proportional constant between thermal stress response and corresponding dynamic pressure response error, dynamic response errors can be compensated by using temperature measured at the peripheral surface of the sensor.

To obtain the surface temperature, a temperature sensor, such as a thermometer configured for sensing temperature, may be installed on the quartz surface of the quartz disc. Limitation based on the assumptions in modeling may be relaxed by tuning the model parameters so as to fit the model to experimental data.

Referring again to FIG. 22, yet another embodiment of a system for thermal compensation of pressure values obtained by a single-mode oscillation pressure gauge (shown in FIG. 33) is described. The present embodiment of the compensation system includes a processor 400, a memory unit 500 and a display 600. The processor 400 may compute a thermally corrected pressure value $P_{corrected}$ ($=P_{raw}+\Delta P$) by using pressure values measured with, for example, pressure gauge 700 and outer surface temperature values measured with a thermometer, such as an RTD, and Equation 57 or 59 for dynamic compensation. The pressure and temperature values may be stored in the memory unit 500 after measurements and used for the compensation by reading from the memory unit 500. The corrected pressure values $P_{corrected}$ may be stored in the memory unit 500 and displayed on the display 600, such as an LCD and CRT. As the processor 400, various types of data processing means, such as a circuit board or an IC chip designed for processing the pressure and temperature data, a microcomputer and a personal computer, may be used. As the memory unit 500, various types of data memorizing media, such as semiconductor memory, magnetic disc, magnetic tape, and optical disc, may be used.

As described above, the pressure measurement system of FIG. 22 may include a pressure sensor tool 300. The pressure sensor tool 300 may contain a sensor unit 310 having, for example, a single-mode oscillation pressure gauge 700, a thermometer 140 attached, for example, on the outer surface of the pressure gauge 700 and a housing 250 filled with a suitable pressure medium 200, such as oil. The pressure sensor tool 300 may also include a measurement circuit unit 320 including a circuit 322 for the pressure gauge 700 and a circuit 324 for the thermometer 140. The circuit 322 may process signals from the pressure gauge 700, and output the measured pressure data or frequency data corresponding to the pressure to the processor 400. The circuit 324 may process signals from the thermometer 140, and output the measured temperature data or frequency data corresponding to the temperature to the processor 400.

Referring also to FIG. 23, thermal compensation of pressure values obtained by a single-mode oscillation pressure gauge may be achieved by determining the coefficient $C_0(T)$ or $C(T)$ of the correction term in the foregoing compensation Equation 57 or 59 with, for example, the processor 400 using experimental data sets of dynamic pressure responses (S101). The determined coefficients may be stored in the data memory unit 500. Next, the processor 400 may read a set of pressure values $P_{raw}$ or frequency data, and outer surface temperature values $T_{surface}$ from the data memory unit 500 (S102). Then, the processor 400 may compute a corrected pressure value $P_{corrected}$ ($=P_{raw}+\Delta P$) using the measured data $P_{raw}$ and $T_{surface}$, and the foregoing compensation Equation 57 or 59 (S103). The computed pressure value may be stored in the data memory unit 500 (S104). The computation of corrected pressure data may be repeated for all measured data to be corrected over a predetermined period after commencement of pressure measurements by the pressure gauge 700 (S102-S105). The computed pressure values may be displayed as a dynamic pressure response curve on the display 600 (S106).

The techniques described above may be utilized for measured data that are stored in a data memory unit, or may be applied in real-time to measurements conducted at, for example, an oil well site by placing pressure sensor tool 300 in an oil or gas well, for example. In this, the processor 400 may acquire a set of pressure values $P_{raw}$ and outer surface temperature values $T_{surface}$ from a pressure sensor tool (S102). Using the acquired data, the processor 400 may compute one or more corrected pressure values $P_{raw}$ (S103). Alternatively, all measured data $P_{raw}$ and $T_{surface}$ may be stored in the data memory unit 500 before commencement of the computation of corrected pressure values.

The preceding description has been presented only to illustrate and describe the invention and some examples of its implementation. It is not intended to be exhaustive or to limit the invention to any precise form disclosed. Many modifications and variations are possible in light of the above teaching.

The preferred aspects were chosen and described in order to best explain principles of the invention and its practical applications. The preceding description is intended to enable others skilled in the art to best utilize the invention in various embodiments and aspects and with various modifications as are suited to the particular use contemplated. It is intended that the scope of the invention be defined by the following claims.

What is claimed is:

1. A method for compensation of pressure measurements by a pressure gauge comprising:
   determining correlation between error in pressure measurements by a pressure gauge, due to temperature gradient in the pressure gauge, and the temperature gradient; and
   deriving one or more corrected pressure values based on the correlation between the pressure error and the temperature gradient, wherein determining the correlation comprises deriving a scale factor based on a two-point temperature gradient representing the temperature difference between the temperature at the surface of the pressure gauge and the temperature at the center of the pressure gauge.

2. A method for compensation of pressure measurements by a pressure gauge comprising:
   determining correlation between error in pressure measurements by a pressure gauge, due to temperature gradient in the pressure gauge, and the temperature gradient; and
   deriving one or more corrected pressure values based on the correlation between the pressure error and the temperature gradient, wherein determining the correlation comprises deriving a proportional constant as a function of temperature based on thermal stress and the pressure error, wherein the thermal stress is a function of a temperature profile in the pressure gauge.

3. A method for compensation of pressure measurements by a pressure gauge comprising:
   determining correlation between error in pressure measurements by a pressure gauge, due to temperature gradient in the pressure gauge, and the temperature gradient; and
   deriving one or more corrected pressure values based on the correlation between the pressure error and the temperature gradient, wherein deriving the one or more corrected pressure values comprises using:

$$P_{corrected} = P_{raw} - SF \cdot (T_{INSIDE} - T_{OUTSIDE})$$

wherein $P_{corrected}$ represents a corrected pressure value, $P_{raw}$ represents a pressure value measured with the pressure gauge, SF represents the correlation based on a two-point temperature gradient representing the temperature difference, $T_{OUTSIDE}$ represents outside temperature at the surface of the pressure gauge, and $T_{INSIDE}$ represents inside temperature at an inner portion of the pressure gauge.

4. The method according to claim 3 and further comprising:
   calculating the measured pressure value from resonance frequencies in a dual vibrating mode of a piezoelectric resonator of the pressure gauge; and
   calculating at least one of the outside and inside temperature from the resonance frequencies.

5. A method for compensation of pressure measurements by a pressure gauge comprising:
   determining correlation between error in pressure measurements by a pressure gauge, due to temperature gradient in the pressure gauge, and the temperature gradient;

deriving one or more corrected pressure values based on the correlation between the pressure error and the temperature; and deriving the inside temperature based on the outside temperature, wherein the outside temperature is measured at the surface of the pressure gauge and further deriving the inside temperature using:

$$T_{INSIDE}(x, t) = \int_0^t T_{IR}(x, t - t') T_{OUTSIDE}(t') dt'$$

wherein $T_{INSIDE}$ represents the inside temperature, $T_{OUTSIDE}$ represents the outside temperature, $T_{IR}$ represents a function expressing a temperature impulse response of the pressure gauge, x represents a position in the pressure gauge, and t and t' represent time.

6. The method according to claim 5 and further comprising:
determining the temperature impulse response by a numerically modeled method comprising Finite Element Modeling.

7. The method according to claim 5 and further comprising:
determining the temperature impulse response by an experimental method.

8. A method for compensation of pressure measurements by a pressure gauge comprising:
determining correlation between error in pressure measurements by a pressure gauge, due to temperature gradient in the pressure gauge, and the temperature gradient; and
deriving one or more corrected pressure values based on the correlation between the pressure error and the temperature gradient and deriving the outside temperature at the surface of the pressure gauge based on the inside temperature, wherein the inside temperature is measured at an inner portion of the pressure gauge.

9. The method according to claim 8 and further comprising:
deriving the outside temperature using:

$$T_{OUTSIDE}(t) = \int_0^t InverseIR(t - t') T_{INSIDE}(t') dt'$$

wherein $T_{INSIDE}$ represents the inside temperature, $T_{OUTSIDE}$ represents the outside temperature, InverseIR represents an inverse function of temperature impulse response of the pressure gauge, and t and t' represent time.

10. The method according to claim 1 and further comprising:
deriving the one or more corrected pressure values using:

$$\Delta P(T, t) = \int_0^t T_{OUTSIDE}(t - t') C_0(T) \sigma(t') dt'$$

wherein $\Delta P(T,t)$ represents a correction term; $T_{OUTSIDE}$ represents the outside temperature at the outer surface of the pressure gauge; σ represents thermal stress impulse response in the pressure gauge; $C_0$ represents a proportional constant as a function of temperature based on thermal stress and the pressure error, the thermal stress being a function of temperature profile in the pressure gauge; T represents static temperature; and t and t' represent time.

11. The method according to claim 10 and further comprising:
determining the thermal stress impulse response by a numerically modeled method comprising Finite Element Modeling.

12. The method according to claim 10 and further comprising:
determining the thermal stress impulse response by an experimental method.

13. The method according to claim 10 and further comprising:
providing a pressure gauge comprising a discoid stress sensor; and
deriving the correction term using:

$$\Delta P(T, t) = C(T) \int_0^t dt' T_{OUTSIDE}(t - t') \sum_{n=1}^{Ns} e^{-\kappa \beta_n^2 t'} \left( e^{\kappa \beta_n^2 \Delta t} - 1 \right) \left\{ \frac{1}{\beta_n^2} - \frac{aJ_0(0)}{2\beta_n J_1(a\beta_n)} \right\}$$

wherein $\Delta P(T,t)$ represents the correction term, $T_{OUTSIDE}$ represents the outside temperature at the outer surface of the pressure gauge, "a" represents radius of resonator, κ represents thermal diffusivity of the pressure gauge, $J_0$ and $J_1$, represent Bessel's function, βn represents the root of $J_0(a\beta)$, $$C(T) = C_0(T) \frac{2\alpha E}{a^2}$$

T represents static temperature, Δt represents sampling time, Ns represents the total number of terms summed up and t and t' represent time.

14. A method for one or more pressure measurements by a pressure gauge comprising:
measuring one or more pressure values by a pressure gauge; and
deriving one or more corrected pressure values based on a predetermined correlation between error in pressure measurements by the pressure gauge, due to temperature gradient in the pressure gauge, and the temperature gradient,
wherein determining the correlation comprises deriving at least one of:
a scale factor based on a two-point temperature gradient representing the temperature difference between temperature at the surface of the pressure gauge and temperature at the inner portion of the pressure gauge; and
a proportional constant as a function of temperature based on thermal stress and the pressure error, wherein the thermal stress is a function of a temperature profile in the pressure gauge.

15. The method according to claim 14, wherein:
the pressure gauge is used for pressure measurements in oil wells.

16. A system for thermal compensation of pressure measurements by a pressure gauge comprising:

a pressure gauge;

a measurement circuit unit configured to output one or more measured pressure values based on output signals of the pressure gauge; and the system being configured to derive one or more corrected pressure values based on a predetermined correlation between error in pressure measurements by the pressure gauge, due to temperature gradient in the pressure gauge, and the temperature gradient; and a data processor and a data memory unit, the data processor and the data memory unit being used to determine the correlation between pressure error and temperature gradient comprises at least one of, a scale factor based on a two-point temperature gradient representing the temperature difference between temperature at the surface of the pressure gauge and temperature at the inner portion of the pressure gauge; and a proportional constant as a function of temperature based on thermal stress and the pressure error, wherein the thermal stress is a function of a temperature profile in the pressure gauge.

17. A system for thermal compensation of pressure measurements by a pressure gauge comprising:

a pressure gauge;

a measurement circuit unit configured to output one or more measured pressure values based on output signals of the pressure gauge; and the system being configured to derive one or more corrected pressure values based on a predetermined correlation between error in pressure measurements by the pressure gauge, due to temperature gradient in the pressure gauge, and the temperature gradient, wherein the pressure gauge comprises a piezoelectric resonator having a dual vibrating mode.

18. The system for thermal compensation of pressure measurements according to claim 17, wherein the piezoelectric resonator comprises a quartz resonator.

19. The system for thermal compensation of pressure measurements according to claim 18 further comprising a thin film thermal resistor temperature sensor on a surface of the pressure gauge.

20. The system for thermal compensation of pressure measurements according to claim 19, wherein the temperature sensor comprises a thin film of platinum.

21. The system for thermal compensation of pressure measurements according to claim 16, wherein:

the system is configured to be used for pressure measurements in oil wells.

22. A system for thermal compensation of pressure measurements by a pressure gauge comprising:

a pressure gauge;

a measurement circuit unit configured to output one or more measured pressure values based on output signals of the pressure gauge; and the system being configured to derive one or more corrected pressure values based on a predetermined correlation between error in pressure measurements by the pressure gauge, due to temperature gradient in the pressure gauge, and the temperature gradient, wherein the pressure gauge comprises:

a cylindrical body;

a resonator located in the body; and a temperature sensor on the external surface of the body, in the vicinity of the resonator.

23. A system for thermal compensation of pressure measurements by a pressure gauge comprising:

a pressure gauge;

a measurement circuit unit configured to output one or more measured pressure values based on output signals of the pressure gauge; and the system being configured to derive one or more corrected pressure values based on a predetermined correlation between error in pressure measurements by the pressure gauge, due to temperature gradient in the pressure gauge, and the temperature gradient, wherein the pressure gauge comprises:

two cylindrical end caps;

a resonator disc disposed between the end caps; and a temperature sensor on the resonator disc along the peripheral edge of the disc.

24. A system for thermal compensation of pressure measurements by a pressure gauge comprising:

a pressure gauge;

a measurement circuit unit configured to output one or more measured pressure values based on output signals of the pressure gauge; and the system being configured to derive one or more corrected pressure values based on a predetermined correlation between error in pressure measurements by the pressure gauge, due to temperature gradient in the pressure gauge, and the temperature gradient, wherein the pressure gauge comprises a discoid stress sensor.

25. A system for thermal compensation of pressure measurements by a pressure gauge comprising:

a pressure gauge;

a measurement circuit unit configured to output one or more measured pressure values based on output signals of the pressure gauge; and the system being configured to derive one or more corrected pressure values based on a predetermined correlation between error in pressure measurements by the pressure gauge, due to temperature gradient in the pressure gauge, and the temperature gradient, wherein the pressure gauge comprises a substantially planar resonator;

the system further comprising a temperature sensor disposed on or near an outer surface of the pressure gauge in substantially the same plane as the resonator.

* * * * *